US009096725B2

(12) United States Patent
Choi et al.

(10) Patent No.: US 9,096,725 B2
(45) Date of Patent: Aug. 4, 2015

(54) CROSS-LINKED POLYAZOLE, METHOD OF PREPARING THE POLYAZOLE, ELECTRODE FOR FUEL CELL INCLUDING THE CROSS-LINKED POLYAZOLE, ELECTROLYTE MEMBRANE FOR FUEL CELL INCLUDING THE CROSS-LINKED POLYAZOLE, METHOD OF MANUFACTURING THE ELECTROLYTE MEMBRANE, AND FUEL CELL INCLUDING THE CROSS-LINKED POLYAZOLE

(75) Inventors: Seong-woo Choi, Yongin-si (KR); Jong-chan Lee, Seoul (KR); Jung-ock Park, Yongin-si (KR)

(73) Assignees: SAMSUNG ELECTRONICS CO., LTD. (KR); SNU R&D FOUNDATION (KR)

( * ) Notice: Subject to any disclaimer, the term of this patent is extended or adjusted under 35 U.S.C. 154(b) by 486 days.

(21) Appl. No.: 12/766,074

(22) Filed: Apr. 23, 2010

(65) Prior Publication Data
US 2010/0273087 A1  Oct. 28, 2010

(30) Foreign Application Priority Data
Apr. 24, 2009 (KR) .................. 10-2009-0036233

(51) Int. Cl.
*H01M 8/10* (2006.01)
*C08G 73/18* (2006.01)
(Continued)

(52) U.S. Cl.
CPC ............... *C08G 73/18* (2013.01); *C08G 61/12* (2013.01); *C08J 5/2256* (2013.01); *C08K 5/357* (2013.01); *C08L 79/04* (2013.01); *H01M 8/103* (2013.01); *H01M 8/1027* (2013.01); *H01M 8/1048* (2013.01); *H01M 8/1072* (2013.01);
(Continued)

(58) Field of Classification Search
CPC .......... H01M 2/16; H01M 8/10; C08K 5/357; C08L 79/04; C08L 65/00; C08G 2261/126; C08G 2261/312; C08G 2261/3241; C08G 2261/516; C08G 2261/592; C08G 2261/598; C08G 2261/62; C08G 61/12; C08G 73/18; C08J 2379/06; C08J 5/22
See application file for complete search history.

(56) References Cited

U.S. PATENT DOCUMENTS

2004/0096734 A1   5/2004  Calundann et al.
2005/0256296 A1  11/2005  Kiefer et al.
(Continued)

FOREIGN PATENT DOCUMENTS

CN  001606585 A   4/2005
CN  101081898 A  12/2007
(Continued)

OTHER PUBLICATIONS

Jorshak, V.V. et al, Synthesis and Investigation of Polybenzimidazoles Containing Alkyl Substituents in Aromatic Nuclei, 1971, Journal of Polymer Science: Part A-1, vol. 9, pp. 1027-1043.*
(Continued)

*Primary Examiner* — Robert Xu
(74) *Attorney, Agent, or Firm* — Cantor Colburn LLP

(57) ABSTRACT

A cross-linked polyazole, a method of preparing the cross-linked polyazole, an electrode and an electrolyte membrane for a fuel cell, which include the cross-linked polyazole, a method of manufacturing the electrolyte membrane, and a fuel cell including the cross-linked polyazole.

43 Claims, 16 Drawing Sheets

(51) Int. Cl.
    *C08G 61/12*    (2006.01)
    *C08J 5/22*     (2006.01)
    *C08K 5/357*    (2006.01)
    *C08L 79/04*    (2006.01)

(52) U.S. Cl.
    CPC .......... *H01M8/1081* (2013.01); *H01M 8/1088* (2013.01); *C08G 2261/126* (2013.01); *C08G 2261/312* (2013.01); *C08G 2261/3241* (2013.01); *C08G 2261/516* (2013.01); *C08G 2261/592* (2013.01); *C08G 2261/598* (2013.01); *C08G 2261/62* (2013.01); *C08J 2379/06* (2013.01); *Y02E 60/521* (2013.01)

(56) References Cited

U.S. PATENT DOCUMENTS

| | | |
|---|---|---|
| 2006/0035095 A1 | 2/2006 | Calundann et al. |
| 2006/0078774 A1 | 4/2006 | Uensal et al. |
| 2006/0079392 A1 | 4/2006 | Baurmeister et al. |
| 2006/0210881 A1 | 9/2006 | Calundann et al. |
| 2006/0211844 A1* | 9/2006 | Kim et al. ............... 528/336 |
| 2007/0184323 A1 | 8/2007 | Lee et al. |
| 2007/0275285 A1 | 11/2007 | Choi et al. |
| 2008/0057358 A1 | 3/2008 | Calundann et al. |
| 2008/0145743 A1 | 6/2008 | Choi et al. |

FOREIGN PATENT DOCUMENTS

| | | |
|---|---|---|
| EP | 1 702 942 | 9/2006 |
| EP | 1 760 110 | 3/2007 |
| EP | 2 036 910 | 3/2009 |
| EP | 2 048 183 | 4/2009 |
| EP | 2 056 390 | 5/2009 |
| EP | 2 058 321 | 5/2009 |
| JP | 200770631 A | 3/2007 |
| JP | 2007519183 A | 7/2007 |
| JP | 2007214108 A | 8/2007 |
| JP | 2007324132 A | 12/2007 |
| JP | 2008027911 A | 2/2008 |
| JP | 2008153227 A | 7/2008 |
| JP | 2009068011 A | 4/2009 |
| WO | 2005063852 A1 | 7/2005 |
| WO | WO 2007/055459 | 5/2007 |

OTHER PUBLICATIONS

European Search Report issued Jun. 25, 2010, in corresponding European Patent Application No. 10160941.0.
C. Wannek et al., "Durability of ABPBI-based MEAs for High Temperature PEMFCs at Different Operating Conditions*", Fuel Cells 08, No. 2, 2008, pp. 87-95.
Hyoung-Juhn Kim et al., "Polybenzimidazoles for High Temperature Fuel Cell Applications", Macromolecular Rapid Communications, 25, 2004, pp. 1410-1413.
Jeong-Hi Kim et al., "Dependence of the performance of a high-temperature polymer electrolyte fuel cell on phosphoric acid-doped polybenzimidazole ionomer content in cathode catalyst layer", Journal of Power sources 170, 2007, pp. 275-280.
Juan Antonio Asensio et al., "Polymer Electrolyte Fuel Cells Based on Phosphoric Acid-Impregnated Poly(2,5-benzimidazole) Membranes", Journal of The Electrochemical Society, 151(2), 2004, pp. A304-A310.
Palanichamy Krishnan et al., "Performance of a poly(2,5-benzimidazole) membrane based high temperature PEM fuel cell in the presence of carbon monoxide", Journal of Power Sources 159, 2006, pp. 817-823.
Japanese Office Action for Japanese Patent Application No. 2010-101109 dated Nov. 12, 2013 with English Translation.
Yong-Xia Wang, et al., "Synthesis and Properties of New Thermoplasitc Polymers from Substituted 3,4-Dihydro-2H-1,3-benzoxazines," Macromolecules, 2000, vol. 33, p. 2839-2847.
Chinese Office Action for Chinese Patent application No. 201010242088X dated Jul. 11, 2013 with English Translation.
Xiao et al., "High-Temperature Polybenzimidazole Fuel Cell Membranes via a Sol-Gel Process", Chem. Mater., 2005, 17, pp. 5328-5333.

* cited by examiner

CROSS-LINKED POLYAZOLE, METHOD OF PREPARING THE POLYAZOLE, ELECTRODE FOR FUEL CELL INCLUDING THE CROSS-LINKED POLYAZOLE, ELECTROLYTE MEMBRANE FOR FUEL CELL INCLUDING THE CROSS-LINKED POLYAZOLE, METHOD OF MANUFACTURING THE ELECTROLYTE MEMBRANE, AND FUEL CELL INCLUDING THE CROSS-LINKED POLYAZOLE

CROSS-REFERENCE TO RELATED APPLICATION

This application claims the benefit of Korean Application No. 10-2009-0036233, filed Apr. 24, 2009, in the Korean Intellectual Property Office, the disclosure of which is incorporated herein by reference.

BACKGROUND

1. Field

The present disclosure relates to a cross-linked polyazole, a method of preparing the cross-linked polyazole, an electrode and an electrolyte membrane for a fuel cell, which include the cross-linked polyazole, a method of manufacturing the electrolyte membrane, and a fuel cell including the cross-linked polyazole.

2. Description of the Related Art

Fuel cells that include a polymer electrolyte membrane operate at relatively low temperatures and may be manufactured in small size. Thus, such fuel cells are expected to be used as energy sources in electric vehicles and in distributed generation systems. Perfluorocarbon sulfonic acid-based polymer membranes, such as NAFION membranes (available from E.I. du Pont de Nemours and Company), are commonly used as polymer electrolyte membranes for fuel cells.

However, such polymer electrolyte membranes should be humidified, in order to sufficiently conduct protons. In addition, to enhance cell system efficiencies, polymer electrolyte membranes should be operated at high temperatures, i.e., at least 100° C. However, the moisture in the polymer electrolyte membrane is evaporated and depleted at such temperatures, which reduces the effectiveness thereof.

To address such problems and/or other problems in the related art, non-humidified electrolyte membranes, which may operate at temperatures of at least 100° C., without humidification, have been developed. For example, polybenzimidazole doped with phosphoric acid is disclosed as a material for a non-hydrated electrolyte membrane.

In addition, phosphoric acid fuel cells, which operate at temperatures of from 150 to 200° C., include a liquid phosphoric acid electrolyte. However, the liquid phosphoric acid included in a large amount in electrodes interferes with gas diffusion in the electrodes. Therefore, an electrode catalyst layer that includes a polytetrafluoroethylene (PTFE) waterproofing agent, which prevents fine pores in the electrodes from being clogged by the phosphoric acid, has been used.

In fuel cells employing a phosphoric acid-impregnated polybenzimidazole (PBI) electrolyte membrane as a high-temperature, non-humidified electrolyte, in order to promote contact between an electrode and an electrolyte membrane, attempts have been made to impregnate an electrode with liquid phosphoric acid and to load a larger quantity of a metal catalyst. However, the mechanical characteristics, chemical stability and phosphoric acid-retaining capability of such fuel cells may not be satisfactory, and thus, there is still a desire for improvement.

SUMMARY

Provided are a composition having improved physical and chemical characteristics and an improved capability to retain phosphoric acid in a wide range of temperatures, a cross-linked polyazole, a method of preparing the cross-linked polyazole, an electrode and an electrolyte membrane for a fuel cell, which include the cross-linked polyazole, a method of manufacturing the electrolyte membrane, and a fuel cell including the cross-linked polyazole.

Additional aspects will be set forth in part in the description which follows and, in part, will be apparent from the description, or may be learned by practice of the presented embodiments.

According to an aspect of the present invention, a composition includes: a polyazole including a first repeating unit represented by Formula 1 below and an azole second repeating unit having at least one amino group; and a benzoxazine-based monomer, wherein, assuming that m and n represent the relative molar amount of the first repeating unit and the azole second repeating unit, respectively, in the polyazole such that m+n=1, m ranges from 0.01 to 1 and n ranges from 0 to 0.99,

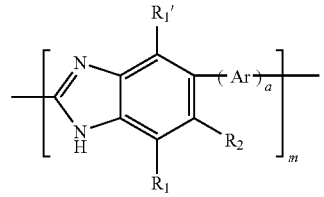

Formula 1 wherein, in Formula 1, $R_1$, $R_1'$ and $R_2$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring;

Ar is a substituted or unsubstituted C6-C20 arylene group or a substituted or unsubstituted C3-C20 heteroarylene group;

m is a number from 0.01 to 1; and a is 0 or 1.

According to another aspect of the present invention, provided is a cross-linked polyazole obtained through a cross-linking reaction of the composition described above.

According to another aspect of the present invention, a method of preparing the cross-linked polyazole described above includes: mixing a polyazole including a first repeating unit represented by Formula 1 below and an azole second repeating unit having at least one amino group, a benzoxazine-based monomer and a phosphoric acid-based material to obtain a mixture, wherein, assuming that m and n represent the relative molar amount of the first repeating unit and the azole second repeating unit, respectively, in the polyazole such that m+n=1, m ranges from 0.01 to 1 and n ranges from 0 to 0.99; and thermally treating the mixture.

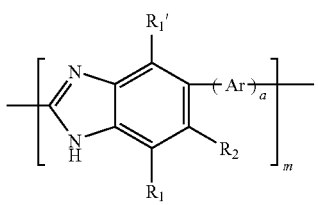

Formula 1 wherein, in Formula 1, R1, R1' and R2 are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein R1 and R2 may be linked to form a C4-C20 carbon ring or a C3-C20 hetero ring, Ar is a substituted or unsubstituted C6-C20 arylene group or a substituted or unsubstituted C3-C20 heteroarylene group;

m is a number from 0.01 to 1; and a is 0 or 1.

According to another aspect of the present invention, an electrolyte membrane for a fuel cell includes the composition or the cross-linked polyazole described above.

According to another aspect of the present invention, a method of manufacturing an electrolyte membrane for a fuel cell, the electrolyte membrane including the cross-linked polyazole, includes: mixing a polyazole including a first repeating unit represented by Formula 1 below and an azole second repeating unit having at least one amino group, a benzoxazine-based monomer and a phosphoric acid-based material to obtain a mixture, wherein, assuming that m and n represent the relative molar amount of the first repeating unit and the azole second repeating unit, respectively, in the polyazole such that m+n=1, m ranges from 0.01 to 1 and n ranges from 0 to 0.99; casting the mixture on a substrate and thermally treating the cast mixture to obtain a thermally-treated product; impregnating the thermally-treated product with the phosphoric acid-based material to obtain a resulting product; and drying the resulting product.

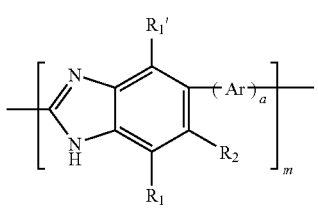

Formula 1 wherein, in Formula 1, R1, R1' and R2 are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein R1 and R2 may be linked to form a C4-C20 carbon ring or a C3-C20 hetero ring;

Ar is a substituted or unsubstituted C6-C20 arylene group or a substituted or unsubstituted C3-C20 heteroarylene group;

m is a number from 0.01 to 1; and a is 0 or 1.

The method may further include treating the thermally-treated product in a constant-temperature and constant humidity condition at a temperature of about −20 to about 30° C. and a relative humidity of about 5 to about 50%.

In the mixing of the polyazole including the first repeating unit represented by Formula 1 below and the azole second repeating unit having at least one amino group, the benzoxazine-based monomer and the phosphoric acid-based material, after the polyazole is mixed with the phosphoric acid-based material at a temperature of about 100° C. to about 160° C. to obtain a mixture, the mixture may be then mixed with the benzoxazine-based monomer.

According to another aspect of the present invention, an electrode for a fuel cell includes the composition or the cross-linked polyazole described above.

According to another aspect of the present invention, a fuel cell includes: a cathode; an anode; and an electrolyte membrane disposed between the cathode and the anode, wherein at least one of the cathode, the anode and the electrolyte membrane includes the composition or the cross-linked polyazole described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
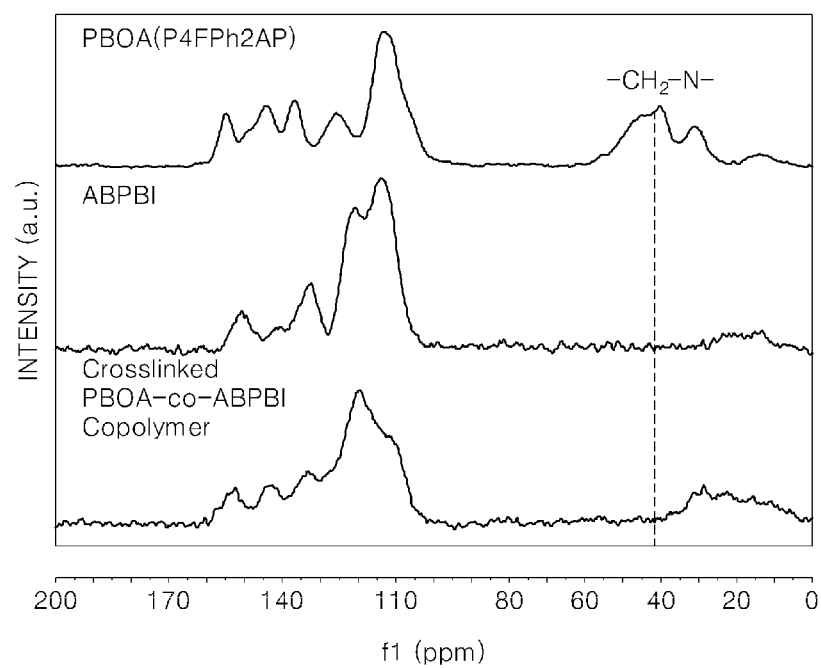
FIG. 1A is a solid-state nuclear magnetic resonance (NMR) spectrum of a cross-linked polymer prepared in Synthesis Example 1A.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Herein, when definitions are provided for a substituent designation or variable such as Ar, $R_1$, $R_2$, X, A, etc., with respect to a specific chemical formula or group of formulas, it to be understood that such definition only applies to the specific chemical formula or group of formulas and does not carry over to other formulas or groups of formulas that may use the same substituent designation or variable for something else.

According to an aspect of the present invention, provided are a composition that includes a polyazole including a first repeating unit represented by Formula 1 below and an azole second repeating unit including at least one amino group, and a benzoxazine-based monomer; and a cross-linked polyazole obtained through a cross-linking reaction of the composition.

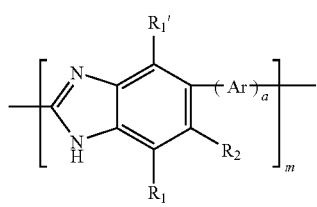

Formula 1

In Formula 1, $R_1$, $R_1'$ and $R_2$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, or wherein $R_1$ and $R_2$ may be linked to form a C4-C20 carbon ring or a C3-C20 hetero ring;

Ar is a substituted or unsubstituted C6-C20 arylene group or a substituted or unsubstituted C3-C20 heteroarylene group;

m is represents a relative molar amount of the first repeating unit in the polyazole and is a number from 0.01 to 1; and a is 0 or 1.

The composition may be a polyazole composition.

The azole second repeating unit may have at least one amino group.

Assuming that a sum of the first repeating unit of Formula 1 and the azole second repeating unit, constituting the polyazole, is 1, a mixing ratio of the first repeating unit of Formula 1 to the azole second repeating unit may be in the range of about 0.01:0.99 to about 1:0. In other words, assuming that m and n represent the relative molar amount of the first repeating unit and the azole second repeating unit, respectively, in the polyazole such that m+n=1, m ranges from 0.01 to 1 and n ranges from 0 to 0.99.

In this regard, the at least one amino group may be a primary, secondary or tertiary amino group as part of the aryl ring or substituent part of an aryl ring.

The azole second repeating unit may contain a repeating unit of a polyazole-based material disclosed in US 2005/256296A, incorporated herein by reference.

As non-limiting examples, the polyazole-based material may include an azole unit represented by the following formula I, II, III, IV, V, VI, VII, VIII, IX, X, XI, XII, XIII or XIV.

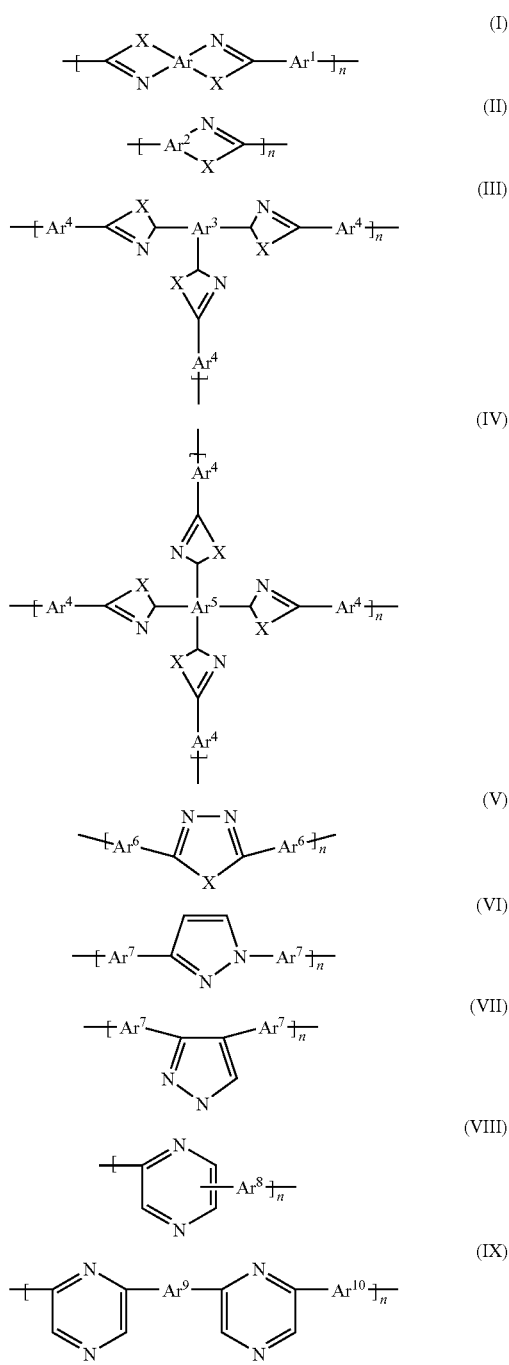

-continued

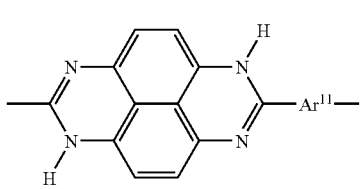
(X)

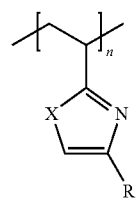
(XI)

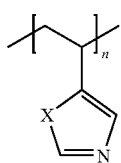
(XII)

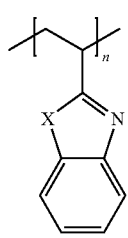
(XIII)

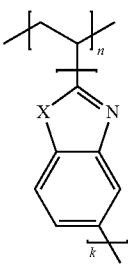
(XIV)

In Formulae I, II, III, IV, V, VI, VII, VIII, IX, X, XI, XII, XIII and XIV, Ar may be a tetravalent monocyclic or polycyclic C6-C20 aryl group or C2-C20 heteroaryl group;

$Ar^1$ a bivalent monocyclic or polycyclic C6-C20 aryl group or C2-C20 heteroaryl group;

$Ar^2$ a bivalent or trivalent monocyclic or polycyclic C6-C20 aryl group or C2-C20 heteroaryl group;

$Ar^3$ a trivalent monocyclic or polycyclic C6-C20 aryl group or C2-C20 heteroaryl group;

Groups represented by $Ar^4$ may be identical to or different from each other, and may be a trivalent monocyclic or polycyclic C6-C20 aryl group or C2-C20 heteroaryl group;

$Ar^5$ a tetravalent monocyclic or polycyclic C6-C20 aryl group or C2-C20 heteroaryl group;

Groups represented by $Ar^6$ may be identical to or different from each other, and may be a bivalent monocyclic or polycyclic C6-C20 aryl group or C2-C20 heteroaryl group;

Groups represented by $Ar^7$ may be identical to or different from each other, and may be a bivalent monocyclic or polycyclic C6-C20 aryl group or C2-C20 heteroaryl group;

$Ar^8$ may be a trivalent monocyclic or polycyclic C6-C20 aryl group or C2-C20 heteroaryl group;

$Ar^9$ may be a bivalent, trivalent or tetravalent monocyclic or polycyclic C6-C20 aryl group or C2-C20 heteroaryl group;

$Ar^{10}$ may be a bivalent or trivalent monocyclic or polycyclic C6-C20 aryl group or C2-C20 heteroaryl group;

$Ar^{11}$ may be a bivalent monocyclic or polycyclic C6-C20 aryl group or C2-C20 heteroaryl group;

Substituents represented by X may be identical to or different from each other, and may independently be an oxygen atom, a sulfur atom or —N(R'); and R' may be a hydrogen atom, a C1-C20 alkyl group, a C1-C20 alkoxy group, or a C6-C20 aryl group;

R may be a hydrogen atom, a C1-C20 alkyl group or a C6-C20 aryl group; and n represents a relative molar amount of the azole second repeating unit in the polyazole and may range from 0 to 0.99. In Formula XIV, k is an integer from 2 to 10.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene, wherein these aryl or heteroaryl groups may have a substituent.

$Ar^1$, $Ar^4$, $Ar^6$, $Ar^7$, $Ar^8$, $Ar^9$, $Ar^{10}$, and $Ar^{11}$ defined above may have any substitutable pattern. For example, if $Ar^1$, $Ar^4$, $Ar^6$, $Ar^7$, $Ar^8$, $Ar^9$, $Ar^{10}$ and $Ar^{11}$ are phenylene, $Ar^1$, $Ar^4$, $Ar^6$, $Ar^7$, $Ar^8$, $Ar^9$, $Ar^{10}$ and $Ar^{11}$ may be ortho-phenylene, meta-phenylene or para-phenylene.

The alkyl group may be a C1-C4 short-chain alkyl group, such as methyl, ethyl, n-propyl, i-propyl or t-butyl. The aryl group may be, for example, a phenyl group or a naphthyl group.

Examples of the substituent include a halogen atom, such as fluorine, an amino group, a hydroxyl group, and a short-chain alkyl group, such as methyl or ethyl.

For example, a azole second repeating unit including at least one of the units of Formulae I and II may be used.

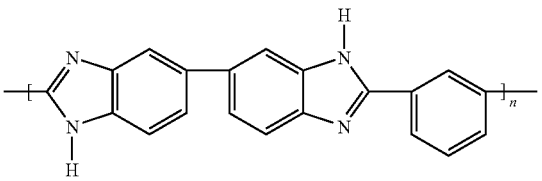

In Formula above, n represents a relative molar amount of the azole second repeating unit and may range from 0 to 0.99;

Examples of the azole second repeating unit include repeating units represented by the following formulae:
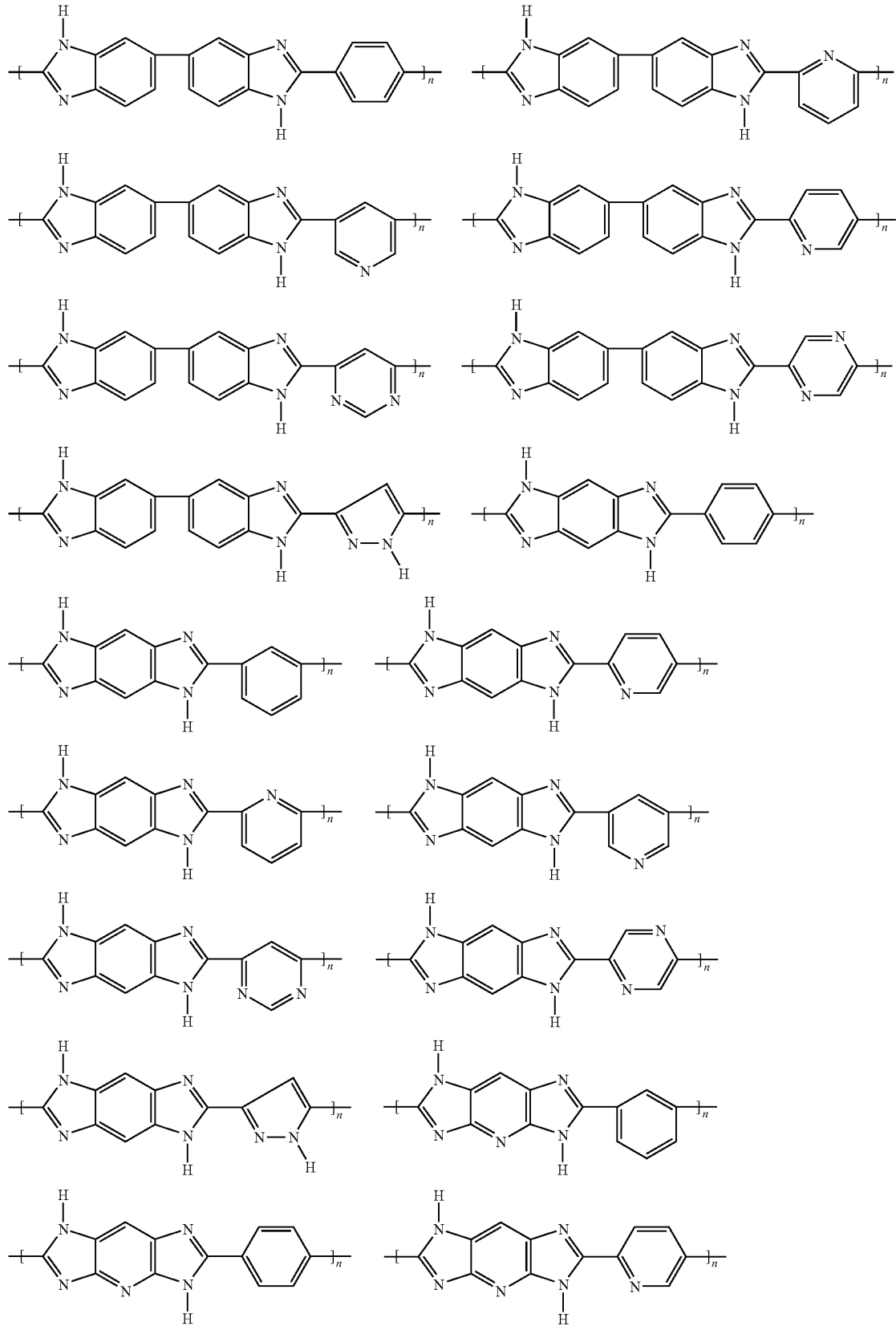

-continued

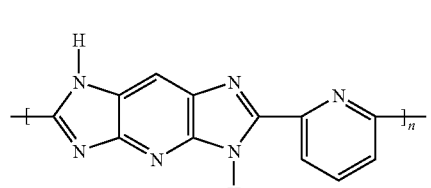
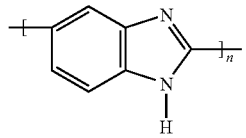
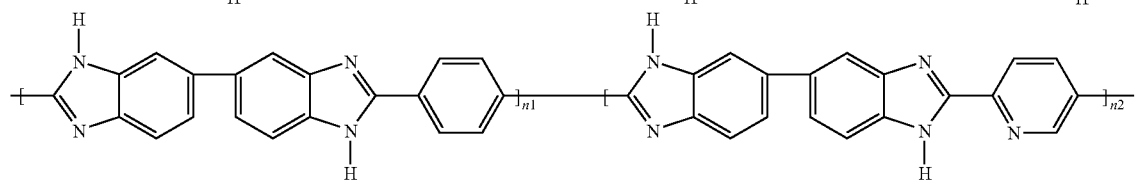
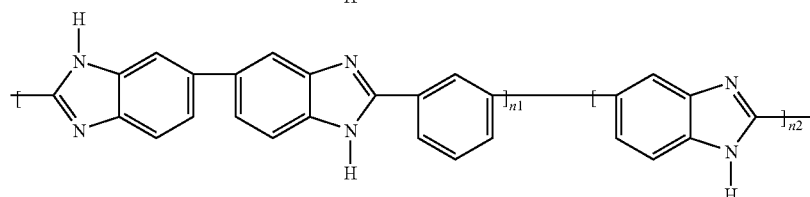
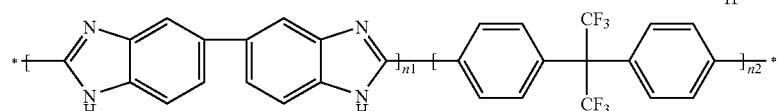
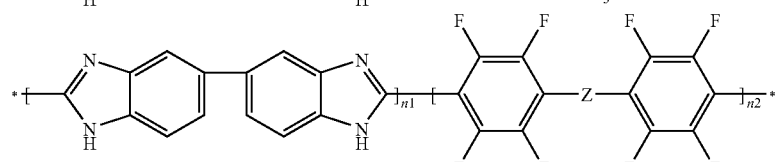
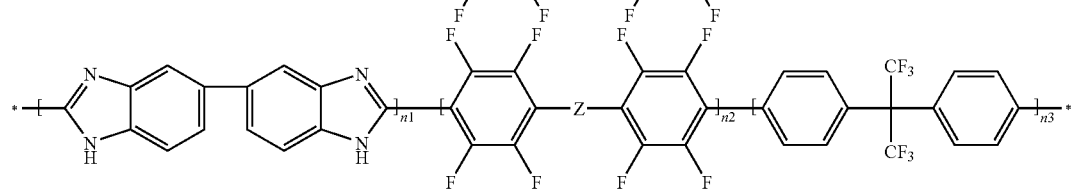

wherein n represents a relative molar amount of the azole second repeating unit and may range from 0 to 0.99. In the last five formulas above, Z represents a linker and n1, n2 and n3 represent the relative molar amount of the indicated subunit of the azole second repeating unit such that n1+n2+n3=n, or in the case of the formulas that contain only n1 and n2, n1+n2=n.

The azole second repeating unit may be represented by Formula 2 below:

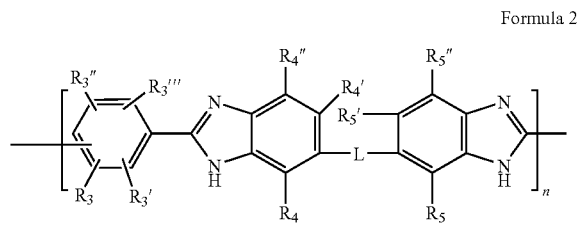

Formula 2

In Formula 2, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring;

L represents a linker; and n represents a relative molar amount of the azole second repeating unit is a number from 0 to 0.99.

In Formulae 1 and 2, m and n represent relative molar amounts of constituent repeating units of the polyazole wherein the sum of m and n is 1, m is a number from 0.01 to 1, and n is a number from 0 to 0.99. In a specific embodiment, m may be a number from 0.1 to 1, and n may be a number from 0 to 0.9.

In Formulae 1 and 2, m:n may be a molar mixing ratio of the first repeating unit to the second repeating unit.

If the polyazole includes both the first repeating unit of Formula 1 and the second repeating unit of Formula 2, m may be a number from 0.1 to 0.9, and n may be a number from 0.1 to 0.9.

Examples of the second repeating unit of Formula 2 include a repeating unit represented by Formula 2a or a repeating unit represented by Formula 2b.

Formula 2a

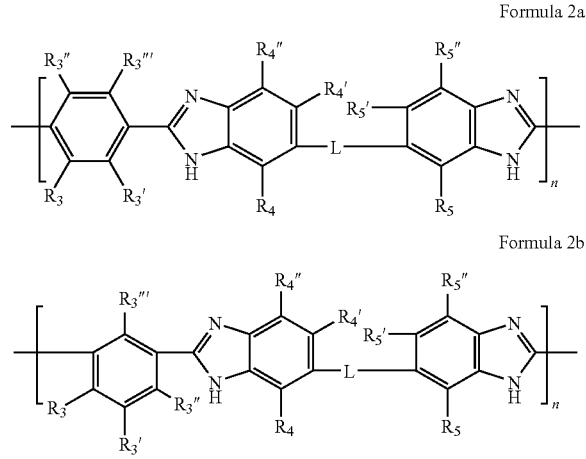

Formula 2b

In Formulae 2a and 2b, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring, L represents a linker; and n represents the relative molar amount of the azole second repeating unit and is a number from greater than 0 to 0.99.

In Formulas 2, 2a and 2b, L may be a chemical bond, —CH$_2$—, —C(CH$_3$)$_2$—, or —C(CF$_3$)$_2$—

Examples of the repeating unit of Formula 1 include repeating units represented by the following formulae:

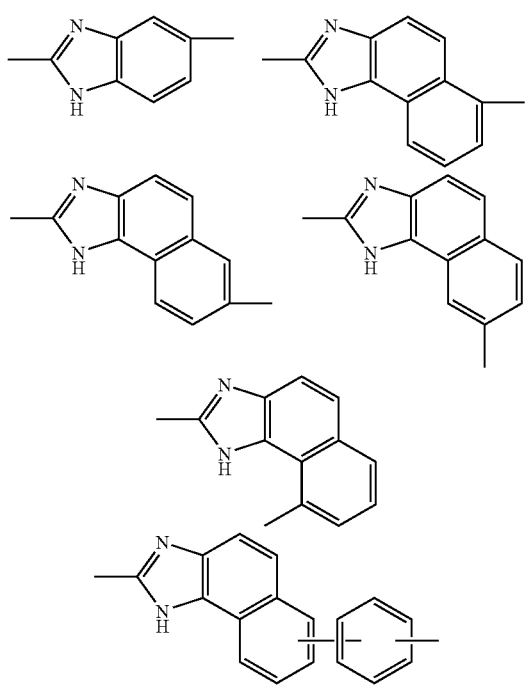

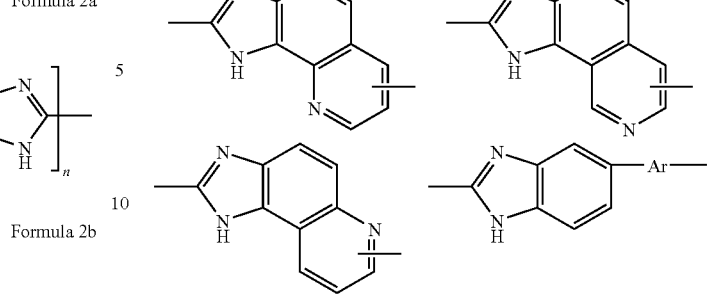

In the above formula, Ar may be selected from among the following groups.

As non-limiting examples, the polyazole may include both the first repeating unit of Formula 1 and the second repeating unit of Formula 2, wherein the amount of the second repeating unit of Formula 2 may be in the range of about 0.25 to about 4 moles based on 1 mole of the first repeating unit of Formula 1.

A mixing ratio (for example, by mole) of the first repeating unit of Formula 1 to the second repeating unit of Formula 2 may be in the range of about 1:9 to about 9:1, for example, from about 8:2 to about 2:8. In this regard, the mixing ratio of the first repeating unit to the second repeating unit may be 8:2, 5:5, or 2:8.

The polyazole may be a homopolymer exclusively containing the repeating unit of Formula 1. That is, assuming that m and n represent the relative molar amount of the first repeating unit and the azole second repeating unit, respectively, in the polyazole such that m+n=1, in the embodiment in which the polyazole is a homopolymer exclusively containing the repeating unit of Formula 1, m=1 and n=0. The cross-linked polyazole prepared using the polyazole may have strong mechanical strength and physical and chemical stabilities required for use in fuel cell electrolyte membranes, due to a high degree of polymerization of the polyazole and polymerization with benzoxazine-based monomers.

Thus, an electrolyte membrane including the polyazole composition or the cross-linked polyazole may have a strong trapping ability for phosphoric acid, and thus may exhibit improved ability to retain phosphoric acid in a wide temperature range. In addition, the electrolyte membrane has a stability to phosphoric acid, and thus exhibit a long-term durability.

The polyazole may be a copolymer including the first repeating unit of Formula 1 and the second repeating unit of Formula 2. In this regard, the polyazole may be a block copolymer including the first repeating unit of Formula 1 and the second repeating unit of Formula 2. The block copolymer may function as a support to retain a structure of the electrolyte membrane due to a rigid structure of the first repeating unit of Formula 1, and may improve mechanical strength of the electrolyte membrane due to a high degree of polymerization of the second repeating unit of Formula 2.

Thus, a polyazole composition prepared from the block copolymer and a cross-linked polyazole prepared from the composition may improve a long-term durability of the electrolyte membrane, and may have excellent ability to retain phosphoric acid and proton conductivity, due to affinity to the phosphoric acid of the benzoxazine-based monomer and a strong acid tapping ability.

The polyazole may be, for example, poly(2,2-(m-phenylene)-5,5-bibenzimidazole)-poly(2,5-benzimidazole) block copolymer (pPBI-ABPBI block copolymer). A ratio of pPBI to ABPBI may be in the range of about 1:9 to about 9:1. For example, the ratio of pPBI to ABPBI may be in the range of about 8:2 to about 2:8, or about 8:2, about 5:5, or about 2:8.

The electrolyte membrane described above is suitable for use in high-temperature, non-humidified fuel cells.

The polyazole may have a degree of polymerization of about 1 to about 900, for example, about 10 to about 900, or about 20 to about 900.

As a specific, non-limiting example, the polyazole may be a compound represented by Formula 3 below.

C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein R1 and R2 may be linked to form a C4-C20 carbon ring or a C3-C20 hetero ring, L represents a linker;

n represents a relative molar amount and is a number from 0 to 0.99, wherein m+n=1; and k represents a degree of polymerization and is a number from 10 to 300.

Examples of the polyazole include a compound represented by Formula 4 below and a compound represented by Formula 5 below.

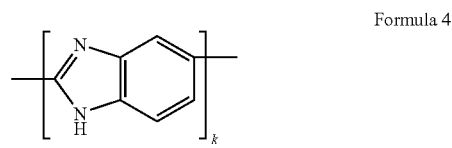

Formula 4

In Formula 4, k represents a degree of polymerization and is a number from 10 to 300.

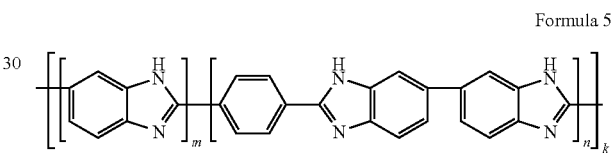

Formula 5

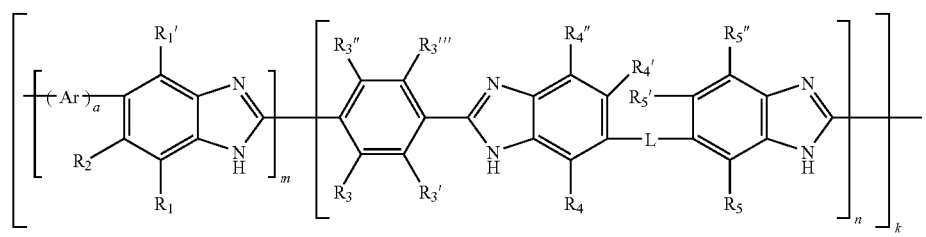

Formula 3

In Formula 3, $R_1$, $R_1'$ and $R_2$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring, Ar is a substituted or unsubstituted C6-C20 arylene group or a substituted or unsubstituted C3-C20 heteroarylene group.

m represents a relative molar amount and is a number from 0.01 from 1.

a is 0 or 1;

R3, R3', R3", R3''', R4, R4', R4", R5, R5', and R5" are each independently a hydrogen atom, an unsubstituted or substituted C1-C20 alkyl group, an unsubstituted or substituted In Formula 5, m represents a relative molar amount and is a number from 0.01 to 1, for example, 1 or a number from 0.1 to 0.9; and n represents a relative molar amounts and is a number from 0 to 0.99, for example, 0 or a number from 0.1 to 0.9, wherein m+n=1 and k is a number from 10 to 300.

In the polyazole composition, the amount of the polyazole may be in the range of about 40 parts to about 210 parts by weight, based on 100 parts by weight of the benzoxazine-based monomer.

When the amount of the polyazole is within this range, the polyazole composition and the cross-linked polyazole obtained from the composition may have excellent mechanical properties.

The benzoxazine-based monomer may be at least one compound selected from the group consisting of compounds represented by Formulae 6 through 11 below, but is not limited thereto.

Formula 6

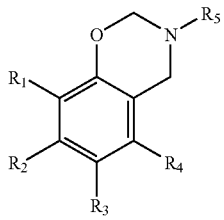

In Formula 6, $R_1$ through $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_6$-$C_{20}$ carbon ring group, a substituted or unsubstituted $C_6$-$C_{20}$-carbocyclic alkyl group, a substituted or unsubstituted $C_2$-$C_{20}$ heterocyclic group, a halogen atom, a hydroxyl group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_6$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, Formula 7

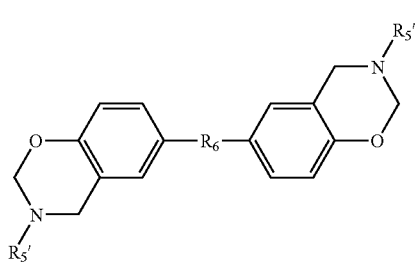

In Formula 7, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

Formula 8

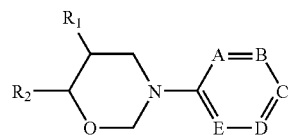

In Formula 8, A, B, C, D and E are all carbon; or one or two of A, B, C, D and E is nitrogen and the others are carbon; and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

Formula 9

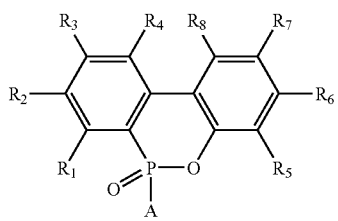

In Formula 9, A is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group and wherein A includes at least one oxazine moiety; and $R_1$ through $R_8$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group.

Formula 10

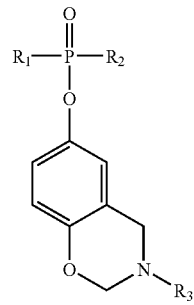

In Formula 10, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 9A below.

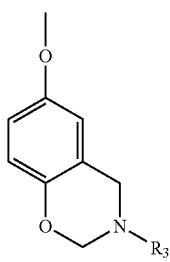

Formula 10A

In Formulae 10 and 10A, $R_3$ is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

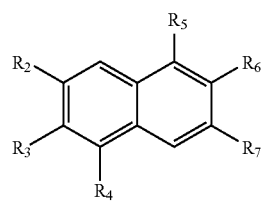

Formula 11

In Formula 11, at least two adjacent groups selected from among $R_2$, $R_3$ and $R_4$ are linked to form a group represented by Formula 2A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_5$, $R_6$ and $R_7$ are linked to form the group represented by Formula 2A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

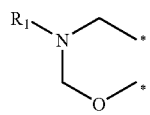

Formula 12A

In Formula 12A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_2$, $R_3$ and $R_4$ of Formula 11 and the at least two adjacent groups selected from among $R_5$, $R_6$ and $R_7$ are linked, respectively.

In Formula 12A, $R_1$ is selected from the groups represented by the following formulae.

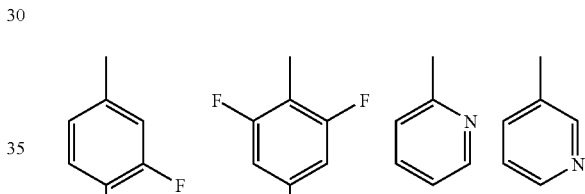

Examples of the benzoxazine-based monomer of Formula 6 may include compounds represented by the following formulae.

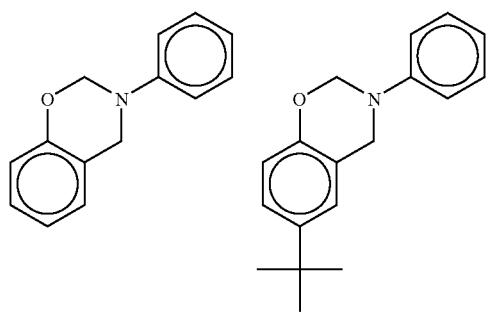

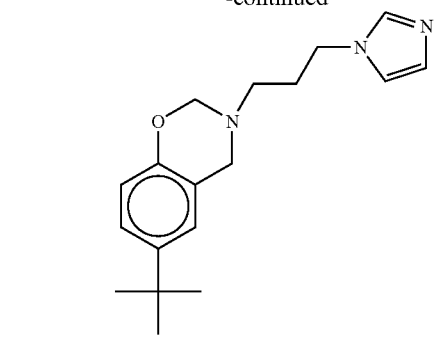
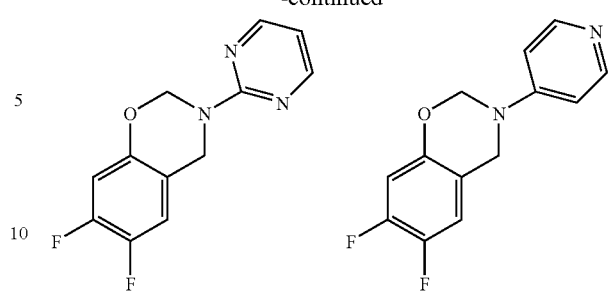
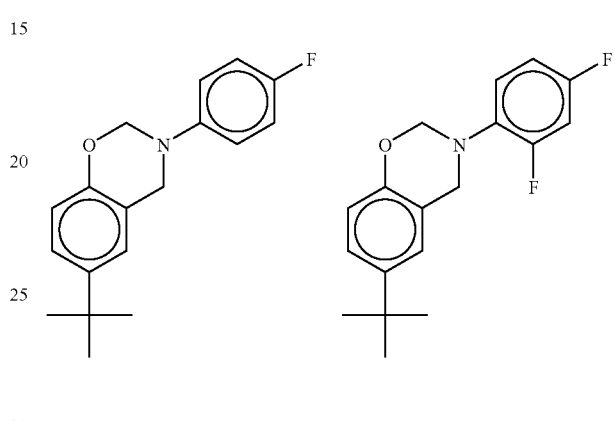
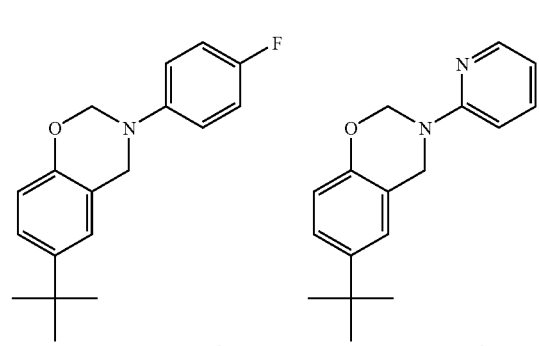
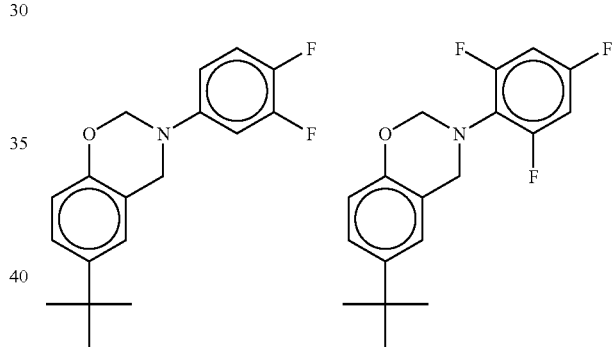
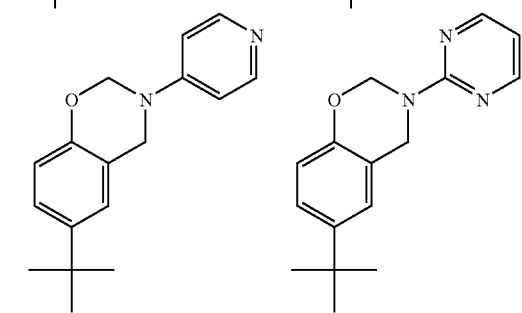
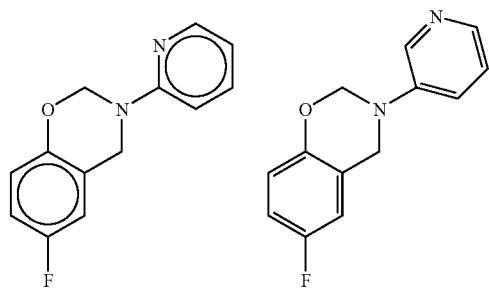

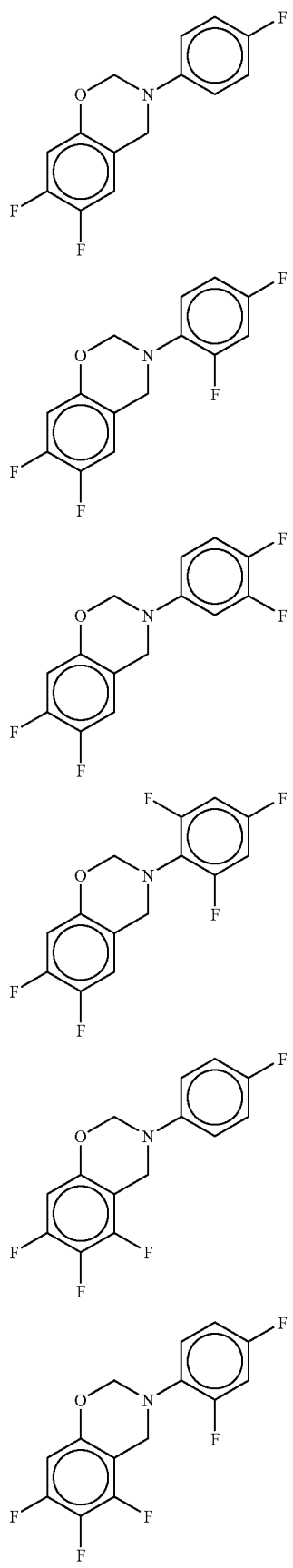
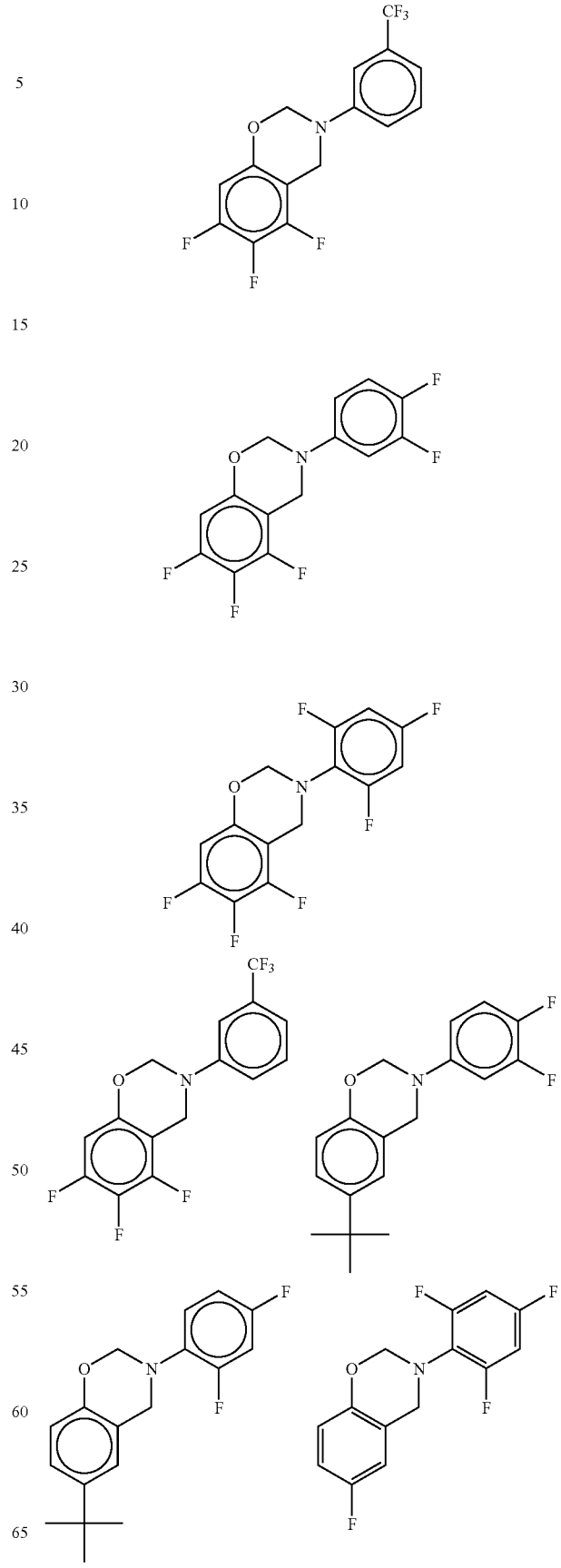

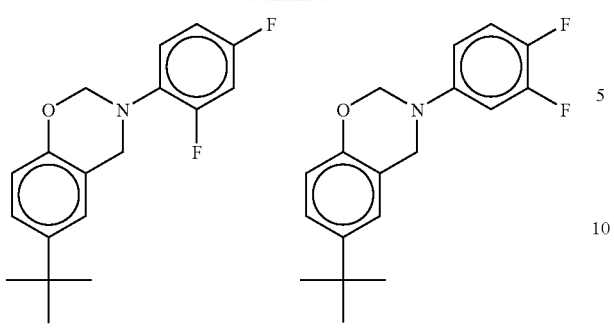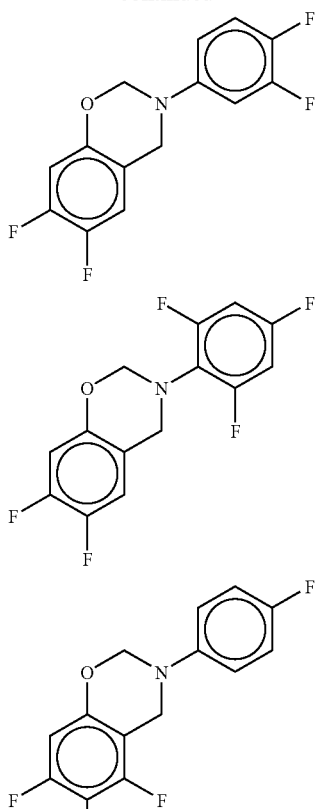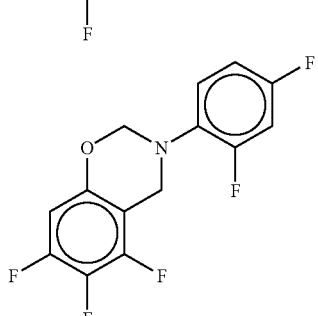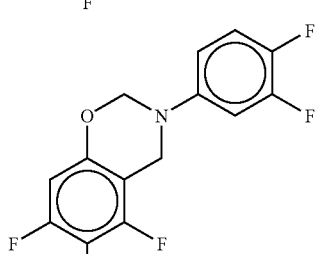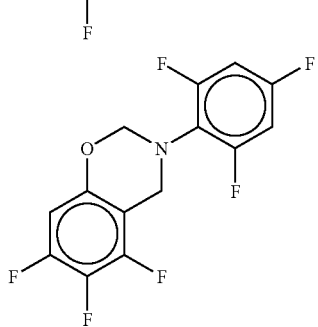

Examples of the benzoxazine-based monomer of Formula 7 may include compounds represented by the following formulae.
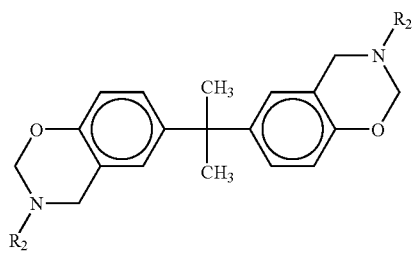
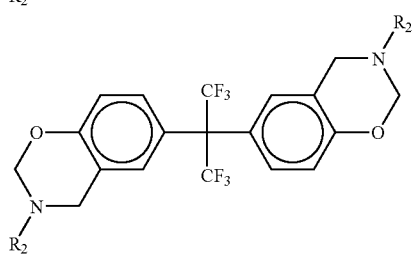
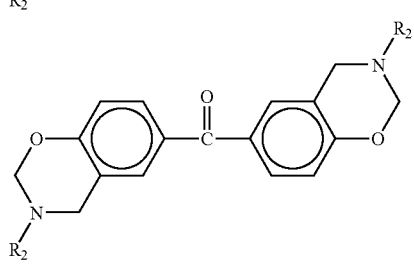
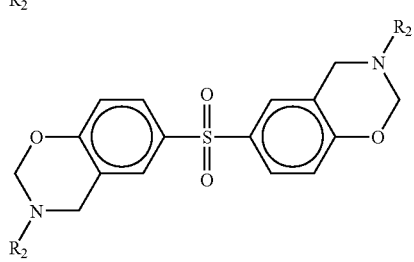
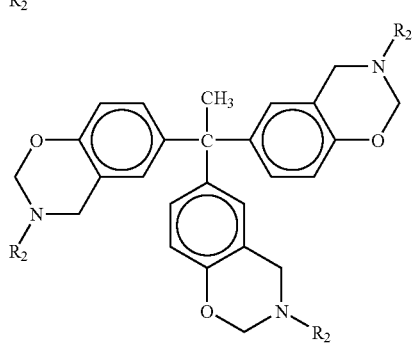
In the formulae above, $R_2$ is a phenyl group, —$CH_2$—$CH$=$CH_2$, or one of the groups represented by the following formulae:
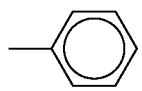 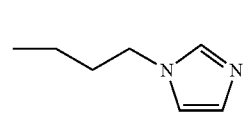
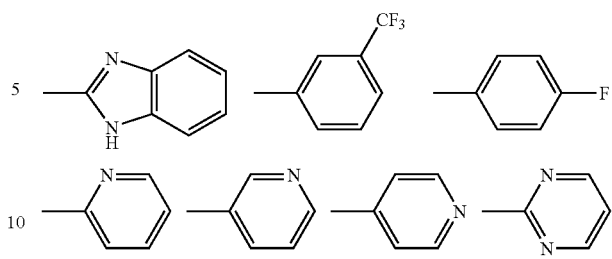
For example, the compound of Formula 7 may be selected from the compounds represented by the following formulae:
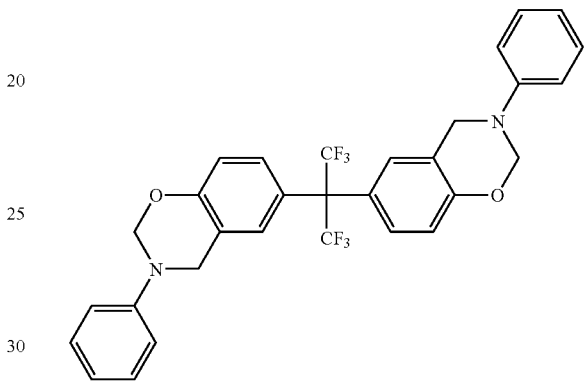
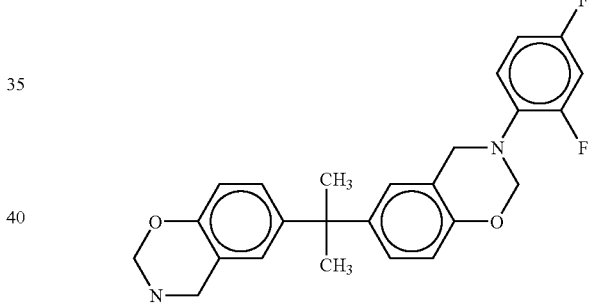
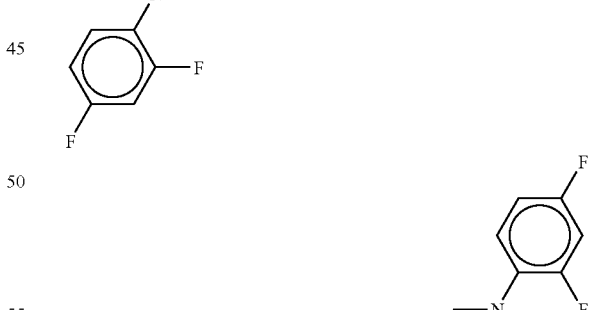
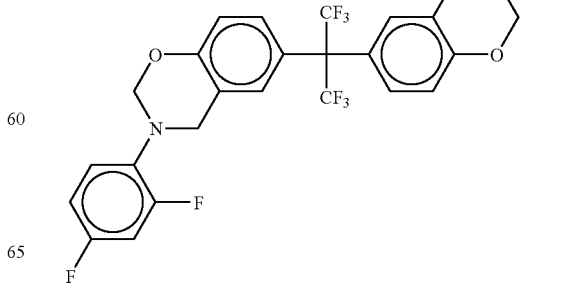

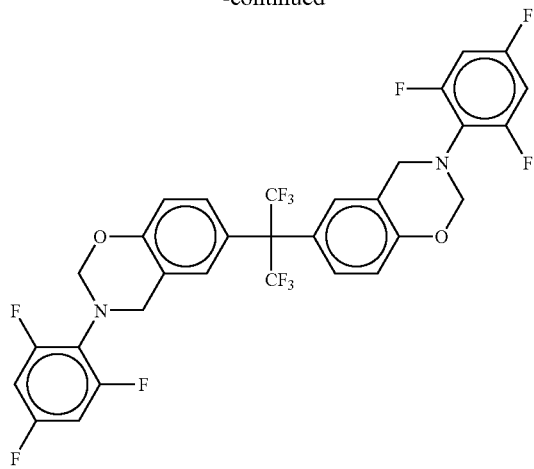

Examples of the benzoxazine-based monomer of Formula 8 include compounds represented by the following formulae.

Formula 8A

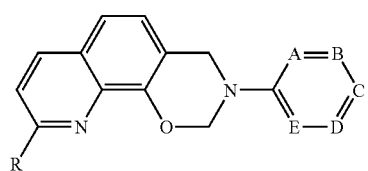

In Formula 8A, R is a hydrogen atom or a C1-C10 alkyl group.

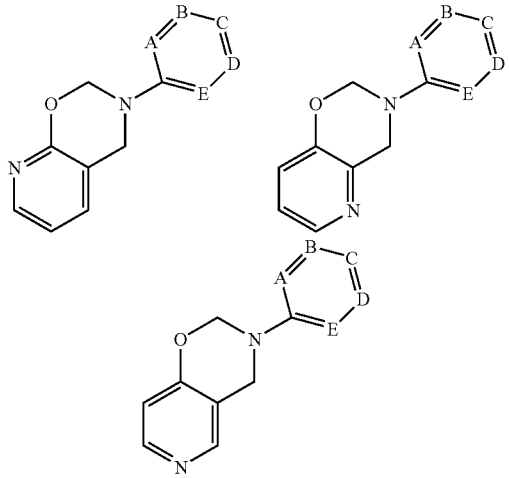

In Formulas 8 and 8A above,

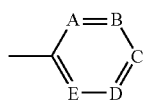

may be selected from the groups represented by the following formulae.

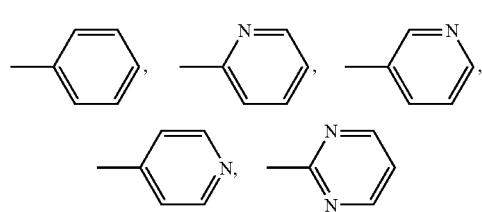

Examples of the benzoxazine-based monomer of Formula 8 may include compounds represented by the following formulae.

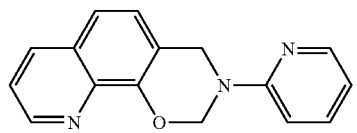
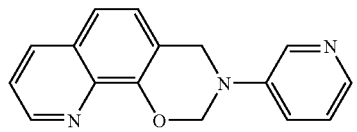
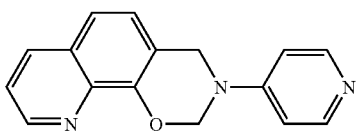
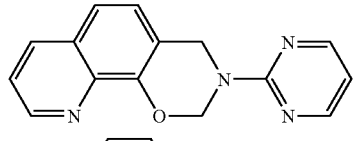
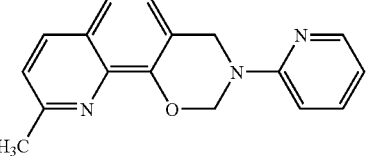
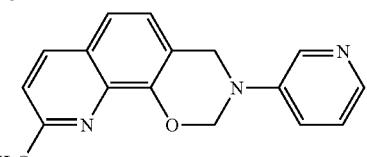
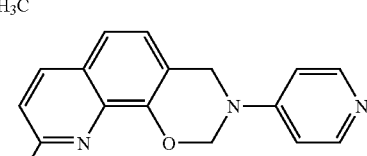
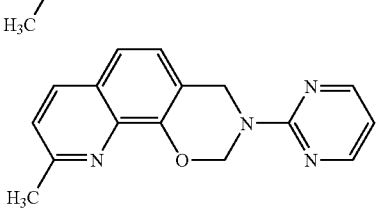

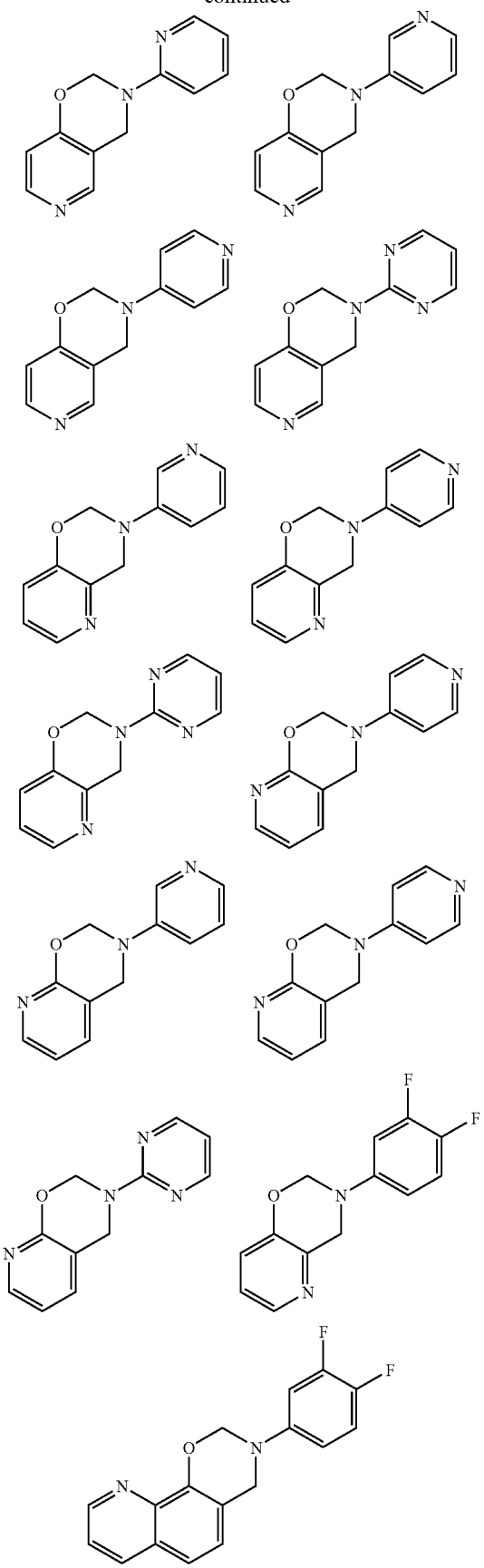

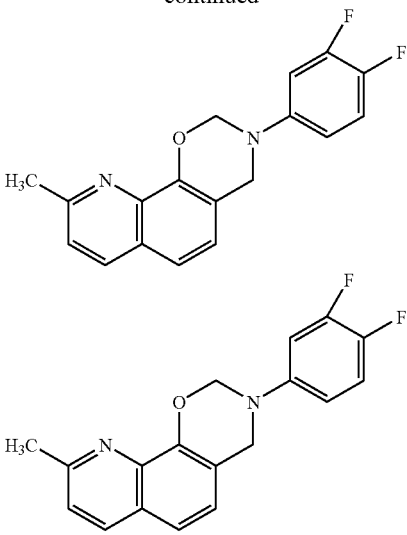

Examples of the benzoxazine-based monomer of Formula 9 include compounds represented by the following formulae.

In Formula 9, A may be selected from the groups represented by Formulae 9A and 9B below.

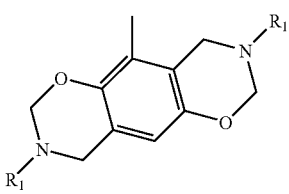

Formula 9A

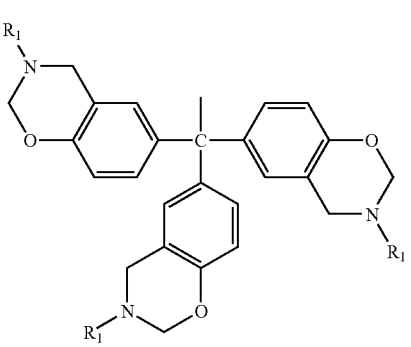

Formula 9B

In Formulae 9A and 9B, $R_1$ is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbon ring group, a halogenated C4-C20 carbon ring group, a C1-C20 heterocyclic group or a halogenated C1-C20 heterocyclic group.

Examples of the benzoxazine-based monomer of Formula 9 containing phosphorous include compounds represented by Formulae 9C and 9D below.

Formula 9C
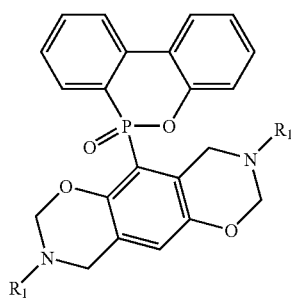
Examples of the benzoxazine-based monomers of Formulae 9 include compounds represented by the following formulae:
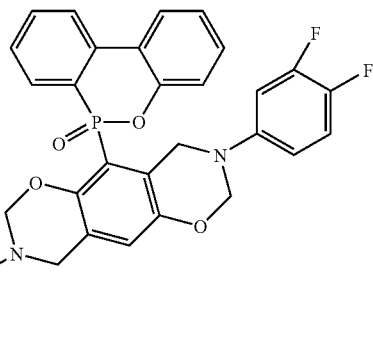
Formula 9D
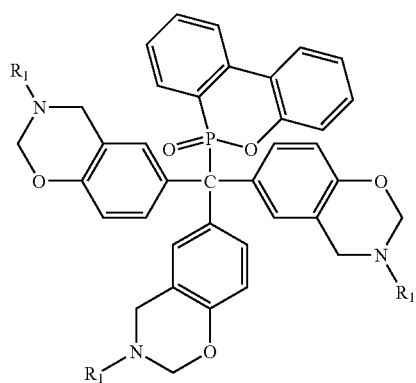
In Formulae 9C and 9D, R₁ may be selected from the groups represented by the following formulae.
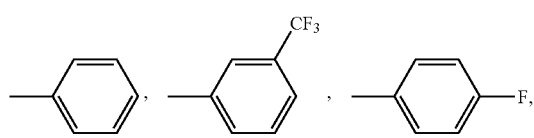
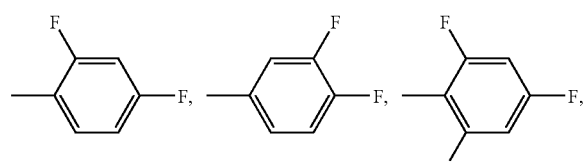
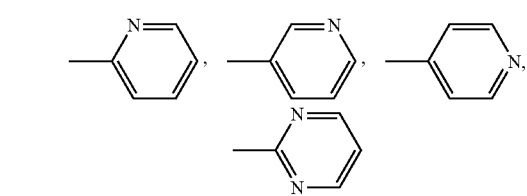
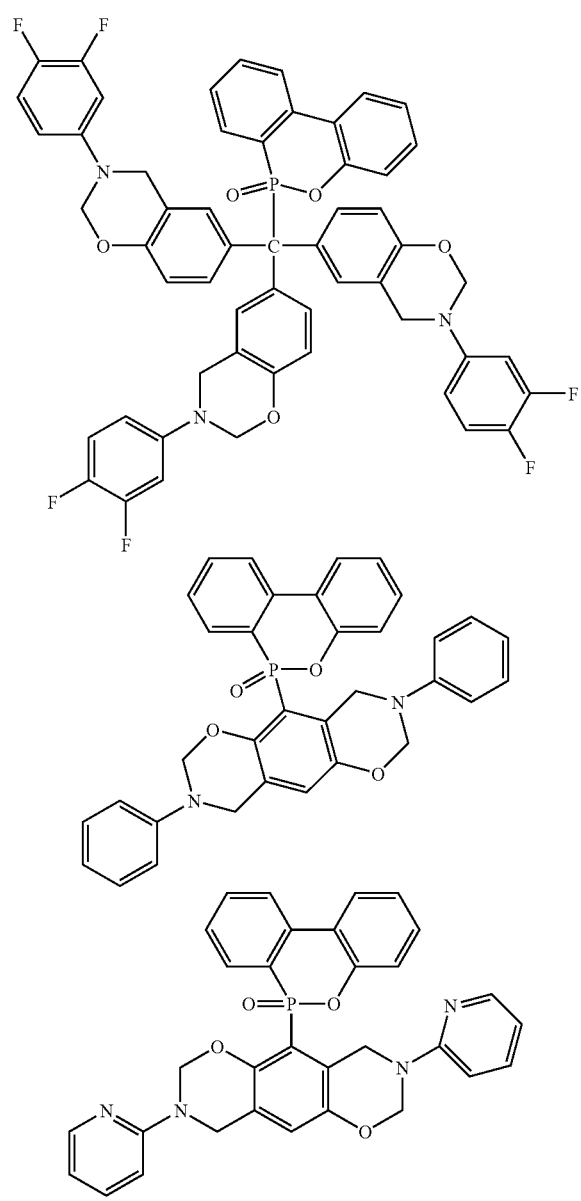

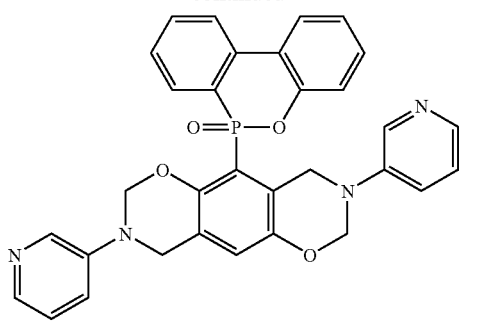

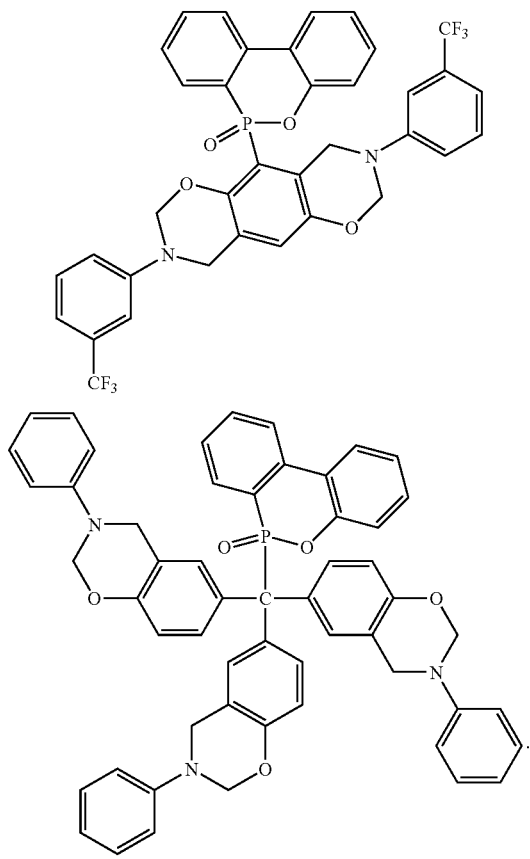

Examples of the benzoxazine-based monomer of Formula 10 include compounds represented by Formulae 10B, 10C and 10D below.

Formula 10B

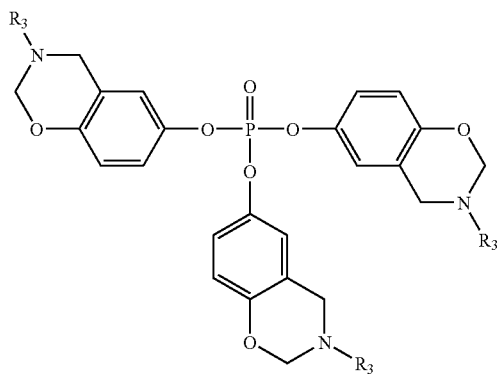

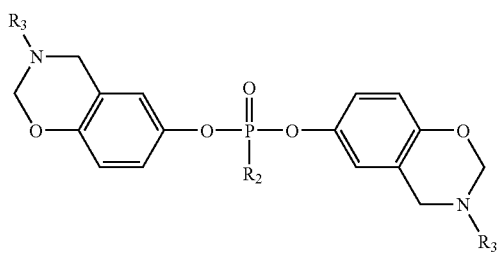

Formula 10C

In Formulae 10B and 10C, $R_2$ is a C1-C10 alkyl group, a C1-C10 alkoxy group, a C6-C10 aryl group, or a C6-C10 aryloxy group; and $R_3$ is selected from the groups represented by the following formulae:

Formula 10D

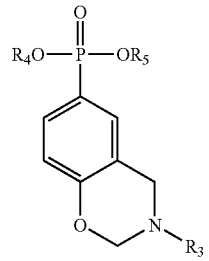

In Formula 10D, $R_4$ and $R_5$ are each independently a C6-C10 aryl group; and $R_3$ is selected from the groups represented by the following formulae:

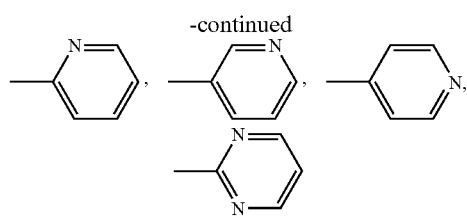
Examples of the compound of Formula 10 include compounds represented by Formulae 10E and 10F below:
Formula 10E
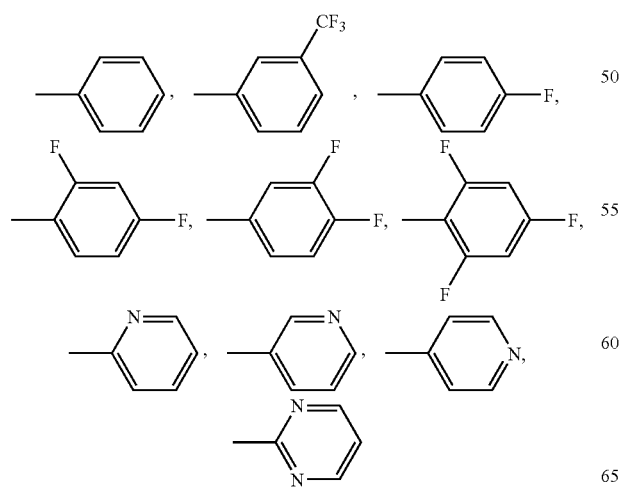
Formula 10F
In Formulae 10E and 10F, $R_3$ is selected from the groups represented by the following formulae.
Examples of the benzoxazine-based monomer of Formula 10 include compounds represented by the following formulae.
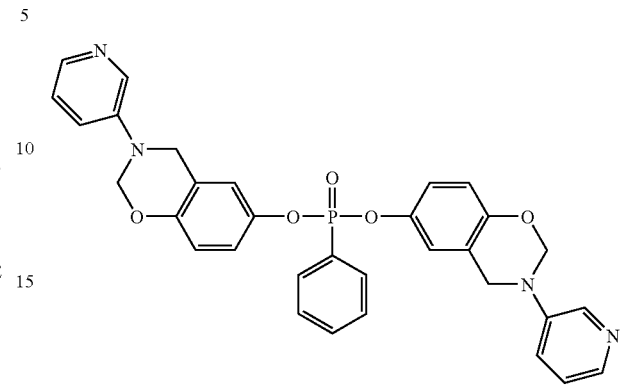
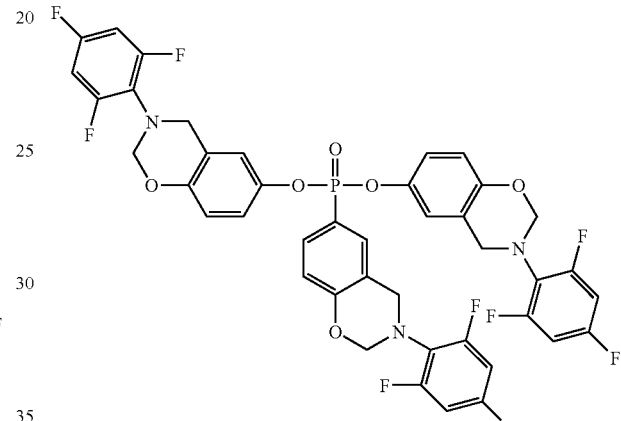
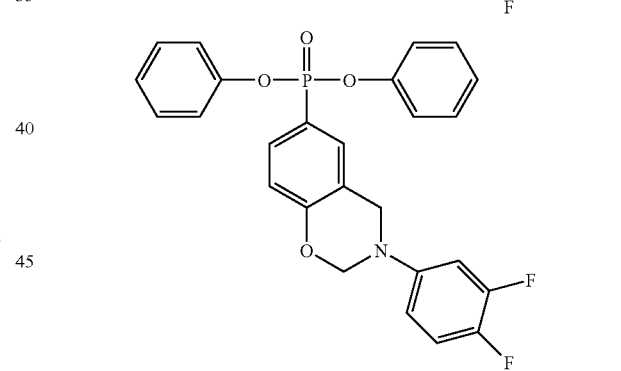
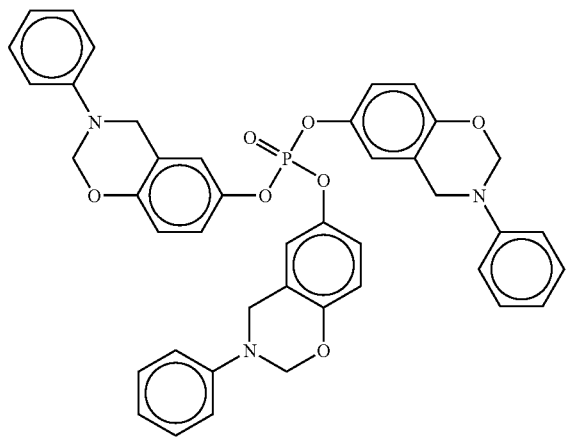

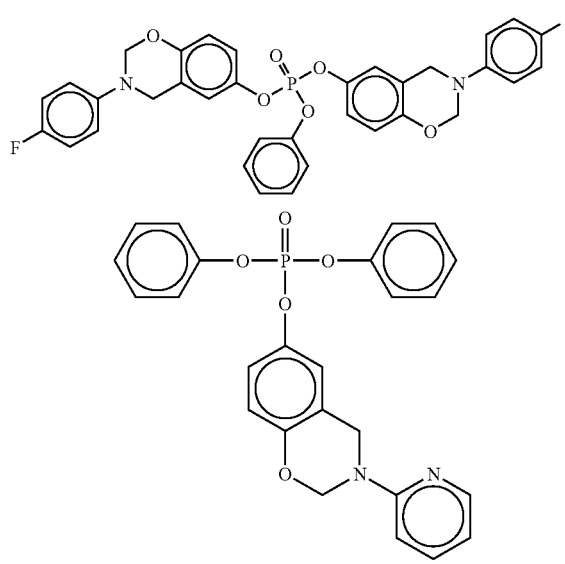
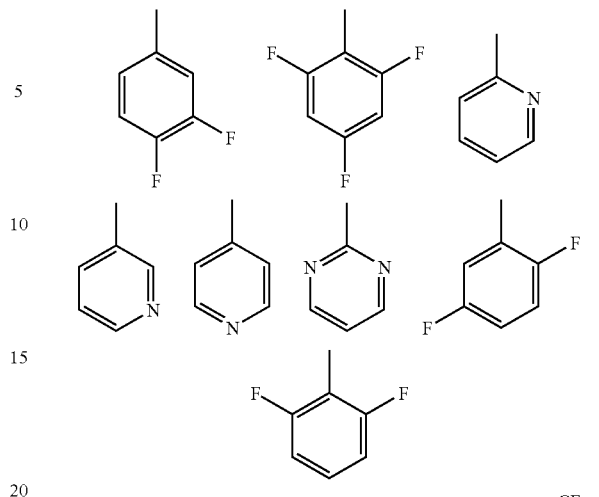
Examples of the benzoxazine-based monomer of Formula 11 include compounds represented by Formulae 11A through 11C.
Formula 11A
Formula 11B
Formula 11C
In Formulae 11A through 11C, $R_1$ is selected from the groups represented by the following formulae.
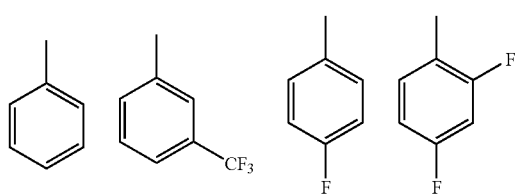
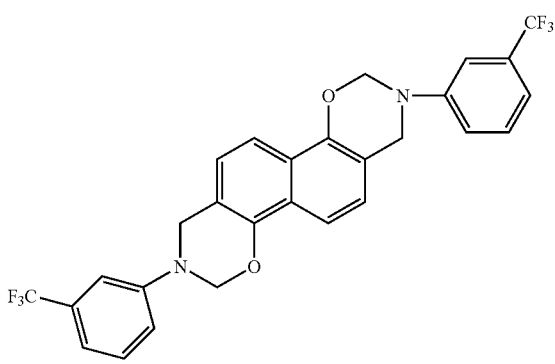

-continued

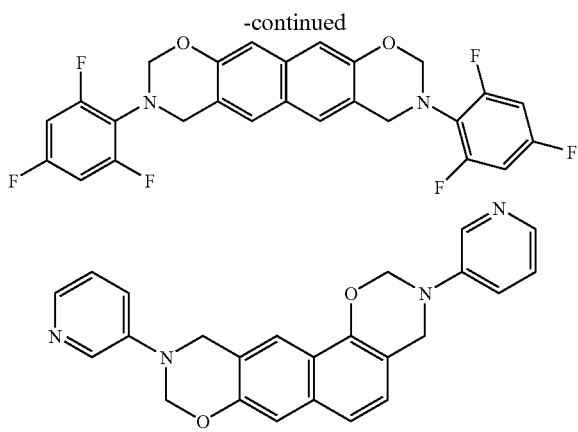

The term "cross-linked polyazole" will now be described below.

When the polyazole composition including the polyazole and the benzoxazine-based monomer is thermally treated, the benzoxazine-based monomer is polymerized into a polymer of the benzoxazine-based monomer, and subsequently a copolymerized product, a cross-liked product, or a copolymerized and cross-linked product of at least one of the polymer of the benzoxazine-based monomer and the benzoxazine-based monomer and the polyazole is obtained.

Hereinafter, a method of preparing the cross-linked polyazole is described.

The polyazole including the first repeating unit of Formula 1 and the azole second repeating unit having at least one amino group, the benzoxazine-based monomer and a phosphoric acid-based material are mixed. (In an embodiment in which the azole second repeating unit having at least one amino group is not present, that is, in an embodiment in which m=1 and n=0, it is to be understood that the description of mixing the polyazole including the first repeating unit of Formula 1 and the azole second repeating unit having at least one amino group, the benzoxazine-based monomer and a phosphoric acid-based material refers to mixing a polyazole including only the first repeating unit of Formula 1, the benzoxazine-based monomer and a phosphoric acid-based material.)

The phosphoric acid-based material may be at least one material selected from the group consisting of polyphosphoric acid, phosphonic acid ($H_3PO_3$), ortho-phosphoric acid ($H_3PO_4$), gyro-phosphoric acid ($H_4P_2O_7$), triphosphoric acid ($H_5P_3O_{10}$), meta-phosphoric acid, and a derivative thereof. For example, the phosphoric acid-based material may be ortho-phosphoric acid.

The concentration of the phosphoric acid-based material may be in the range of about 90 to about 100 wt %, for example, about 95 to about 100 wt %, or about 98 to about 100 wt %.

Examples of the polyphosphoric acid include known phosphoric acids, for example, available from Riedel-de Haen Inc. The concentration of the polyphosphoric acid, which is represented by $H_{n+2}P_nO_{3n+1}$ (n>1), may be at least 83%, calculated as $P_2O_5$ (by acidimetry).

The polyazole including the first repeating unit of Formula 1 and the azole second repeating unit having at least one amino group may be prepared through polymerization using a material that may generate phosphoric acid when hydrolyzed. This material may be used as a solvent.

Polyphosphoric acid may be used as the material that may generate phosphoric acid when hydrolyzed. However, the present invention is not limited thereto.

If the phosphoric acid-based material is added to the polyazole and stirred at a temperature of 100-160° C. prior to being mixed with the benzoxazine-based monomer, the polyazole and the benzoxazine-based monomer may be uniformly and thoroughly mixed together.

The amount of the phosphoric acid-based material may be in the range of about 100 to about 50000 parts by weight based on 100 parts by weight of the polyazole.

Next, the mixture is thermally treated to polymerize the polyazole and the benzoxazine-based monomer.

The thermal treating is performed at a temperature of about 60 to about 250° C., for example, about 100 to about 220° C. When the thermal treating is performed in this temperature range, the resulting cross-linked polyazole may have excellent mechanical properties.

Polymerization (cross-linking and/or copolymerization) between the polyazole and the benzoxazine-based monomer occurs through the thermal treatment.

A benzimidazole-based homopolymer including the repeating unit of Formula 1 may be prepared through a reaction in Reaction Scheme 1 below.

Reaction Scheme 1

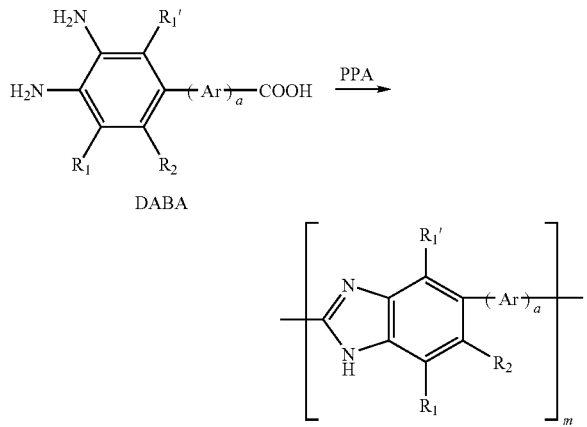

wherein $R_1$, $R_1'$ and $R_2$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring, Ar is a substituted or unsubstituted C6-C20 arylene group or a substituted or unsubstituted C3-C20 heteroarylene group;

m represents a relative molar amount of the first repeating unit, and since in this example, the product is a homopolymer, m=1; and a is 0 or 1.

Initially, 3,4-diaminobenzoic acid (DABA) is added into a material that may generate phosphoric acid when hydrolyzed, and is then dissolved at a temperature of 100-160° C. Polyphosphoric acid (PPA) may be used as the material that may generate phosphoric acid when hydrolyzed. The amount of the polyphosphoric acid may be in the range of about 1000 parts to about 4000 parts by weight, based on 100 part by weight of DABA.

The mixture is polymerized by being thermally treated at a temperature of 60-250° C., for example, 100-220° C., to obtain poly(2,5-benzimidazole) (ABPBI) including the repeating unit of Formula 1. When the thermal treating is performed within this temperature range, reactivity of the polymerization may be high, and a yield of the reaction product may be good.

The polyazole including the first repeating unit of Formula 1 and the second repeating unit of Formula 2 may be, for example, a block copolymer. The block copolymer may be prepared according to a method illustrated in Reaction Scheme 2.

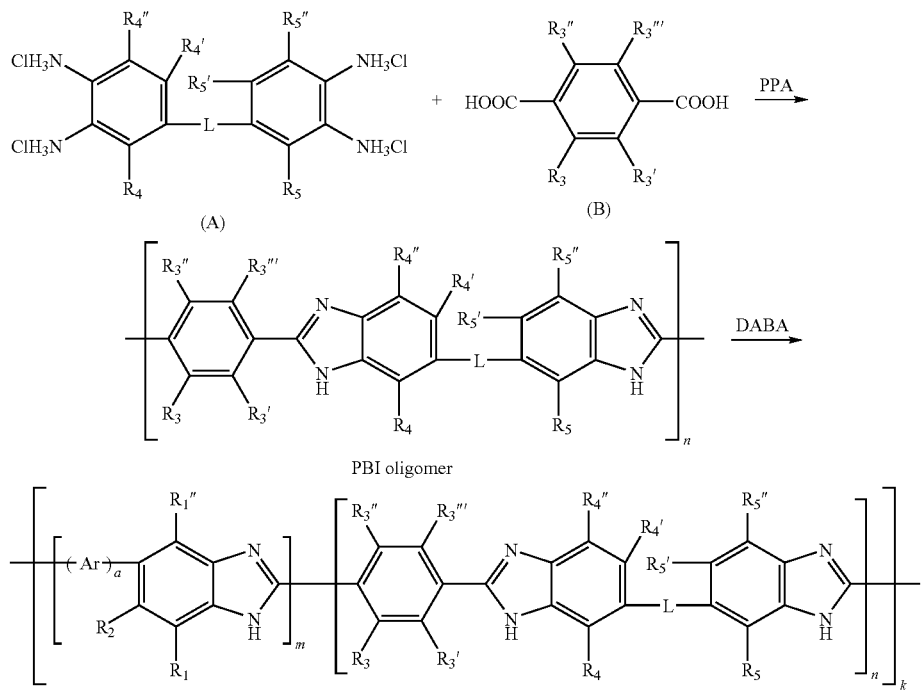

wherein $R_1$, $R_1'$ and $R_2$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring, Ar is a substituted or unsubstituted C6-C20 arylene group or a substituted or unsubstituted C3-C20 heteroarylene group;

m represents a relative molar amount and is a number from 0.01 from 1;

n represents a relative molar amount and is a number from 0 to 0.99, wherein m+n=1;

L represents a linker:

a is 0 or 1; and k is a number from 10 to 300.

Initially, the material that may generate polyphosphoric acid when hydrolyzed is mixed with Compound (A) and stirred at a temperature of 100-160° C. The amount of the material that may generate polyphosphoric acid when hydrolyzed may be in the range of about 1000 to about 4000 parts by weight based on 100 parts by weight of Compound (A).

For example, polyphosphoric acid (PPA) may be used as the material that may generate phosphoric acid when hydrolyzed.

Then, Compound (B) is added to the mixture and reacted at a temperature of 60-250° C., for example, 100-220° C., while stirring to obtain an oligomer. The amount of Compound (B) may be in the range of about 0.9 to about 1.15 mole based on 1 mole of Compound (A).

The temperature of a mixture including the oligomer is adjusted to a temperature of 60-250° C., for example, about 100 to about 220° C., and DABA in Reaction Scheme 1 is added to the mixture and reacted at a temperature of 220-240° C.

When the polymerization is completed, the block copolymer of Formula 3 is obtained.

For example, if the polyazole including the first repeating unit of Formula 1 and the azole second repeating unit having at least one amino group is poly(2,5-benzimidazole), the poly(2,5-benzimidazole) may be prepared by mixing 3,4-diaminobenzoic acid and polyphosphoric acid at a temperature of about 100 to about 160° C. to obtain a mixture and thermally treating the mixture at a temperature of about 60 to about 250° C., for example, about 100 to about 220° C.

Alternatively, if the polyazole including the first repeating unit of Formula 1 and the azole second repeating unit having at least one amino group is poly(2,2-(m-phenylene)-5,5-bibenzimidazole)-poly(2,5-benzimidazole) block copolymer, the poly(2,2-(m-phenylene)-5,5-bibenzimidazole)-poly(2,5-benzimidazole) block copolymer may be prepared by: mixing biphenyl-3,3',4,4'-tetraaminetetrahydrochloride and polyphosphoric acid at a temperature of about 100 to about 160° C. to obtain a mixture, and thermally treating the mixture at a temperature of about 60 to about 250° C., for example, about 100 to about 220° C., to obtain a (2,2-(m-phenylene)-5,5-bibenzimidazole) oligomer; and mixing the (2,2-(m-phenylene)-5,5-bibenzimidazole) oligomer with 3,4-diaminobenzoic acid and thermally treating the mixture at a temperature of about 60 to about 250° C., for example, about 100 to about 220° C.

A method of preparing an electrolyte membrane by using the polyazole will be described below.

Initially, the polyazole including the first repeating unit of Formula 1 and the azole second repeating unit having at least one amino group, the phosphoric acid-based material, and the benzoxazine-based monomer are mixed together and then stirred. (In an embodiment in which the azole second repeating unit having at least one amino group is not present, that is, in an embodiment in which m=1 and n=0, it is to be understood that the description of mixing the polyazole including the first repeating unit of Formula 1 and the azole second repeating unit having at least one amino group, the benzoxazine-based monomer and a phosphoric acid-based material refers to mixing a polyazole including only the first repeating unit of Formula 1, the benzoxazine-based monomer and a phosphoric acid-based material.)

The amount of the polyphosphoric acid-based material may be in the range of about 100 to about 5000 parts by weight, for example, about 1000 to about 4000 parts by weight, based on 100 parts by weight of the polyazole including the first repeating unit of Formula 1 and the azole second repeating unit.

The polyazole may be mixed first with the phosphoric acid-based material, stirred at a temperature of about 100 to about 160° C., and then mixed with the benzoxazine-based monomer. As a result, the polyazole and the benzoxazine-based monomer may be uniformly and thoroughly mixed together.

The mixture is cast on a substrate and then is thermally treated.

The thermal treating may be performed at a temperature of about 60 to about 250° C., for example, about 100 to about 220° C.

The thermally-treated product is impregnated with the phosphoric acid-based material at room temperature (20° C.). The phosphoric acid-based material may be at least one material selected from the group consisting of polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof. For example, the phosphoric acid-based material may be ortho-phosphoric acid, a 5-30 wt % aqueous phosphoric acid solution, or polyphosphoric acid.

The thermally-treated product may be left in a constant-temperature and constant-humidity condition before being impregnated with the phosphoric acid-based material. In the constant-temperature and constant humidity condition, the phosphoric acid-based material, such as polyphosphoric acid, is hydrolyzed.

In the constant-temperature and constant-humidity condition, the temperature may be adjusted to a range of about −20 to about 30° C., and the relative humidity (RH) may be adjusted to a range of about 5 to about 50%.

The temperature may be, for example, in the range of about −10° C. to about 15° C., and the relative humidity may be, for example, in the range of about 5 to about 25%. For example, the thermally-treated product may be left at −10° C. and 25% RH for 46 hours or longer to induce slow hydrolysis of the polyphosphoric acid.

When the temperature is within the above range, hydrolytic reactivity of the polyphosphoric acid may not be lowered, and thus a hydrolysis rate thereof may be high.

When the relative humidity is within the above range, the hydrolytic reactivity of the polyphosphoric acid may not be lowered, and the electrolyte membrane may have excellent physical properties.

Finally, the reaction product is dried in a vacuum at room temperature (20° C.) to obtain the electrolyte membrane for a fuel cell, including the cross-linked polyazole.

According to another aspect of the present invention, an electrode for a fuel cell includes the polyazole composition or the cross-linked polyazole and a catalyst.

Oxygen permeation can be improved, and wettability of phosphoric acid ($H_3PO_4$) and thermal stability can be improved in the electrode even when air is used in a cathode. Thus, a fuel cell including the electrode may operate in high-temperature, non-humidified conditions, and may provide improved thermal stability and power generation.

The catalyst may be platinum (Pt), an alloy or a mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). The Pt, the alloy, or the mixture may be supported on a carbonaceous support. For example, at least one catalyst selected from the group consisting of Pt, a PtCo alloy, a PtRu alloy, and any mixtures thereof, may be supported on a carbonaceous support.

The electrode may further include a binder conventionally used in the manufacture of an electrode for a fuel cell.

The binder may be at least one selected from the group consisting of poly(vinylidenefluoride), polytetrafluoroethylene (PTFE), tetrafluoroethylene-hexafluoroethylene copolymer, and perfluoroethylene.

The amount of the binder may be in the range of about 0.001 parts to about 0.5 parts by weight, based on 1 part by weight of the catalyst. When the amount of the binder is within this range, the electrode catalyst layer may have strong binding ability to the support.

A method of manufacturing an electrode for a fuel cell as described above will now be described.

First, a catalyst is dispersed in a solvent to obtain a dispersion solution. The solvent may include N-methylpyrrolidone (NMP), dimethylformamide (DMAc), or the like. The amount of the solvent may be in the range of about 1 part to about 10 parts by weight based on 1 part by weight of the catalyst.

A mixture of the polyazole including the first repeating unit of Formula 1 and the azole second repeating unit, the benzoxazine-based monomer, a binder, a solvent, and a polyphosphoric acid-based is added to the dispersion solution and then mixed while stirring. (In an embodiment in which the azole second repeating unit having at least one amino group is not present, that is, in an embodiment in which m=1 and n=0, it is to be understood that the description of mixing the polyazole including the first repeating unit of Formula 1 and the azole second repeating unit having at least one amino group, the benzoxazine-based monomer and a phosphoric acid-based material refers to mixing a polyazole including only the first repeating unit of Formula 1, the benzoxazine-based monomer and a phosphoric acid-based material.)

The solvent may include N-methylpyrrolidone (NMP), dimethylacetamide (DMAc), or the like.

The amount of the phosphoric acid-based material may be in the range of about 1 to about 10 parts by weight based on 100 parts by weight of the polyazole.

The resultant mixture is coated on the surface of a carbon support, to complete the manufacture of the electrode. Herein, the carbon support may be fixed on a glass substrate to facilitate the coating. A method of coating the mixture is not particularly limited. Examples of the coating method include coating using a doctor blade, bar coating, and screen printing.

The coated resultant is dried at a temperature in the range of about 20 to about 150° C., to remove the solvent. The drying time may vary according to the drying temperature, and may be in the range of about 10 to about 60 minutes.

The electrode may further include a proton conductor.

Examples of the proton conductor include polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof. The concentration of the proton conductor may be at least 80 wt %, 90 wt %, 95 wt %, or 98 wt %. For example, when a phosphoric acid is used, an 80 wt % aqueous phosphoric acid solution may be used. The impregnation time of the phosphoric acid may be from about 2.5 to about 14 hours at about 80° C.

The amount of the proton conductor may be in the range of about 10 parts to about 1,000 parts by weight, based on 100 parts by weight of the total weight of the electrode.

As described above, the phosphoric acid may be used during the manufacture of the electrode. Alternatively, after the completion of the manufacture of the electrode, the complete electrode may be subjected to secondary impregnation with phosphoric acid. In this regard, a 5~30 wt % aqueous phosphoric acid solution may be used as the phosphoric acid.

According to another aspect of the present invention, performance of a fuel cell is maximized by optimizing materials for forming its electrolyte membrane and/or materials for forming its electrode.

A method of manufacturing a fuel cell including the electrode described above will be described below.

Any electrolyte membrane that is commonly used in fuel cells may be used herein. Alternatively, the electrolyte membrane including the polyazole composition or the cross-linked polyazole may be used.

The electrolyte membrane including the polyazole composition or the cross-linked benzimidazole polymer may lower an interfacial resistance between the electrode and the electrolyte membrane, thereby maximizing performance of the fuel cell.

Examples of the electrolyte membrane that is commonly used in fuel cells include a polybenzimidazole electrolyte membrane, a polybenzoxazine-polybenzimidazole copolymer electrolyte membrane, a porous polytetrafluoroethylene (PTFE) membrane, and the like.

A method of manufacturing a membrane and electrode assembly (MEA) of a fuel cell will now be described in detail. The term "membrane-electrode assembly" refers to a structure in which an electrolyte membrane is disposed between two electrodes, each electrode including a catalyst layer and a diffusion layer.

The MEA may be formed by positioning the electrodes, which include respective catalyst layers, on opposite sides of the electrolyte membrane, joining them all together at a high temperature and high pressure, and then joining a diffusion layer (fuel diffusion layer) to each of the catalyst layers.

The joining may be performed under a pressure of about 0.1 to about 3 ton/cm², for example, a pressure of about 1 ton/cm², at a temperature at which the electrolyte membrane is softened.

Next, bipolar plates are respectively installed on opposite sides of the MEA, to complete the manufacture of the fuel cell. The bipolar plates may have grooves for supplying fuel and may function as current collectors.

The fuel cell may be used as a polymer electrolyte membrane fuel cell (PEMFC), but is not limited thereto.

One or more exemplary embodiments include an electrode for fuel cells, including a reduced activation time and improved cell voltage characteristics with respect to current density; and an electrolyte membrane that exhibits excellent thermal stability at high temperatures and improved acid retention ability.

Substituents in the formulae above may be defined as follows.

Examples of the alkyl group used herein include, but are not limited to, a methyl group, an ethyl group, a propyl group, an isobutyl group, a sec-butyl group, a pentyl group, an iso-amyl group, and a hexyl group, wherein at least one hydrogen atom of the alkyl group may be substituted with a halogen atom, a C1-C20 alkyl group substituted with a halogen atom (for example, $CCF_3$, $CHCF_2$, $CH_2F$ and $CCl_3$), a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group or a C6-C20 heteroarylalkyl group.

Examples of the alkoxy group used herein include a methoxy group, an ethoxy group, and a propoxy group. At least one hydrogen atom in the alkoxy group may be substituted with the same substituent as described above in connection with the alkyl group.

Examples of the alkenyl group used herein include vinylene and allylene. At least one hydrogen atom in the alkenyl group may be substituted with the same substituent as described above in connection with the alkyl group.

An example of the alkynyl group used herein includes acetylene. At least one hydrogen atom in the alkynyl group may be substituted with the same substituent as described above in connection with the alkyl group.

The aryl group used herein may be used alone or in combination, and refers to an aromatic system containing at least one ring. Examples of the aryl group include a phenyl group, a naphthyl group, a tetrahydronaphthyl group, and the like. At least one hydrogen atom of the aryl group may be substituted with the same substituent as described above in connection with the alkyl group.

An example of the aryloxy group used herein includes a phenoxy group. At least one hydrogen atom in the aryloxy group may be substituted with the same substituent as described above in connection with the aryl group.

The heteroaryl group used therein refers to a heterocyclic and aromatic organic compound that includes a heteroatom selected from among nitrogen (N), oxygen (O), phosphorous (P) and sulfur (S). At least one hydrogen atom in the heteroaryl group may be substituted with the same substituent as described above in connection with the alkyl group.

The carbon ring group used herein refers to a non-aromatic ring whose atoms are all carbon, such as a cyclohexyl group. At least one hydrogen atom in the carbon ring group may be substituted with the same substituent as described above in connection with the alkyl group. Here, a C1-C20 alkyl group is not used as the substituent.

The heterocyclic group used herein refers to a ring group including a heteroatom such as N, S, P, or O. An example of the heterocyclic group is pyridyl. At least one hydrogen atom in the heterocyclic group may be substituted with the same substituent as described above in connection with the alkyl group:

Examples of the halogen atom used herein include a fluorine atom, a chlorine atom, a bromine atom, and the like. The term "halogenated" used to define substituents herein means that a substituent includes a halogen atom, such as a fluorine, chlorine, or bromine atom, or includes an organic group containing a halogen atom. In this regard, an example of the organic group is a C1-C20 alkyl group.

With regard to the arylene group, the heteroarylene group, the heteroaryloxy group, the carbon ring group, the heterocyclic alkyl group, the carbocyclic alkyl group, and the heteroarylalkyl used herein, at least one hydrogen atom of these groups may be substituted with the same substituent as described above in connection with the alkyl group.

Hereinafter, one or more embodiments of the present invention will be described in detail with reference to the following examples. These examples are not intended to limit the purpose and scope of the one or more embodiments of the present invention.

Synthesis Example 1A

Preparation of poly(2,5-benzimidazole) (ABPBI) and Cross-Linked Copolymer of PBOA and ABPBI (Cross-Linked PBOA-co-ABPBI Copolymer)

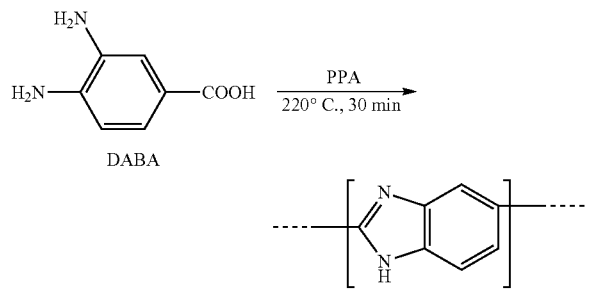

Diaminobenzoic acid (DABA) was added into polyphosphoric acid (PPA) used as a solvent and then completely dissolved at 150° C. The mixture was stirred until a homogeneous solution was obtained, and the temperature was raised to 220° C. and maintained for 30 minutes for polymerization.

When the reaction mixture changed into a high viscosity solution as a result of the polymerization, o-phosphoric acid was added into the solution and then dissolved at 150° C. to prepare Mixture C. As a result of polymerization, a poly(2,5-benzimidazole) (ABPBI) having a number average molecular weight of about 150,000 was obtained.

67 parts by weight of 4FPh2AP, represented by the following formula, as a benzoxazine-based monomer, was added to Mixture C to prepare Mixture A. In Mixture A, the amount of ABPBI reacting with the benzoxazine-based monomer was 33 parts by weight.

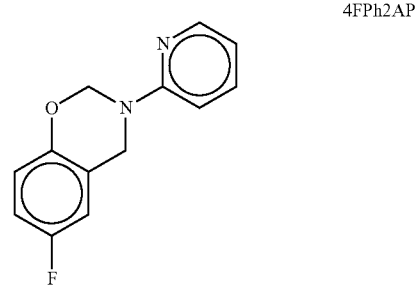

4FPh2AP

After the temperature of Mixture A was slowly raised to a temperature of about 100° C. to about 220° C. (over about 3 hours), Mixture A was thermally treated in a nitrogen gas atmosphere at 220° C. for 1 hour.

Water was added to the reaction mixture to precipitate a solid. The solid was filtered, washed with water and then dried to obtain the PBOA-co-ABPBI copolymer.

Synthesis Example 1B

Preparation of Cross-Linked PBOA-Co-ABPBI Copolymer

A cross-linked PBOA-co-ABPBI copolymer was prepared in the same manner as in Synthesis Example 1A, except that Mixture B was used instead of Mixture A.

The Mixture B was prepared by adding 50 parts by weight of 4FPh2AP to Mixture C. In Mixture B, the amount of ABPBI reacting with the 4FPh2AP was 50 parts by weight.

Synthesis Example 1C

Preparation of Cross-Linked PBOA-co-ABPBI Copolymer

A cross-linked PBOA-co-ABPBI copolymer was prepared in the same manner as in Synthesis Example 1A, except that Mixture D was used instead of Mixture A.

The Mixture D was prepared by adding 33 parts by weight of 4FPh2AP to Mixture C. In Mixture D, the amount of ABPBI reacting with the 4FPh2AP was 67 parts by weight.

Example 1A

Manufacture of Electrolyte Membrane

An electrolyte membrane was manufactured using the cross-linked PBOA-co-ABPBI copolymer of Synthesis Example 1A.

The Mixture A prepared in Synthesis Example 1A was cast on a quart plate and cured in an oven at 100° C. in a nitrogen atmosphere.

The temperature of the oven was slowly raised from about 100° C. to about 220° C. (over about 3 hours) and maintained at 220° C. for 1 hour, and was then slowly cooled to room temperature.

The reaction product was left at −10° C. and a relative humidity (RH) of 25% for 48 hours or longer to slowly induce hydrolysis to form a film.

The film was immersed in an aqueous phosphoric acid solution of about 20 wt % at room temperature for 24 hours to induce secondary hydrolysis. The film was removed from the aqueous phosphoric acid solution, and the phosphoric acid remaining on a surface of the film was also wiped off. Then, the film was dried in a vacuum oven for 24 hours or longer to obtain a cross-linked PBOA-co-ABPBI copolymer electrolyte membrane A. The electrolyte membrane A was manufactured using 67 parts by weight of 4FPh2AP and 33 parts by weight of ABPBI.

Example 1B

Manufacture of Electrolyte Membrane

An electrolyte membrane was manufactured using the cross-linked PBOA-co-ABPBI copolymer of Synthesis Example 1D.

A cross-linked PBOA-co-ABPBI copolymer electrolyte membrane B was manufactured in the same manner as in Example 1A, except that Mixture B prepared in Synthesis Example 1B was used instead of Mixture A prepared in Synthesis Example 1A. The electrolyte membrane B was manufactured using 50 parts by weight of 4FPh2AP and 50 parts by weight of ABPBI.

Example 1C

Manufacture of Electrolyte Membrane

An electrolyte membrane D was manufactured using the cross-linked PBOA-co-ABPBI copolymer of Synthesis Example 1C.

The cross-linked PBOA-co-ABPBI copolymer electrolyte membrane D was manufactured in the same manner as in Example 1A, except that Mixture D prepared in Synthesis Example 1C was used instead of Mixture A prepared in Synthesis Example 1A. The cross-linked PBOA-co-ABPBI copolymer electrolyte membrane D was manufactured using 33 parts by weight of 4FPh2AP and 67 parts by weight of ABPBI.

The structure of the cross-linked PBOA-co-ABPBI copolymer prepared in Synthesis Example 1A was identified using solid state nuclear magnetic resonance (NMR) spectrometry. The results are shown in FIG. 1A.

Infrared (IR) analysis spectra of the cross-linked copolymers of Synthesis Examples 1A through 1C were measured. The results are shown in FIG. 1B.

Figure 1B:
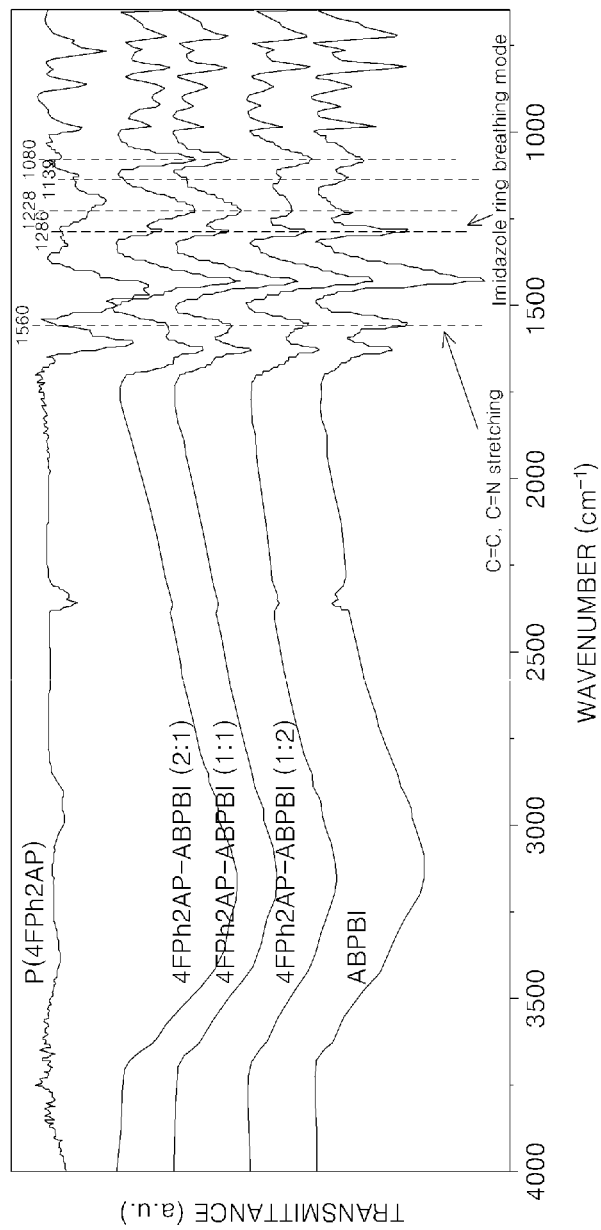
FIG. 1B illustrates infrared (IR) analysis spectra of cross-linked copolymers prepared in Synthesis Examples 1A through 1C.

In FIG. 1B, P(4FPH2AP) denotes the 4FPH2AP polymer; ABPBI denotes poly(2,5-benzimidazole); 4FPh2AP-ABPBI (2:1) denotes the cross-linked copolymer of Synthesis Example 1A prepared from 67 parts by weight of 4FPh2AP and 33 parts by weight of ABPBI; 4FPh2AP-ABPBI (1:1) denotes the cross-linked copolymer of Synthesis Example 1B prepared from 50 parts by weight of 4FPh2AP and 50 parts by weight of ABPBI; and 4FPh2AP-ABPBI (1:2) denotes the cross-linked copolymer of Synthesis Example 1C prepared from 33 parts by weight of 4FPh2AP and 67 parts by weight of ABPBI.

Figure 1C:
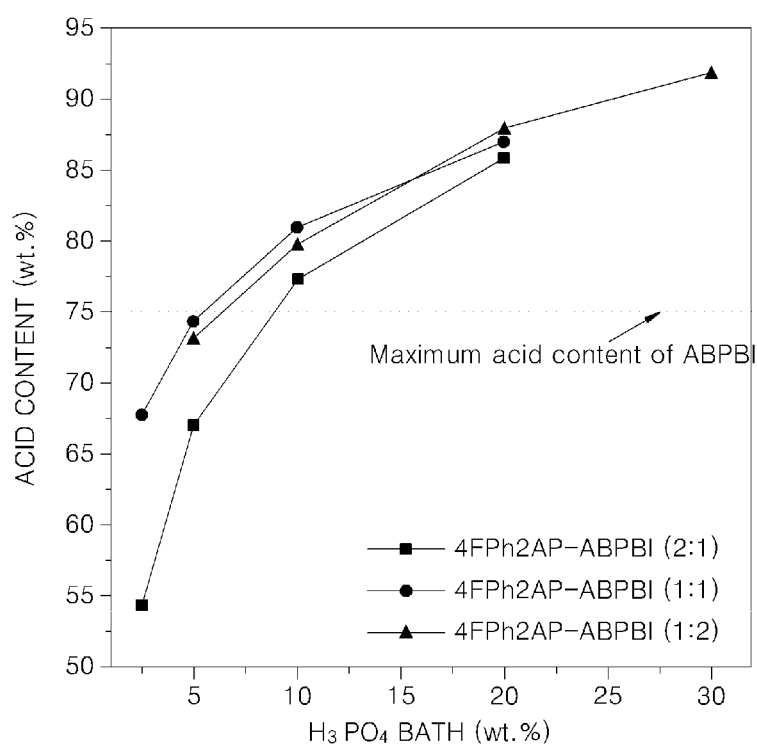
FIG. 1C illustrates the amounts of phosphoric acid retained in electrolyte membranes A, B and D manufactured in Examples 1A, 1B and 1C, respectively.

The amounts of phosphoric acid retained in the electrolyte membranes A, B and D manufactured in Examples 1A, 1B and 1C, respectively is shown in FIG. 1C.

A method of measuring the amount of phosphoric acid used is as follows.

Figure 10:
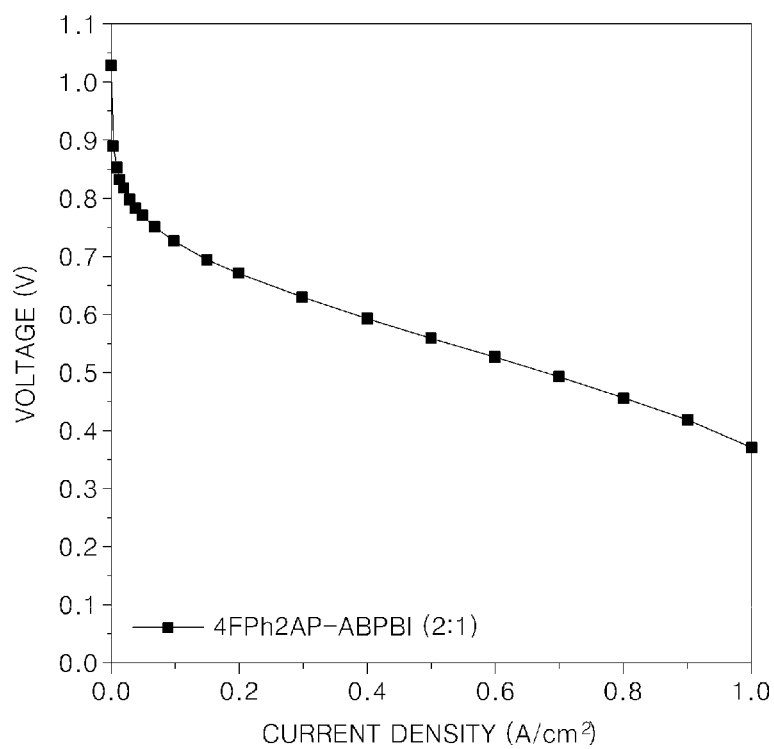
FIGS. 10 and 11 are graphs of cell voltage of a fuel cell of Manufacture Example 11 with respect to current density and time, respectively.

After each of the electrolyte membranes A, B and D was immersed in separate baths respectively containing 2.5 wt %, 5 wt %, 10 wt % and 20 wt % of aqueous phosphoric acids for 24 hours, the amount of phosphoric acid retained in each of the electrolyte membranes A, B and D was measured. The results are shown in FIG. 1C. In FIG. 10, 4FPh2AP-ABPBI (2:1) denotes the electrolyte membrane A, 4FPh2AP-ABPBI (1:1) denotes the electrolyte membrane B, and 4FPh2AP-ABPBI (1:2) denotes the electrolyte membrane D.

Referring to FIG. 1C, the electrolyte membranes A, B and D were found to retain large amounts of phosphoric acid, due to good affinity to phosphoric acid.

Figure 1D:
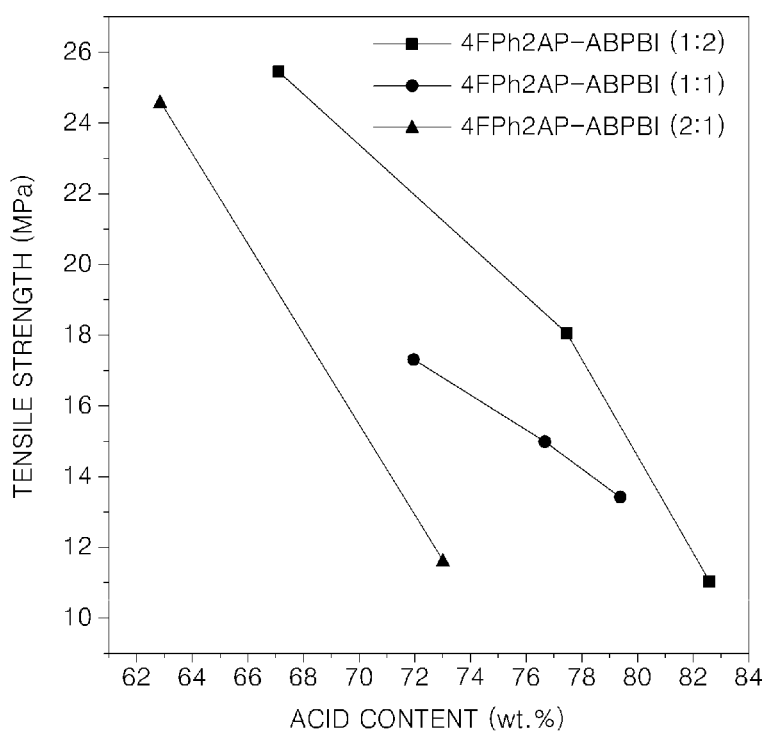
FIGS. 1D and 1E illustrate tensile strengths and stresses at break, respectively, of the electrolyte membranes A, B and D of respective Examples 1A, 1B and 1C.
Figure 1E:
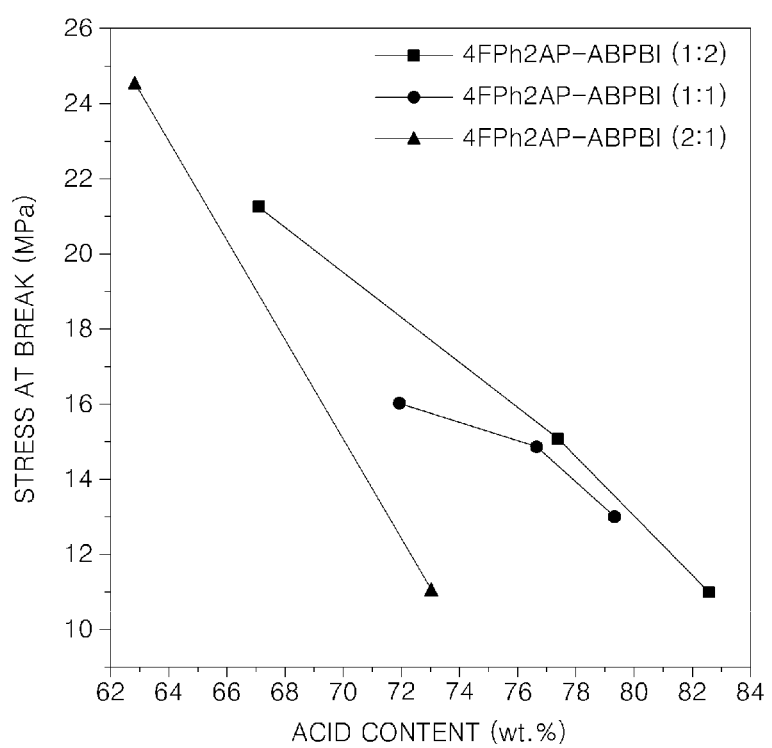

Tensile strengths and stresses at break of the electrolyte membranes A, B and D, which were manufactured in Examples 1A, 1B and 1C, respectively, with respect to the amount of phosphoric acid were measured at 20-21° C. and a RH of 19-23%. The results are shown in FIGS. 1D and 1E. In FIGS. 1D and 1E, 4FPh2AP-ABPBI (2:1) denotes the electrolyte membrane A, 4FPh2AP-ABPBI (1:1) denotes the electrolyte membrane B, and 4FPh2AP-ABPBI (1:2) denotes the electrolyte membrane D.

Referring to FIGS. 1D and 1E, the electrolyte membranes A, B and D were found to have excellent mechanical stabilities, even when retaining large amounts of phosphoric acid.

The amounts of phosphoric acid retained in the electrolyte membranes A, B and D of respective Examples 1A, 1B and 1C were measured with respect to membrane thickness. The results are shown in FIG. 1F.

Figure 1F:
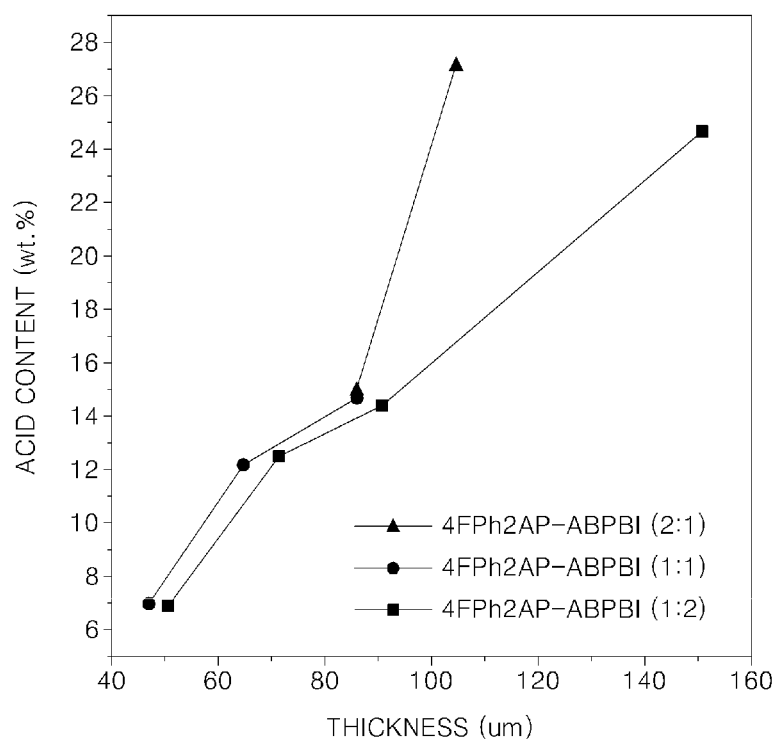
FIG. 1F is a graph of the amounts of phosphoric acid retained in the electrolyte membranes A, B and D of respective Examples 1A, 1B and 1C with respect to membrane thickness.

Referring to FIG. 1F, the electrolyte membranes A, B and D were found to retain larger amounts of phosphoric acid per area when having larger thicknesses.

Synthesis Example 2

Preparation of poly(2,2-(m-phenylene)-5,5-bibenzimidazole)poly(2,5-benzimidazole) Block Copolymer (pPBI-ABPBI Block Copolymer) and Cross-Linked Copolymer of PBOA and pPBI-ABPBI Block Copolymer

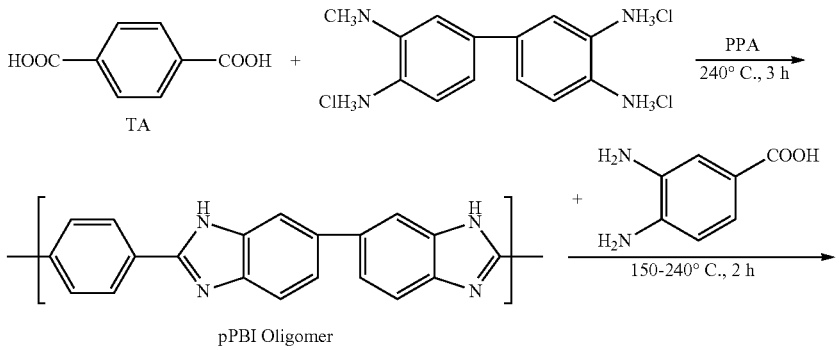

pPBI Oligomer

-continued

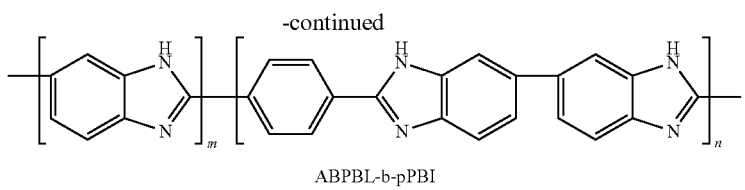

ABPBL-b-pPBI

In the reaction scheme above, m and n refer to relative molar amounts, wherein m is 0.67, and n is 0.33.

Biphenyl-3,3',4,4'-tetraamine tetrahydrochloride (DABIT) was added into polyphosphoric acid (PPA) used as a solvent at 150° C. to remove HCl from DABIT.

After HCl was completely removed, terephthalic acid (TA) was added and then stirred until a homogeneous solution was obtained. The temperature of the solution was raised to 240° C. to perform polymerization for 3 hours.

After the polymerization, the temperature of the solution (including pPBI oligomer) was lowered to 150° C., and DABA was added thereto and dissolved. Next, the temperature of the solution was raised to 240° C. to perform polymerization for 2 hours.

When the solution changed into a high viscosity solution as a result of the polymerization, o-phosphoric acid was added into the solution and then dissolved at 150° C. to prepare Mixture E. As a result of polymerization, a pPBI-ABPBI block copolymer having a number average molecular weight of about 150,000 was obtained.

67 parts by weight of 4FPh2AP as a benzoxazine-based monomer was added to Mixture E and then stirred to prepare Mixture F.

In Mixture E, the amount of the pPBI-ABPBI block copolymer reacting with the benzoxazine-based monomer was 33 parts by weight. A molar mixing ratio of pPBI to ABPBI in the pPBI-ABPBI block copolymer was 8:2.

After the temperature of Mixture F was slowly raised from about 100° C. to about 220° C. (over about 3 hours), Mixture F was thermally treated in a nitrogen gas atmosphere at 220° C. for 1 hour.

Water was added to the reaction mixture to precipitate a solid. The solid was filtered, washed with water and then dried to obtain a cross-linked copolymer of PBOA and pPBI-ABPBI block copolymer.

Example 2

Manufacture of Electrolyte Membrane

An electrolyte membrane was manufactured using the cross-linked copolymer of PBOA and pPBI-ABPBI block copolymer of Synthesis Example 2.

67 parts by weight of 4FPh2AP as a benzoxazine-based monomer was added to Mixture E of Synthesis Example 2A and then stirred. A predetermined amount of this mixture was cast on a quart plate and cured in an oven at 100° C. in a nitrogen atmosphere.

The temperature of the oven was slowly raised from about 100° C. to about 220° C. (over about 3 hours) and maintained at 220° C. for 1 hour. After the temperature of the oven was slowly cooled to room temperature, the reaction product was left at −10° C. and a RH of 25% for 48 hours or longer to slowly induce hydrolysis to form a film.

The film was immersed in an aqueous phosphoric acid solution of about 30 wt % at room temperature for 24 hours to induce secondary hydrolysis.

The film was removed from the aqueous phosphoric acid solution, and the phosphoric acid remaining on a surface of the film was also wiped off. Then, the film was dried in a vacuum oven for 24 hours or longer to obtain a cross-linked copolymer of PBOA and the pPBI-ABPBI block copolymer.

Synthesis Example 3

Preparation of Cross-Linked PBOA-co-ABPBI Copolymer

A cross-linked PBOA-co-ABPBI copolymer was prepared in the same manner as in Example 1, except that 67 parts by weight of tBuPha was used, instead of 67 parts by weight of 4FPh2AP, as the benzoxazine-based monomer.

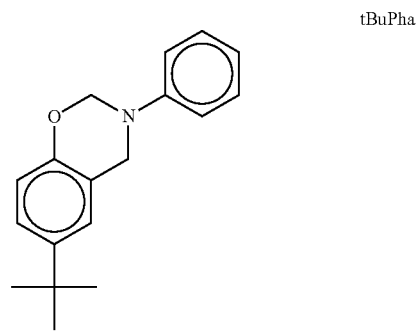

tBuPha

Figure 2:
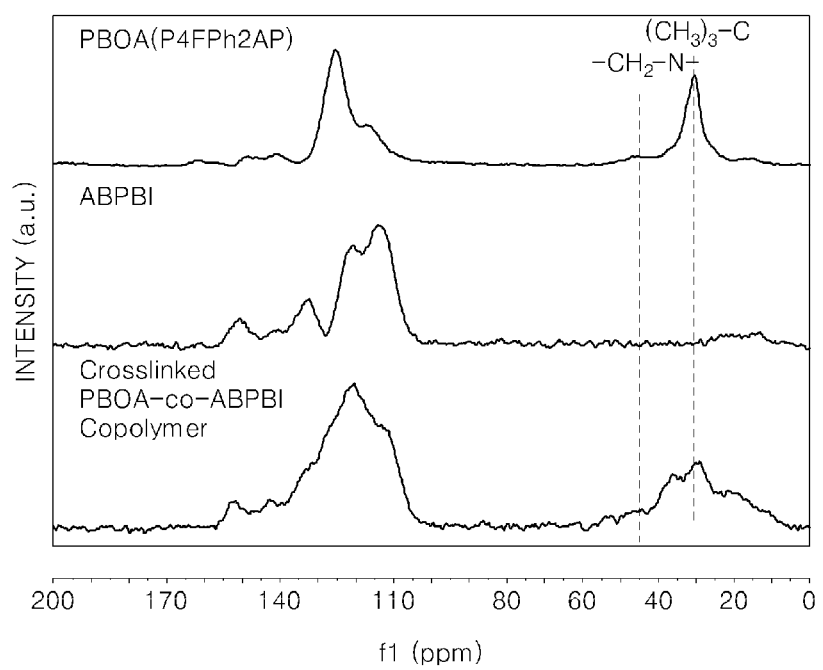
FIG. 2 illustrates solid-state NMR spectra of poly(2,5-benzimidazole) (ABPBI) of Synthesis Example 1A and a cross-linked polymer of Synthesis Example 3.

The structure of the cross-linked PBOA-co-ABPBI polymer prepared in Synthesis Example 3 was identified using solid-state NMR spectrometry. The results are shown in FIG. 2.

Example 3

Manufacture of Electrolyte Membrane

A cross-linked PBOA-co-ABPBI copolymer electrolyte membrane was manufactured in the same manner as in Example 1, except that 67 parts by weight of tBuPha was used, instead of 67 parts by weight of 4FPh2AP, as the benzoxazine-based monomer.

Synthesis Example 4

Preparation of Cross-Linked PBOA-co-ABPBI Copolymer

A cross-linked PBOA-co-ABPBI polymer was prepared in the same manner as in Synthesis Example 1A, except that 80 parts by weight of tBuPha and 20 parts by weight of ABPBI were used, instead of 67 parts by weight of 4FPh2AP and 33 parts by weight of ABPBI.

Example 4

Manufacture of Electrolyte Membrane

A cross-linked PBOA-co-ABPBI copolymer electrolyte membrane was manufactured in the same manner as in Example 1, except that 80 parts by weight of tBuPha and 20 parts by weight of ABPBI were used, instead of 67 parts by weight of 4FPh2AP and 33 parts by weight of ABPBI.

Synthesis Example 5

Preparation of Cross-Linked PBOA-co-ABPBI Copolymer

A cross-linked PBOA-co-ABPBI polymer was prepared in the same manner as in Synthesis Example 3, except that 50 parts by weight of tBuPha and 50 parts by weight of ABPBI were used, instead of 67 parts by weight of tBuPha and 33 parts by weight of ABPBI.

Example 5

Manufacture of Electrolyte Membrane

A cross-linked PBOA-co-ABPBI copolymer electrolyte membrane was manufactured in the same manner as in Example 3, except that 50 parts by weight of tBuPha and 50 parts by weight of ABPBI were used, instead of 67 parts by weight of tBuPha and 33 parts by weight of ABPBI.

Synthesis Example 6A

Preparation of Cross-Linked Copolymer of PBOA and pPBI-ABPBI Block Copolymer A cross-linked copolymer of PBOA and pPBI-ABPBI block copolymer was prepared in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 8:2.

Synthesis Example 6B

Preparation of Cross-Linked Copolymer of PBOA and pPBI-ABPBI Block Copolymer A cross-linked copolymer of PBOA and a pPBI-ABPBI block copolymer was prepared in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 5:5.

Synthesis Example 6C

Preparation of Cross-Linked Copolymer of PBOA and pPBI-ABPBI Block Copolymer A cross-linked copolymer of PBOA and a pPBI-ABPBI block copolymer was prepared in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 2:8.

Example 6A

Manufacture of Electrolyte Membrane

A cross-linked PBOA and pPBI-ABPBI copolymer electrolyte membrane was manufactured in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 8:2.

Example 6B

Manufacture of Electrolyte Membrane

A cross-linked PBOA and pPBI-ABPBI copolymer electrolyte membrane was manufactured in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 5:5.

Example 6C

Manufacture of Electrolyte Membrane

A cross-linked PBOA and pPBI-ABPBI copolymer electrolyte membrane was manufactured in the same manner as in Example 2, except that 67 parts by weight of tBuPha was used, instead of 67 parts by weight of 4FPh2AP. A molar mixing ratio of pPBI to ABPBI in the pPBI-ABPBI block copolymer was 2:8.

Synthesis Example 7

Preparation of Cross-Linked PBOA-co-ABPBI Copolymer

A cross-linked PBOA-co-ABPBI copolymer was prepared in the same manner as in Example 1A, except that 67 parts by weight of HFa and 33 parts by weight of ABPBI were used, instead of 67 parts by weight of 4FPh2AP and 33 parts by weight of ABPBI, and the maximum thermal treatment temperature of Mixture A was varied to 250° C.

HF-a

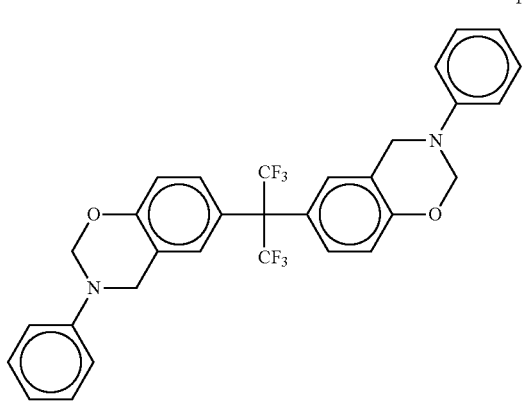

Example 7

Manufacture of Electrolyte Membrane

A cross-linked PBOA-co-ABPBI copolymer electrolyte membrane was manufactured in the same manner as in Example 1A, except that 67 parts by weight of HFa and 33 parts by weight of ABPBI were used, instead of 67 parts by weight of 4FPh2AP and 33 parts by weight of ABPBI, and the maximum thermal treatment temperature of Mixture A was varied to 250° C.

HF-a

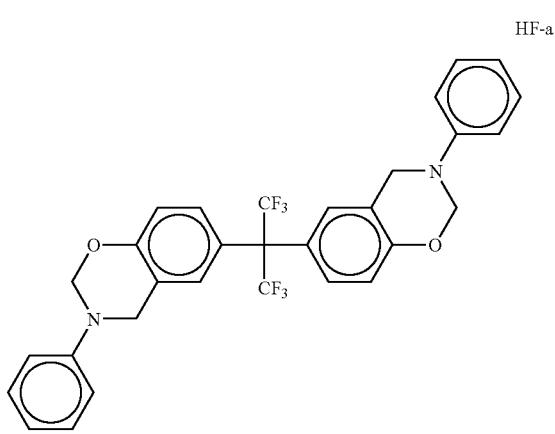

Comparative Example 1

Manufacture of Electrolyte Membrane Including poly(2,5-benzimidazole) (ABPBI)

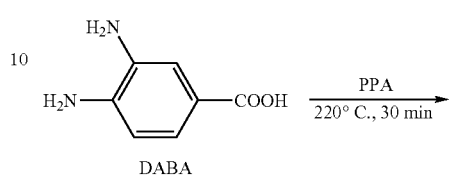

DABA

Diaminobenzoic acid (DABA) was added into polyphosphoric acid (PPA) used as a solvent and then completely dissolved at 150° C. The mixture was stirred until a homogeneous solution was obtained, and the temperature was raised to 220° C. and maintained for 30 minutes for polymerization to obtain ABPBI.

Subsequently, the ABPBI was impregnated with 85 wt % of phosphoric acid at 80° C. for 4 hours or longer to form an electrolyte membrane. Herein, the amount of phosphoric acid was about 530 parts by weight, based on 100 parts by weight of the electrolyte membrane.

Comparative Example 2

Manufacture of Electrolyte Membrane using pPBI-ABPBI Block Copolymer

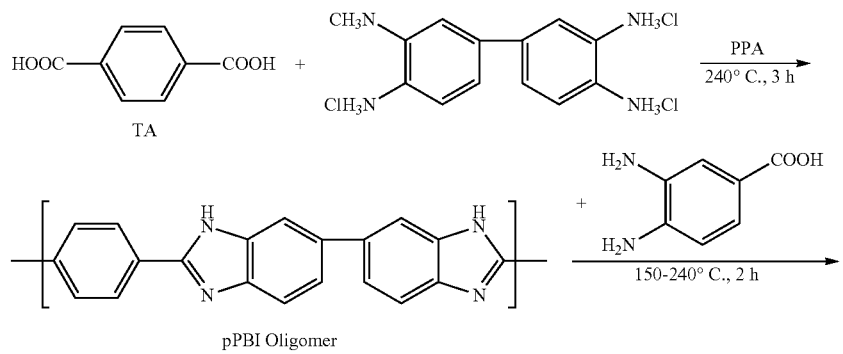

pPBI Oligomer

-continued

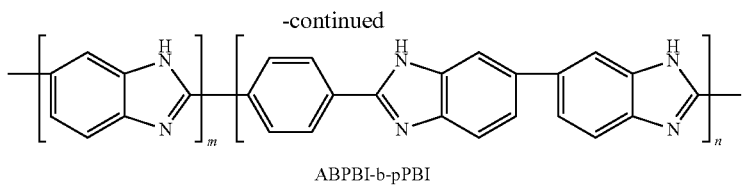

ABPBI-b-pPBI

Biphenyl-3,3',4,4'-tetraamine tetrahydrochloride (DABIT) was added into polyphosphoric acid (PPA) used as a solvent at 150° C. to remove HCl from DABIT.

After HCl was completely removed, terephthalic acid (TA) was added and then stirred until a homogeneous solution was obtained. The temperature of the solution was raised to 240° C. to perform polymerization for 3 hours to prepare a PBI oligomer solution.

After the polymerization, the temperature of the pPBI oligomer solution was lowered to 150° C., and 3,4diaminobenzoic acid (DABA) was added thereto and dissolved. Next, the temperature of the solution was raised to 240° C. to perform polymerization for 2 hours, thereby resulting in a pPBI-ABPBI block copolymer. A molar mixing ratio of pPBI to ABPBI in the pPBI-ABPBI block copolymer was 2:8.

Subsequently, the polyazole was impregnated with 85 wt % of phosphoric acid at 80° C. for 4 hours or longer to form an electrolyte membrane. Herein, the amount of phosphoric acid was about 530 parts by weight, based on 100 parts by weight of the electrolyte membrane.

Comparative Example 3

Manufacture of Electrolyte Membrane using pPBI-ABPBI Block Copolymer

An electrolyte membrane was manufactured in the same manner as in Comparative Example 1, except that the molar mixing ratio of pPBI to ABPBI in the pPBI-ABPBI block copolymer was varied to 5:5.

Manufacture Example 1

Manufacture of Fuel Cell Using Electrolyte Membrane of Example 1B 1 g of a catalyst including 50% by weight of PtCo loaded on carbon, and 3 g of N-methylpyrrolidone (NMP) as a solvent were added to a stirring vessel, and the mixture was stirred to prepare a slurry. Subsequently, a solution of 5 wt % of polyvinylidene fluoride in NMP was added to the slurry until the amount of polyvinylidene fluoride in the mixture reached 0.025 g. The mixture was mixed for 10 minutes to prepare a slurry for forming a cathode catalyst layer.

Carbon paper was cut to a size of 4×7 cm², fixed on a glass plate, and coated with the slurry by using a doctor blade (Sheen Instruments Ltd) having a gap of about 600 μm.

The slurry for forming a cathode catalyst layer was coated on the carbon paper, and the resultant was dried at room temperature for 1 hour, dried at 80° C. for 1 hour, dried at 120° C. for 30 minutes, and dried at 150° C. for 15 minutes to manufacture a cathode. The loading amount of Pt of Pt/Co in the cathode was 3.0 mg/cm².

Anodes were manufactured as follows.

2 g of a Pt catalyst (50 wt % of Pt supported on carbon) and 9 g of N-methylpyrrolidone (NMP) as a solvent were put into a stirring vessel, and stirred using a high-speed stirrer for two minutes.

Subsequently, a solution of 0.05 g of polyvinylidene fluoride dissolved in 1 g of NMP was added to the mixture, and the resultant was further stirred for 2 minutes to prepare a slurry for forming an anode catalyst layer. The slurry was coated on carbon paper, which was coated with a microporous layer, using a bar coater, to complete the manufacture of the anode. The loading amount of platinum in the anode was 1.4 mg/cm².

The amount of loaded Pt/Co in the cathode was about 2.33 mg/cm², and the amount of loaded Pt in the anode was 1.4 mg/cm².

The electrolyte membrane B of Example 1B was disposed between the cathode and the anode to manufacture an MEA. The cathode and the anode were not impregnated with phosphoric acid.

To prevent gas permeation between the cathode and the anode, a TEFLON membrane main-gasket having a thickness of 200 μm and a TEFLON membrane sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow, rate: 250 ccm), at 150° C., without humidifying the electrolyte membrane, and characteristics of the fuel cell were measured. The fuel cell was activated until an operating voltage reached a peak voltage, and then the characteristics of the fuel cell were evaluated.

The area of each of the cathodes and the anodes was set to 2.8×2.8=7.84 cm². The cathodes were about 430 μm thick and the anodes were about 390 μm thick.

Manufacture Examples 2-5

Manufacture of Fuel Cells Including Electrolyte Membranes of Examples 2-5

Fuel cells were manufactured in the same manner as in Manufacture Example 1, except that electrolyte membranes of Examples 2-6 were respectively used, instead of the electrolyte membrane B of Example 1B.

Manufacture Examples 6A-6C

Manufacture of Fuel Cells Including Electrolyte Membranes of Examples 6A-6C

Fuel cells were manufactured in the same manner as in Manufacture Example 1, except that electrolyte membranes of Examples 6A-6C were respectively used, instead of the electrolyte membrane B of Example 1B.

Manufacture Example 7

Manufacture of Fuel Cell Including Electrolyte Membrane of Example 7

A fuel cell was manufactured in the same manner as in Manufacture Example 1, except that electrolyte membrane of Example 7 was used, instead of the electrolyte membrane B of Example 1B. The loading amount of Pt of Pt/Co in the cathode was 1.7 mg/cm$^2$, and the loading amount of Pt in the anode was 0.9 mg/cm$^2$.

Manufacture Example 8

Manufacture of Fuel Cell Including Electrolyte Membrane A of Example 1A

A fuel cell was manufactured in the same manner as in Manufacture Example 1, except that electrolyte membrane A of Example 1A was used, instead of the electrolyte membrane B of Example 1B. The loading amount of Pt of Pt/Co in the cathode was 1.7 mg/cm$^2$, and the loading amount of Pt in the anode was 0.9 mg/cm$^2$.

Comparative Manufacture Example 1

Manufacture of Fuel Cell Including ABPBI-Electrolyte Membrane

A fuel cell was manufactured in the same manner as in Manufacture Example 1, except that the ABPBI-electrolyte membrane of Comparative Example 1 was used, instead of the electrolyte membrane of Example 1.

Comparative Manufacture Examples 2-3

Manufacture of Fuel Cells

Fuel cells were manufactured in the same manner as in Comparative Manufacture Example 1, except that the electrolyte membranes of Comparative Examples 2 and 3 were respectively used.

Comparative Manufacture Example 4

Manufacture of Fuel Cell Including PBI-Electrolyte Membrane

A fuel cell was manufactured in the same manner as in Comparative Manufacture Example 1, except that an electrolyte membrane including poly(2,2-(m-phenylene)-5,5-bibenzimidazole) (pPBI) was used, instead of the electrolyte membrane of Example 1.

Changes in conductivities of the fuel cells manufactured according to Manufacture Examples 1 and 8 and Comparative Manufacture Example 1 with respect to temperature were measured. The results are shown in FIG. 3.

Figure 3:
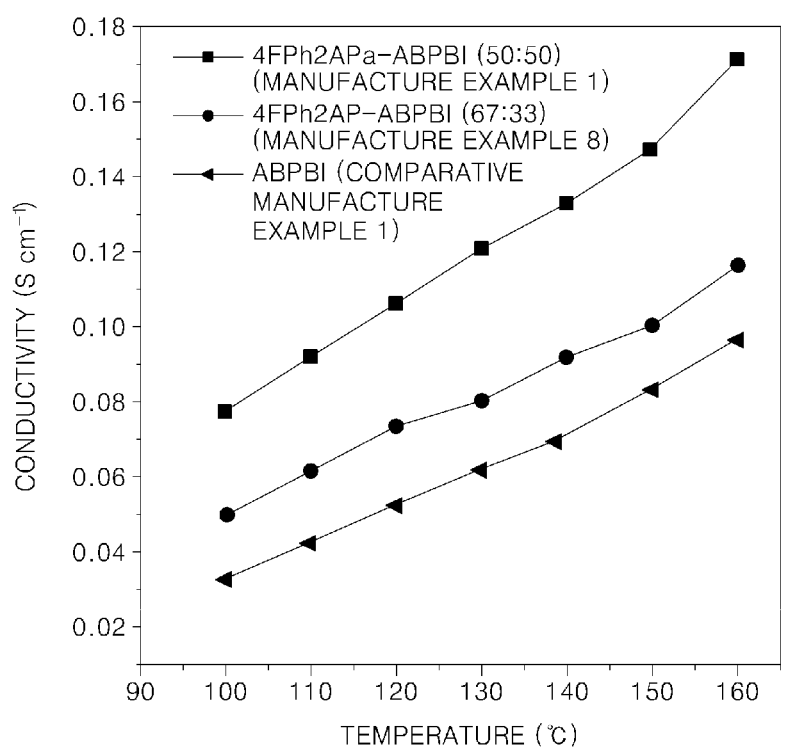
FIG. 3 is a graph of conductivities of fuel cells of Manufacture Examples 1 and 8 and Comparative Manufacture Example 1 with respect to temperature.

Referring to FIG. 3, the ion conductivity characteristics of the fuel cells of Manufacture Examples 1 and 8 were improved as compared to the fuel cell of Comparative Manufacture Example 1.

Cell voltage characteristics of the fuel cells of Manufacture Examples 1 and 4 with respect to current density were measured. The results are shown in FIG. 4.

Figure 4:
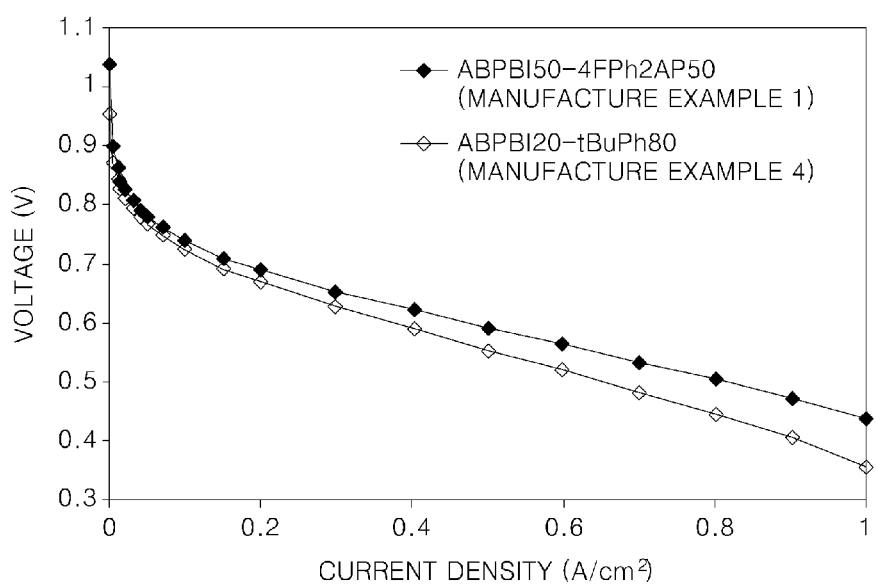
FIG. 4 is a graph illustrating cell voltage characteristics of the fuel cells of Manufacture Examples 1 and 4 with respect to current density.

Referring to FIG. 4, the fuel cells of Manufacture Examples 1 and 4 had good cell voltage characteristics.

A changes in cell voltage of the fuel cell of Manufacture Example 1 with respect to time was measured. The results are shown in FIG. 5.

Figure 5:
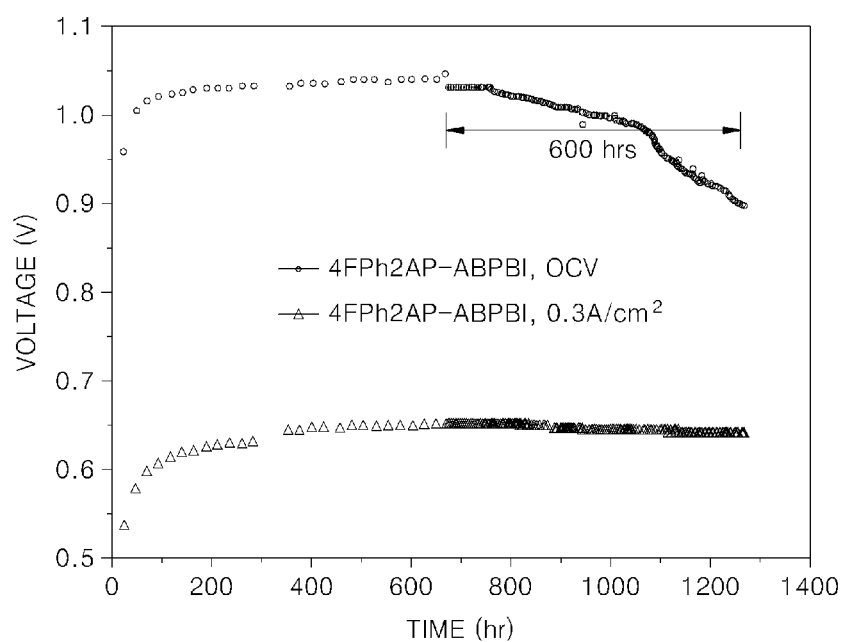
FIG. 5 is a graph of cell voltage of the fuel cell of Manufacture Example 1 with respect to time.

In FIG. 5, circles represent a cell voltage at an open circuit voltage (OCV), and triangles represent a cell voltage at a current density of 0.3 A/cm$^2$.

Referring to FIG. 5, the lifetime characteristics of the fuel cell of Manufacture Example 1 were found to be excellent.

Changes in conductivities of the fuel cells of Manufacture Examples 6A-6C and Comparative Manufacture Example 1 with respect to temperature were measured. The results are shown in FIG. 6.

Figure 6:
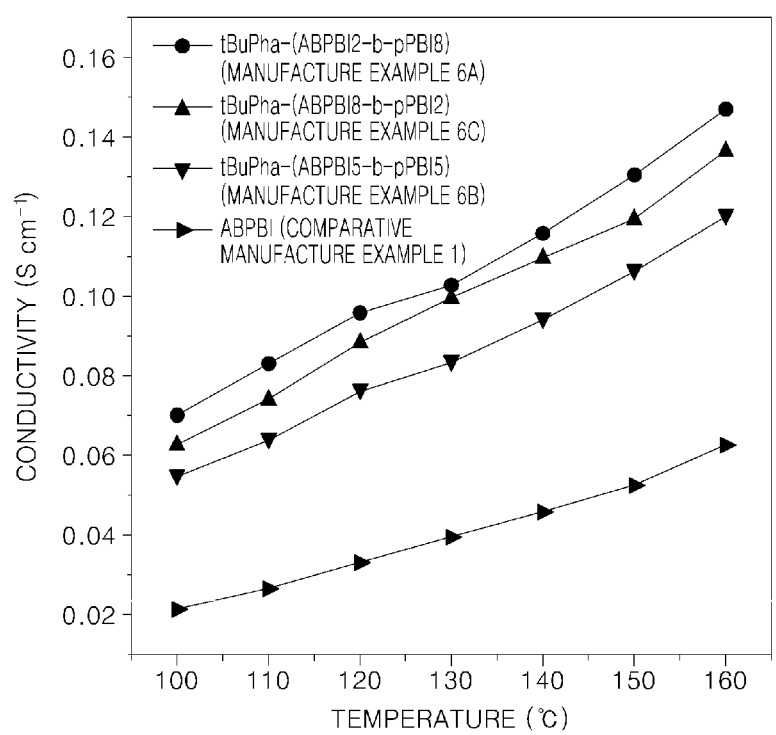
FIG. 6 is a graph of conductivities of fuel cells of Manufacture Examples 6A, 6B and 6C and Comparative Manufacture Example 1 with respect to temperature.

Referring to FIG. 6, the conductivities of the fuel cells of Manufacture Examples 6A-6C were improved, as compared with the fuel cell of Comparative Manufacture Example 1.

Changes in cell voltages of the fuel cells of Manufacture Example 6A and Comparative Manufacture Example 4 with respect to current density were measured. The results are shown in FIG. 7.

Figure 7:
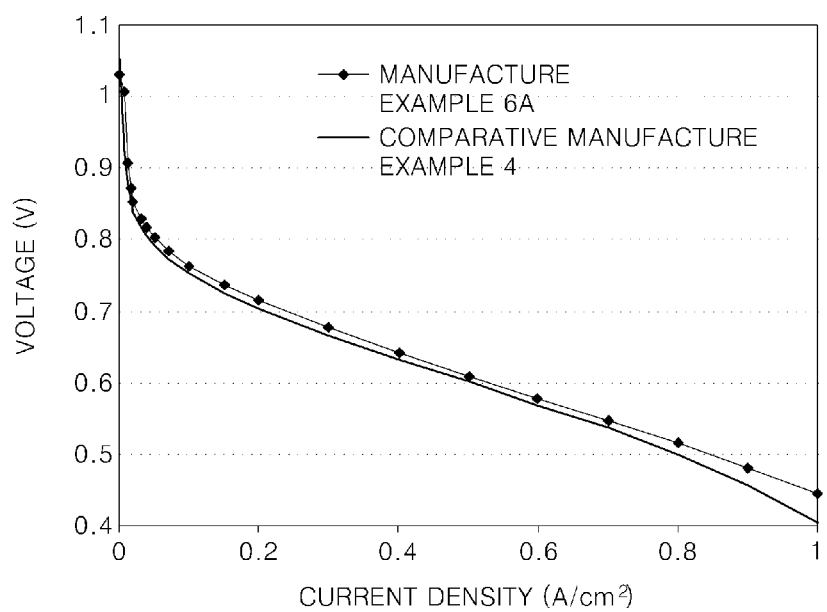
FIG. 7 is a graph of cell voltages of the fuel cells of Manufacture Example 6A and Comparative Manufacture Example 4 with respect to current density.

Referring to FIG. 7, the cell voltage characteristics of the fuel cell of Manufacture Example 6A were improved as compared to the fuel cell of Comparative Manufacture Example 4.

Figure 8:
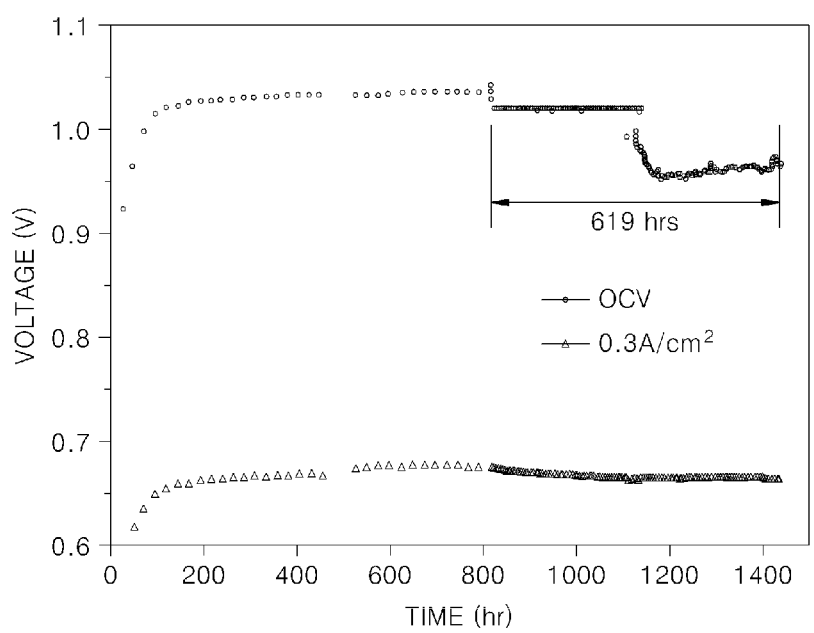
FIG. 8 is a graph of cell voltage of a fuel cell of Manufacture Example 6A with respect to time.

A change in cell voltage of the fuel cell of Manufacture Example 6A with respect to time was measured. The results are shown FIG. 8. In FIG. 8, circles represent a cell voltage at an open circuit voltage (OCV), and triangles represent a cell voltage at a current density of 0.3 A/cm$^2$.

Referring to FIG. 8, the lifetime characteristics of the fuel cell of Manufacture Example 6A were found to be excellent.

A change in cell voltage of the fuel cell of Manufacture Example 7 with respect to current density was measured. The results are shown in FIG. 9.

Figure 9:
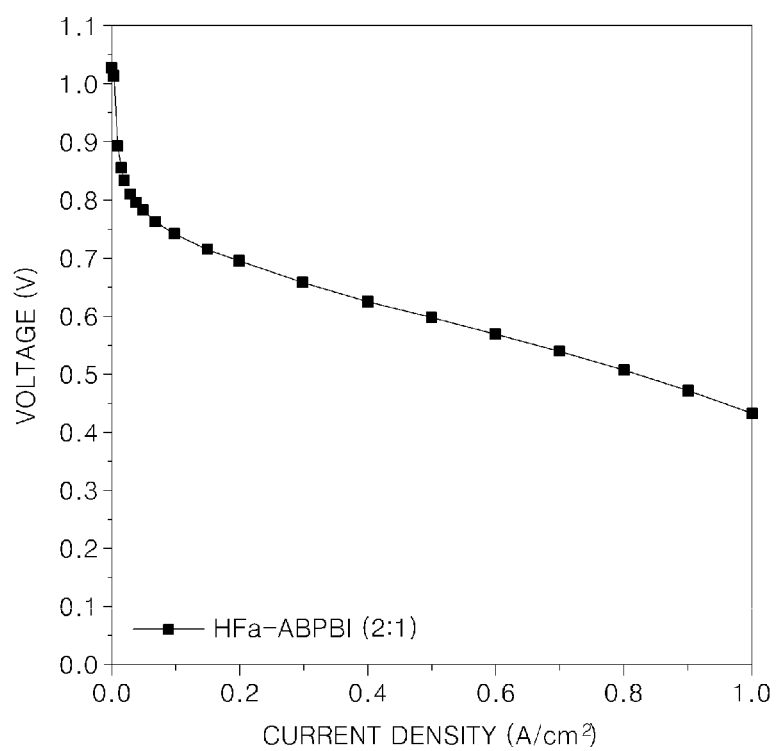
FIG. 9 is a graph of cell voltage of a fuel cell of Manufacture Example 7 with respect to current density.

Referring to FIG. 9, the fuel cell of Manufacture Example 7 was found to have excellent performance.

Figure 11:
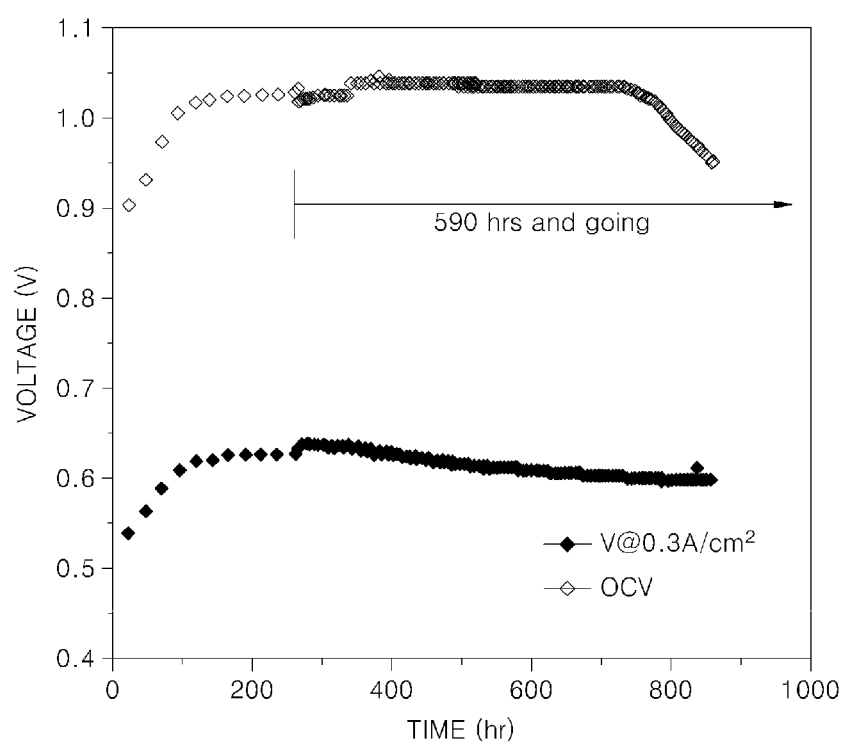

Cell voltage characteristics of the fuel cell of Manufacture Example 8 with respect to current density and time were measured. The results are shown in FIGS. 10 and 11, respectively. In FIG. 11, circles represent a cell voltage at an open circuit voltage (OCV), and triangles represent a cell voltage at a current density of 0.3 A/cm$^2$. Referring to FIGS. 10 and 11, the fuel cell of Manufacture Example 8 was found to have excellent cell voltage characteristics and excellent lifetime characteristics.

As described above, according to the one or more embodiments of the present invention, a cross-linked polyazole has excellent physical and chemical stability. An electrode and an electrolyte membrane for a fuel cell, which have improved phosphoric acid retaining ability in a wide temperature range, a long-term durability, and improved proton conductivity, may be manufactured using the cross-linked polyazole.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composition comprising: a polyazole including a first repeating unit comprising a repeating unit represented by one of the following formulas:

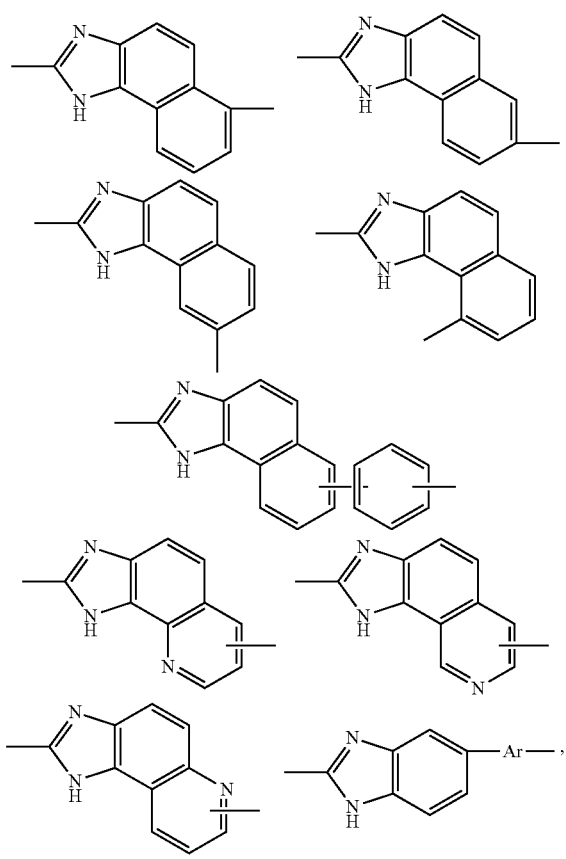

wherein Ar is selected from among the following groups:

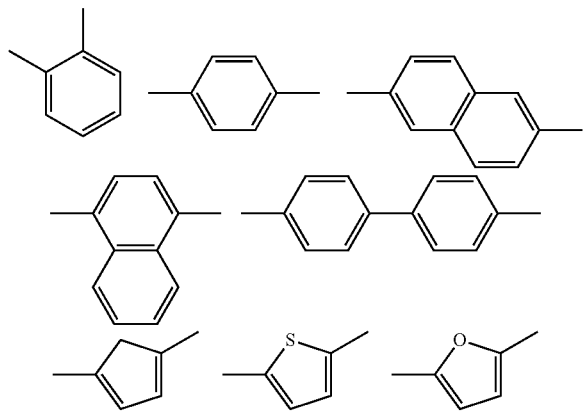

-continued

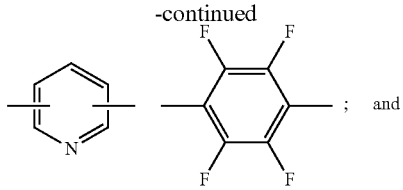

an azole second repeating unit having at least one amino group; and a benzoxazine-based monomer, wherein, assuming that m and n represent the relative molar amount of the first repeating unit and the azole second repeating unit, respectively, in the polyazole such that m+n=1, m ranges from 0.1 to 0.9 and n ranges from 0.1 to 0.9:

and wherein the azole second repeating unit comprises a repeating unit represented by Formula 2a

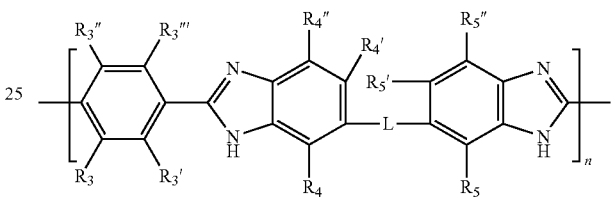

wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker.

2. The composition of claim 1, wherein the amount of the polyazole is in the range of about 40 parts to about 210 parts by weight based on 100 parts by weight of the benzoxazine-based monomer.

3. The composition of claim 1, wherein L in Formula 2a is —$CH_2$—, —$C(CH_3)_2$—, or —$C(CF_3)_2$—.

4. The composition of claim 1, wherein the polyazole is a block copolymer including the first repeating unit and the second repeating unit of Formula 2a.

5. The composition of claim 1, wherein the polyazole has a degree of polymerization of about 1 to about 900.

6. The composition of claim 1, wherein the polyazole comprises a block copolymer represented by Formula 3 below:

Formula 3

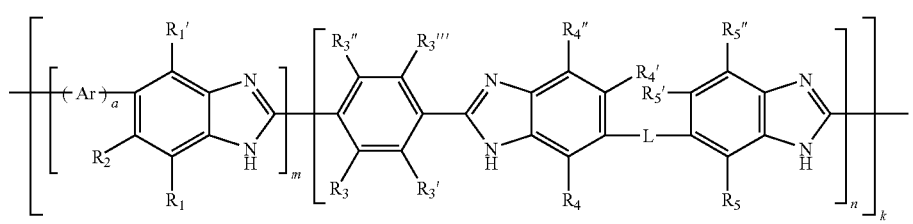

wherein, in Formula 3, $R_1$, $R_1'$ and $R_2$ are hydrogen;
Ar is selected from among the following groups:

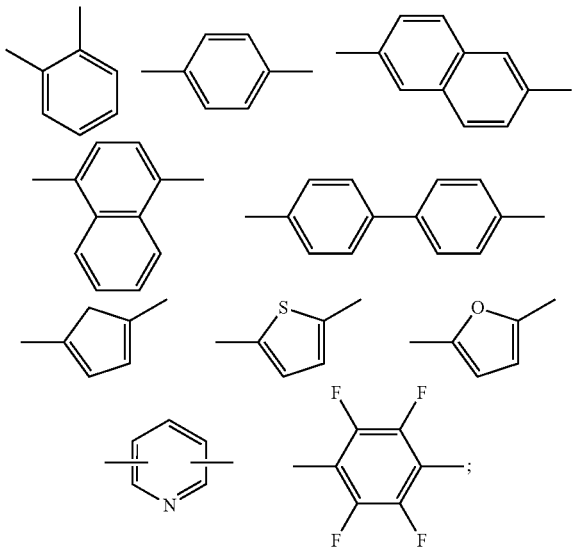

m is a number from 0.1 to 0.9;
a is 1;
$R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring;
L represents a linker;
n is a number from greater than 0 to 0.99; and
k represents a degree of polymerization of the polyazole and is a number from 10 to 300.

7. The composition of claim 1, wherein the benzoxazine-based monomer comprises at least one compound selected from among the compounds represented by Formulae 6 through 11 below:

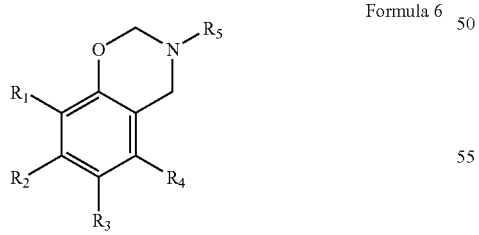

Formula 6 in Formula 6, $R_1$ through $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, a halogen atom, a hydroxyl group, or a cyano group; and
$R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

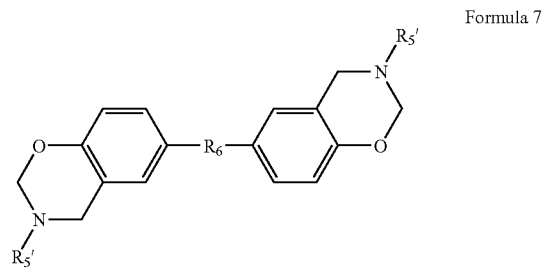

Formula 7 in Formula 7, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and
$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

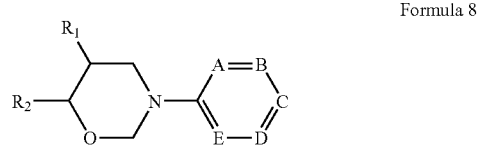

Formula 8 in Formula 8, A, B, C, D and E are all carbon; or one or two of A, B, C, D and E is nitrogen and the others are carbon; and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

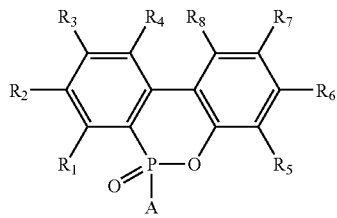

Formula 9 in Formula 9, A is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group, and wherein A includes at least one oxazine moiety; and $R_1$ through $R_8$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group,

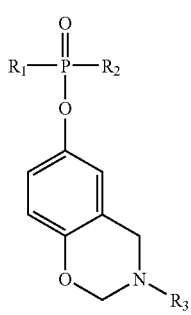

Formual 10 in Formula 10, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 10A below,

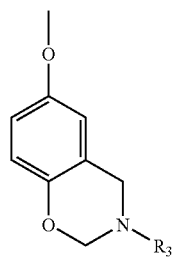

Formual 10A in Formulae 10 and 10A, $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group,

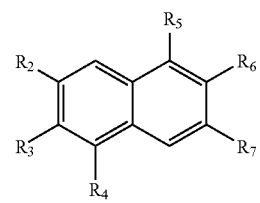

Formula 11 in Formula 11, at least two adjacent groups selected from among $R_2$, $R_3$ and $R_4$ are linked to form a group represented by Formula 12A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_5$, $R_6$ and $R_7$ are linked to form the group represented by Formula 12A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, and

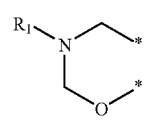

Formula 12A in Formula 12A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_2$, $R_3$ and $R_4$ of Formula 11 and the at least two adjacent groups selected from among $R_5$, $R_6$ and $R_7$ are linked, respectively.

8. A cross-linked polyazole obtained through a cross-linking reaction of the composition of claim 1.

9. A method of preparing the cross-linked polyazole of claim 8, the method comprising:

mixing a polyazole including a first repeating unit comprising a repeating unit represented by one of the following formulas:

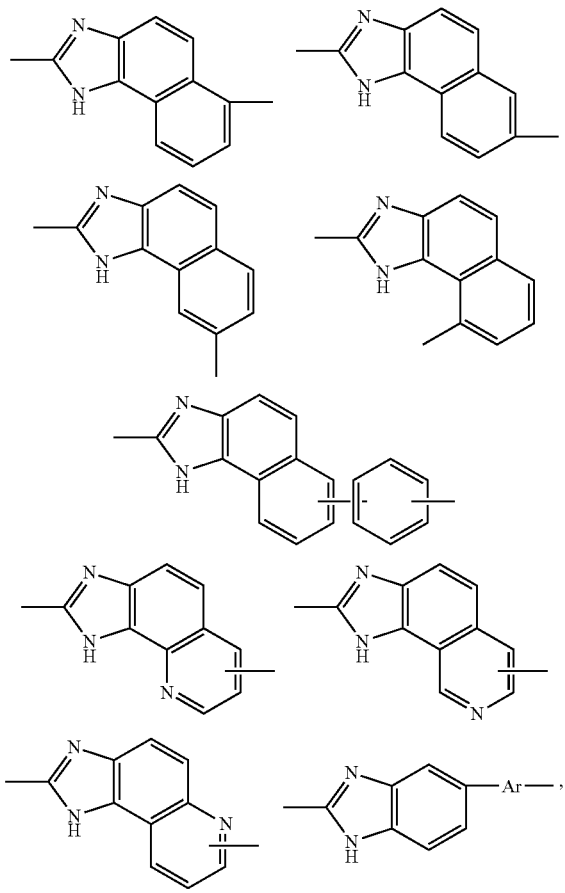

wherein Ar is selected from among the following groups:

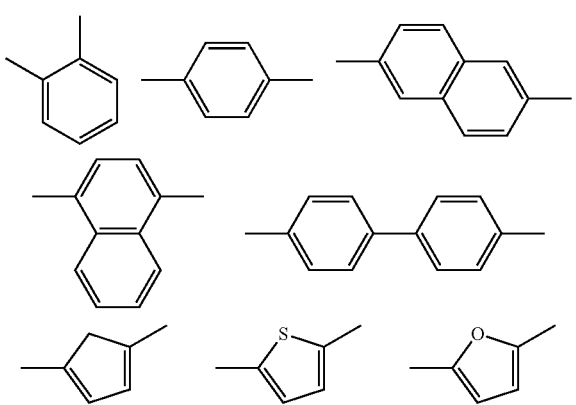

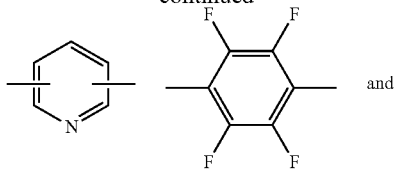

and an azole second repeating unit having at least one amino group, a benzoxazine-based monomer and a phosphoric acid-based material to obtain a mixture, wherein, assuming that m and n represent the relative molar amount of the first repeating unit and the azole second repeating unit, respectively, in the polyazole such that m+n=1, m ranges from 0.1 to 0.9 and n ranges from 0.1 to 0.9; and thermally treating the mixture, wherein the azole second repeating unit comprises a repeating unit represented by Formula 2a

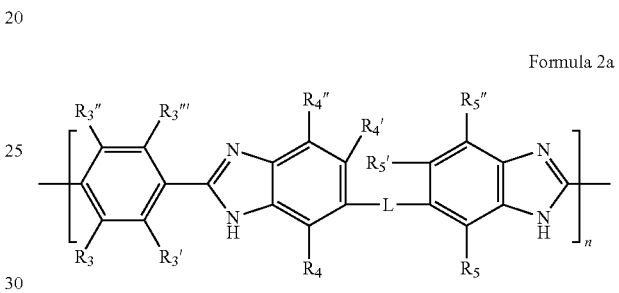

wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker.

10. The method of claim 9, wherein the thermally treating is performed at a temperature of about 60 to about 250° C.

11. The method of claim 9, wherein the phosphoric acid-based material comprises at least one material selected from the group consisting of polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof.

12. The method of claim 9, wherein the polyazole including the first repeating unit and the azole second repeating unit having at least one amino group is prepared through polymerization using a material that generates phosphoric acid when hydrolyzed.

13. The method of claim 12, wherein the material that generates phosphoric acid when hydrolyzed comprises polyphosphoric acid.

14. The method of claim 9, wherein the polyazole including the first repeating unit and the azole second repeating unit having at least one amino group is prepared by a method comprising:

mixing biphenyl-3,3',4,4'-tetraaminetetrahydrochloride and phosphoric acid, and thermally treating the mixture at a temperature of about 60 to about 250° C. to obtain a (2,2-(m-phenylene)-5,5-bibenzimidazole) oligomer; and mixing the (2,2-(m-phenylene)-5,5-bibenzimidazole) oligomer with 3,4-diaminobenzoic acid and thermally treating the mixture at a temperature of about 60 to about 250° C.

15. An electrolyte membrane for a fuel cell, the electrolyte membrane comprising a composition comprising: a polyazole including a first repeating unit comprising a repeating unit represented by one of the following formulas:

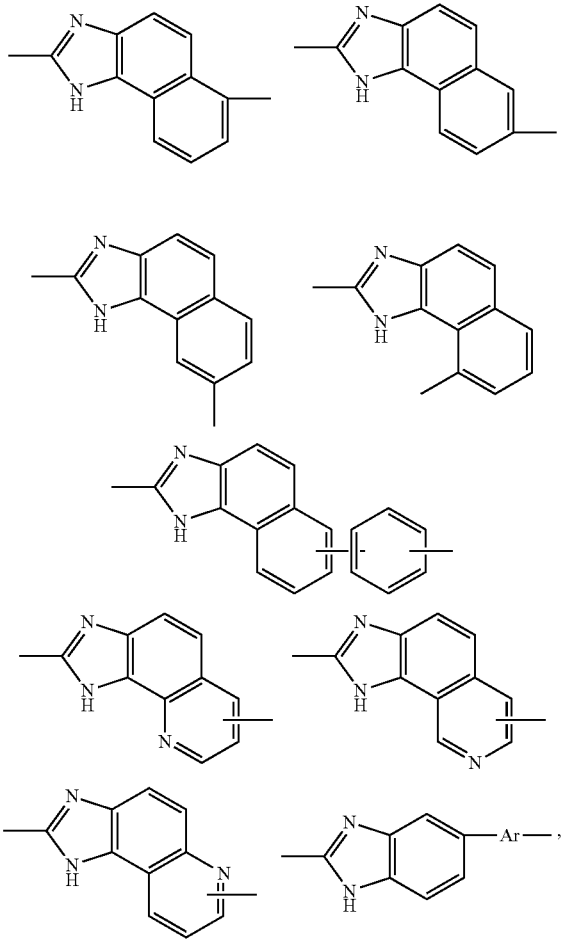

wherein Ar is selected from among the following groups:

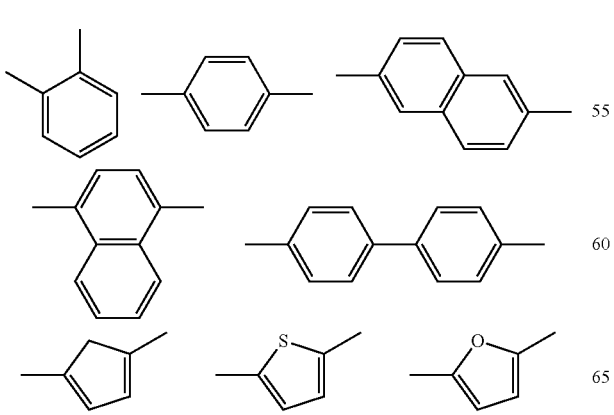

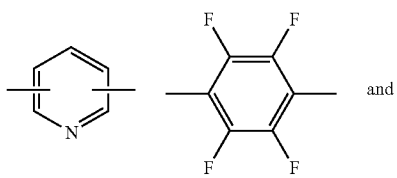

and an azole second repeating unit; and a benzoxazine-based monomer, wherein, assuming that m and n represent the relative molar amount of the first repeating unit and the azole second repeating unit, respectively, in the polyazole such that m+n=1, m is a number from 0.1 to 0.9 and n is a number from 0.1 to 0.9:

and wherein the azole second repeating unit comprises a repeating unit represented by Formula 2a:

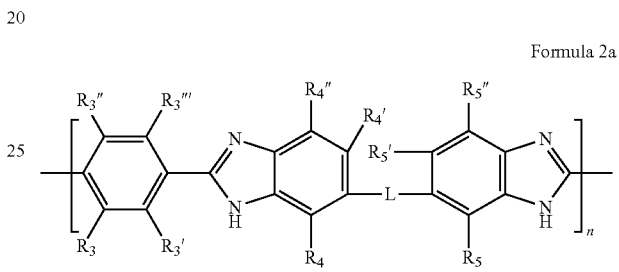

Formula 2a wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker.

16. An electrolyte membrane for a fuel cell, the electrolyte membrane comprising a cross-linked polyazole obtained through a cross-linking reaction of a composition comprising: a polyazole including a first repeating unit comprising a repeating unit represented by one of the following formulae:

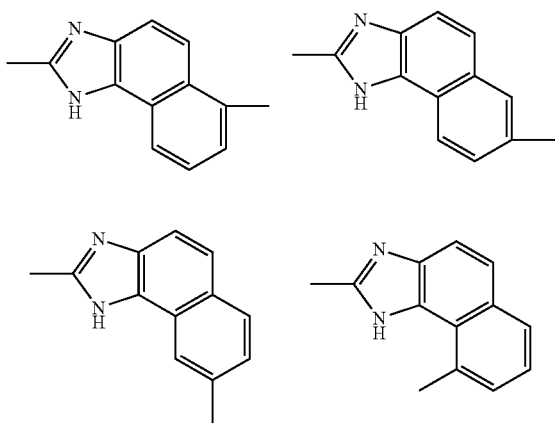

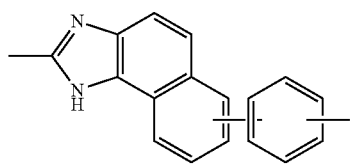

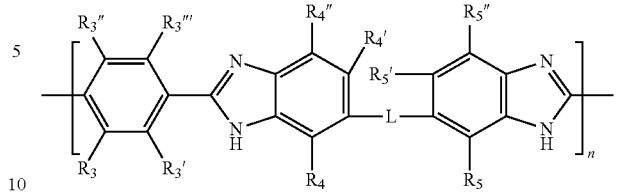
Formula 2a wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker.

17. A method of manufacturing an electrolyte membrane for a fuel cell of claim 16, the method comprising:

mixing a polyazole including a first repeating unit comprising a repeating unit represented by one of the following formulae:

wherein Ar is selected from among the following groups:

an azole second repeating unit; and a benzoxazine-based monomer, wherein, assuming that m and n represent the relative molar amount of the first repeating unit and the azole second repeating unit, respectively, in the polyazole such that m+n=1, m is a number from 0.1 to 0.9 and n is a number from 0.1 to 0.9;

and wherein the azole second repeating unit comprises a repeating unit represented by Formula 2a:

wherein Ar is selected from among the following groups:

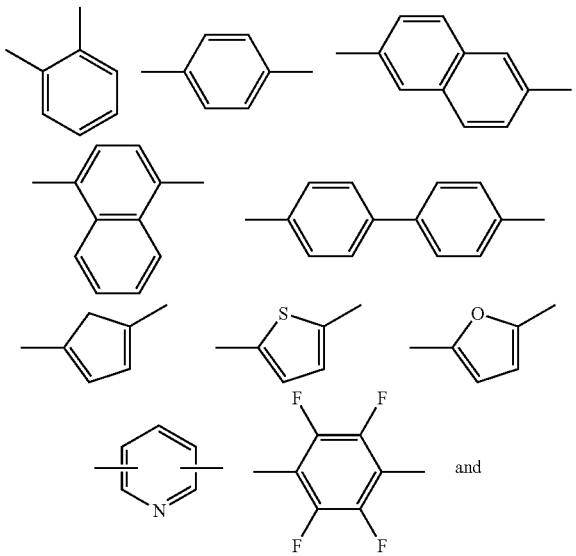

an azole second repeating unit having at least one amino group, a benzoxazine-based monomer and a phosphoric acid-based material to obtain a mixture, wherein, assuming that m and n represent the relative molar amount of the first repeating unit and the azole second repeating unit, respectively, in the polyazole such that m+n=1, m ranges from 0.1 to 0.9 and n ranges from 0.1 to 0.9;

casting the mixture on a substrate and thermally treating the cast mixture to obtain a thermally-treated product;

impregnating the thermally-treated product with the phosphoric acid-based material to obtain a resulting product; and drying the resulting product, wherein the azole second repeating unit comprises a repeating unit represented by Formula 2a:

Formula 2a

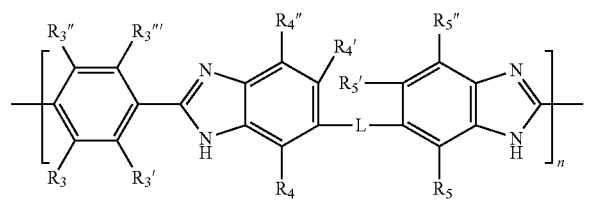

wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker.

18. The method of claim 17, further comprising treating the thermally-treated product in a constant-temperature and constant humidity condition at a temperature of about −20 to about 30° C. and a relative humidity of about 5 to about 50%.

19. The method of claim 17, wherein, the mixing of the polyazole including the first repeating unit and the azole second repeating unit having at least one amino group, the benzoxazine-based monomer and the phosphoric acid-based material comprises: mixing the polyazole with the phosphoric acid-based material at a temperature of about 100° C. to about 160° C. to obtain a blend, and mixing the blend with the benzoxazine-based monomer to obtain the mixture.

20. The method of claim 17, wherein the phosphoric acid-based material comprises at least one material selected from the group consisting of polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof.

21. The method of claim 17, wherein the polyazole including the first repeating unit and the azole second repeating unit having at least one amino group is prepared through polymerization using a material that generates phosphoric acid when hydrolyzed.

22. The method of claim 21, wherein the material that generates phosphoric acid when hydrolyzed comprises polyphosphoric acid.

23. The method of claim 17, wherein the polyazole including the first repeating unit and the azole second repeating unit having at least one amino group is prepared by a method comprising:

mixing biphenyl-3,3',4,4'-tetraaminetetrahydrochloride and polyphosphoric acid, and thermally treating the mixture at a temperature of about 60 to about 250° C. to obtain a (2,2-(m-phenylene)-5,5-bibenzimidazole) oligomer; and mixing the (2,2-(m-phenylene)-5,5-bibenzimidazole) oligomer with 3,4-diaminobenzoic acid and thermally treating the mixture at a temperature of about 60 to about 250° C.

24. An electrode for a fuel cell, the electrode comprising the composition of claim 1.

25. An electrolyte for a fuel cell, the electrolyte comprising the cross-linked polyazole of claim 8.

26. A fuel cell comprising:
a cathode;
an anode; and
an electrolyte membrane according to claim 15 disposed between the cathode and the anode.

27. A fuel cell comprising:
a cathode;
an anode; and
an electrolyte membrane according to claim 16 disposed between the cathode and the anode.

28. The electrolyte membrane of claim 15, wherein the amount of the polyazole is in the range of about 40 parts to about 210 parts by weight based on 100 parts by weight of the benzoxazine-based monomer.

29. The electrolyte membrane of claim 15, wherein L in Formula 2a is —$CH_2$—, —$C(CH_3)_2$—, or —$C(CF_3)_2$—.

30. The electrolyte membrane of claim 15, wherein the polyazole is a block copolymer including the first repeating unit and the second repeating unit of Formula 2a.

31. The electrolyte membrane of claim 15, wherein the polyazole has a degree of polymerization of about 1 to about 900.

32. The electrolyte membrane of claim 15, wherein the polyazole comprises a block copolymer represented by Formula 3 below:

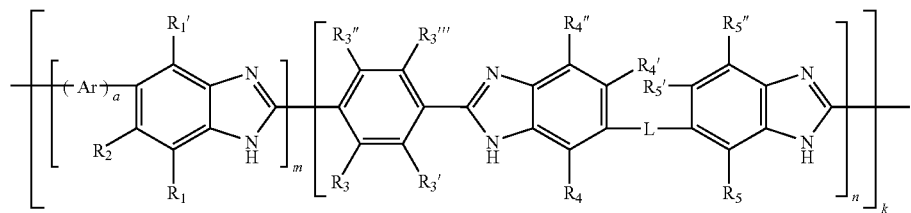

Formula 3 wherein, in Formula 3, $R_1$, $R_1'$ and $R_2$ are hydrogen;
Ar is selected from among the following groups:

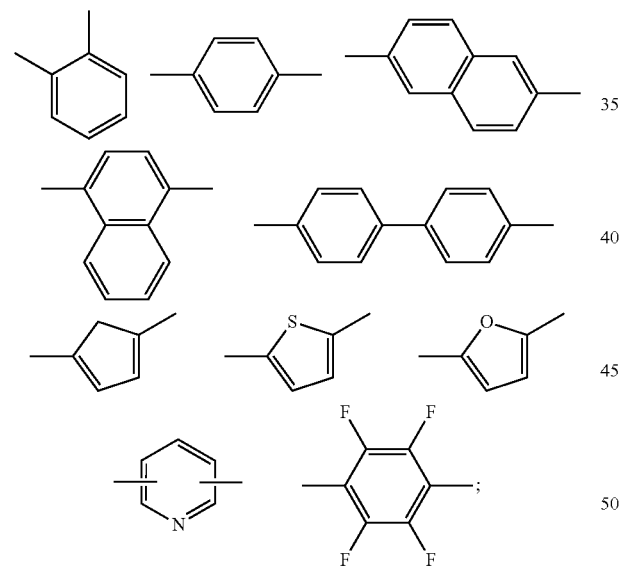

m is a number from 0.1 to 0.9;
a is 1;
$R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring;

L represents a linker;
n is a number from 0.1 to 0.9; and
k represents a degree of polymerization of the polyazole and is a number from 10 to 300.

33. The electrolyte membrane of claim 15, wherein the benzoxazine-based monomer comprises at least one compound selected from among the compounds represented by Formulae 6 through 11 below:

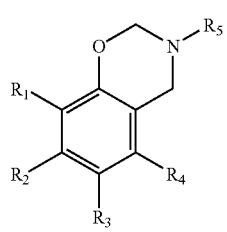

Formula 6 in Formula 6, $R_1$ through $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, a halogen atom, a hydroxyl group, or a cyano group; and
$R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, Formula 7

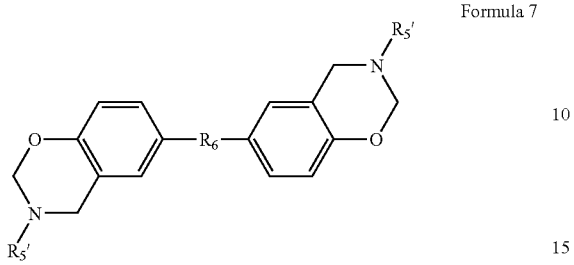

in Formula 7, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—, Formula 8

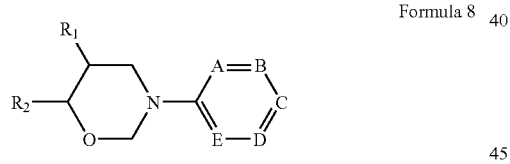

in Formula 8, A, B, C, D and E are all carbon; or one or two of A, B, C, D and E is nitrogen and the others are carbon; and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

Formula 9

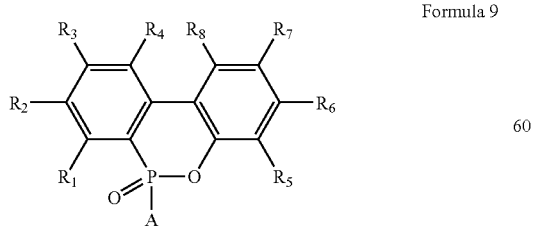

in Formula 9, A is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group, and wherein A includes at least one oxazine moiety; and $R_1$ through $R_8$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group, Formual 10

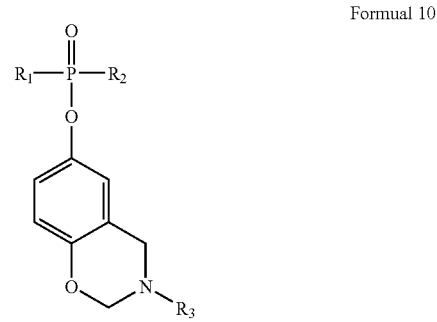

in Formula 10, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 10A below, Formual 10A

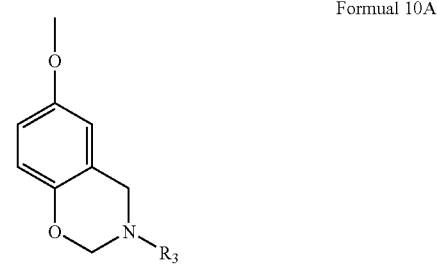

in Formulae 10 and 10A, $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, Formula 11

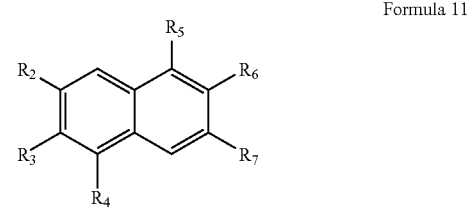

in Formula 11, at least two adjacent groups selected from among $R_2$, $R_3$ and $R_4$ are linked to form a group represented by Formula 12A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_5$, $R_6$ and $R_7$ are linked to form the group represented by Formula 12A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, and

Formula 12A in Formula 12A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_2$, $R_3$ and $R_4$ of Formula 11 and the at least two adjacent groups selected from among $R_5$, $R_6$ and $R_7$ are linked, respectively.

34. The electrolyte membrane of claim 16, wherein the amount of the polyazole is in the range of about 40 parts to about 210 parts by weight based on 100 parts by weight of the benzoxazine-based monomer.

35. The electrolyte membrane of claim 16, wherein L in Formula 2a is —$CH_2$—, —$C(CH_3)_2$—, or —$C(CF_3)_2$—.

36. The electrolyte membrane of claim 16, wherein the polyazole is a block copolymer including the first repeating unit and the second repeating unit of Formula 2a.

37. The electrolyte membrane of claim 16, wherein the polyazole has a degree of polymerization of about 1 to about 900.

38. The electrolyte membrane of claim 16, wherein the polyazole comprises a block copolymer represented by Formula 3 below:

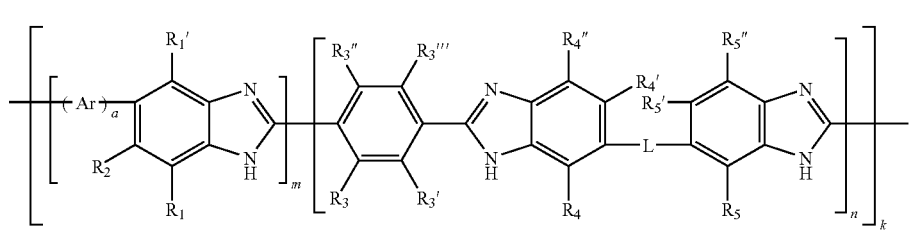

Formula 3 wherein, in Formula 3, $R_1$, $R_1'$ and $R_2$ are hydrogen; Ar is selected from among the following groups:

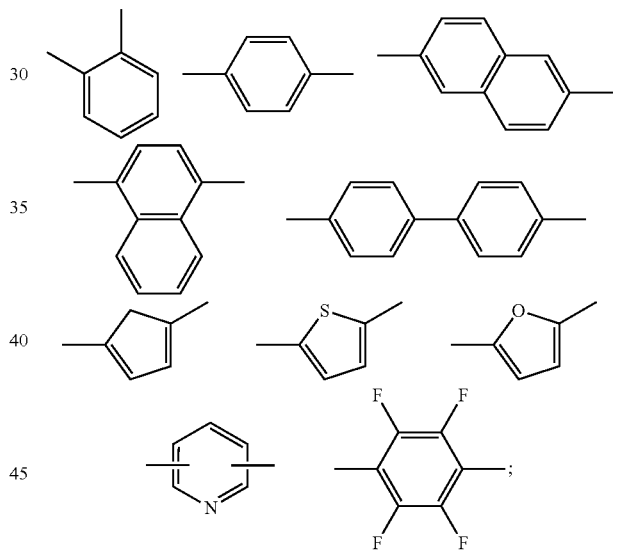

m is a number from 0.1 to 0.9;
a is 1;
$R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring;
L represents a linker;
n is a number from 0.1 to 0.9; and
k represents a degree of polymerization of the polyazole and is a number from 10 to 300.

39. The electrolyte membrane of claim 16, wherein the benzoxazine-based monomer comprises at least one compound selected from among the compounds represented by Formulae 6 through 11 below:

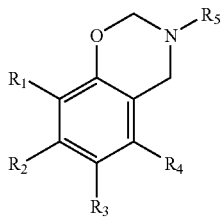

Formula 6 in Formula 6, $R_1$ through $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, a halogen atom, a hydroxyl group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

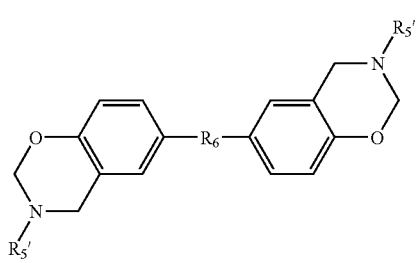

Formula 7 in Formula 7, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2'$ $C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

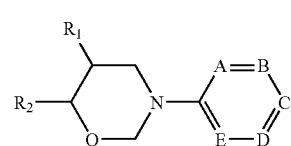

Formula 8 in Formula 8, A, B, C, D and E are all carbon; or one or two of A, B, C, D and E is nitrogen and the others are carbon; and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

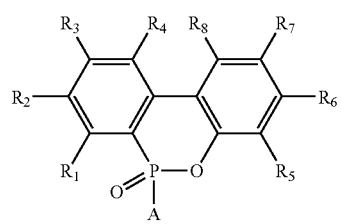

Formula 9 in Formula 9, A is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group, and wherein A includes at least one oxazine moiety; and $R_1$ through $R_8$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group,

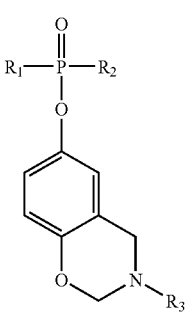

Formual 10 in Formula 10, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 10A below,

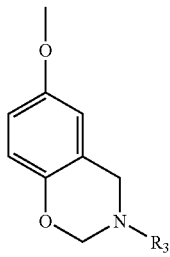

Formual 10A in Formulae 10 and 10A, $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group,

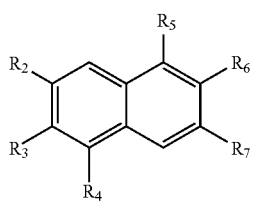

Formula 11 in Formula 11, at least two adjacent groups selected from among $R_2$, $R_3$ and $R_4$ are linked to form a group represented by Formula 12A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_5$, $R_6$ and $R_7$ are linked to form the group represented by Formula 12A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, and

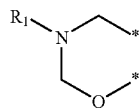

Formula 12A in Formula 12A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_2$, $R_3$ and $R_4$ of Formula 11 and the at least two adjacent groups selected from among $R_5$, $R_6$ and $R_7$ are linked, respectively.

40. The membrane of claim 15, wherein the molar ratio of the first repeating unit to the second repeating unit is about 8:2, about 5:5, or about 2:8.

41. The membrane of claim 16, wherein the molar ratio of the first repeating unit to the second repeating unit is about 8:2, about 5:5, or about 2:8.

42. The membrane of claim 16, wherein the benzoxazine-based monomer comprises at least one compound selected from among the compounds represented by Formulae 6 through 11:

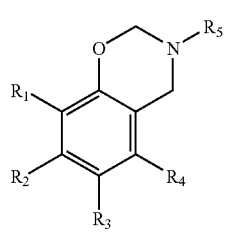

Formula 6 in Formula 6, $R_1$, $R_2$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, a halogen atom, a hydroxyl group, or a cyano group;

$R_3$ is independently a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryloxy group, a substituted or unsubstituted $C_2$-$C_{20}$ heteroaryloxy group, a substituted or unsubstituted $C_4$-$C_{20}$ carbocyclic alkyl group, a halogen atom, a hydroxyl group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

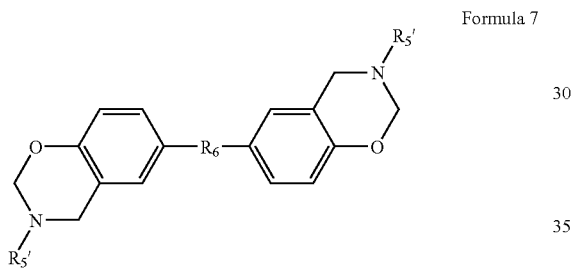

Formula 7 in Formula 7, $R_5'$ is a substituted or unsubstituted $C_1$-$C_{20}$ alkoxy group, a substituted or unsubstituted $C_6$-$C_{20}$ aryloxy group, or a substituted or unsubstituted $C_2$-$C_{20}$ heteroaryloxy group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

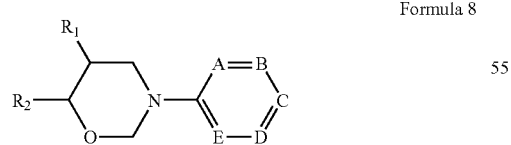

Formula 8 in Formula 8, A, B, C, D and E are all carbon; or one or two of A, B, C, D and E is nitrogen and the others are carbon; and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group;

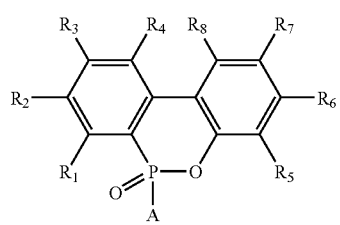

Formula 9 in Formula 9, A is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group, and wherein A includes at least one oxazine moiety; and $R_1$ through $R_8$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group,

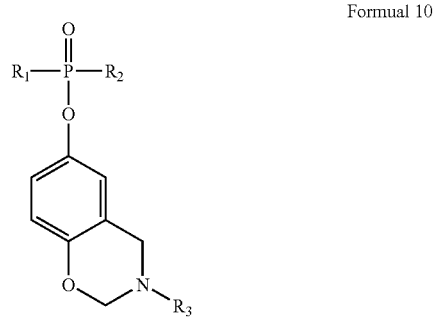

Formual 10 in Formula 10, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 10A below,

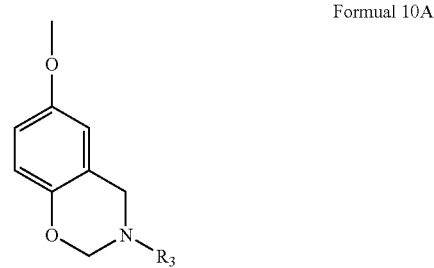

Formual 10A in Formulae 10 and 10A, $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, Formula 11

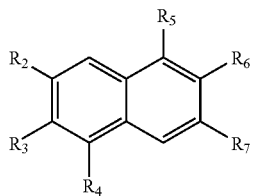

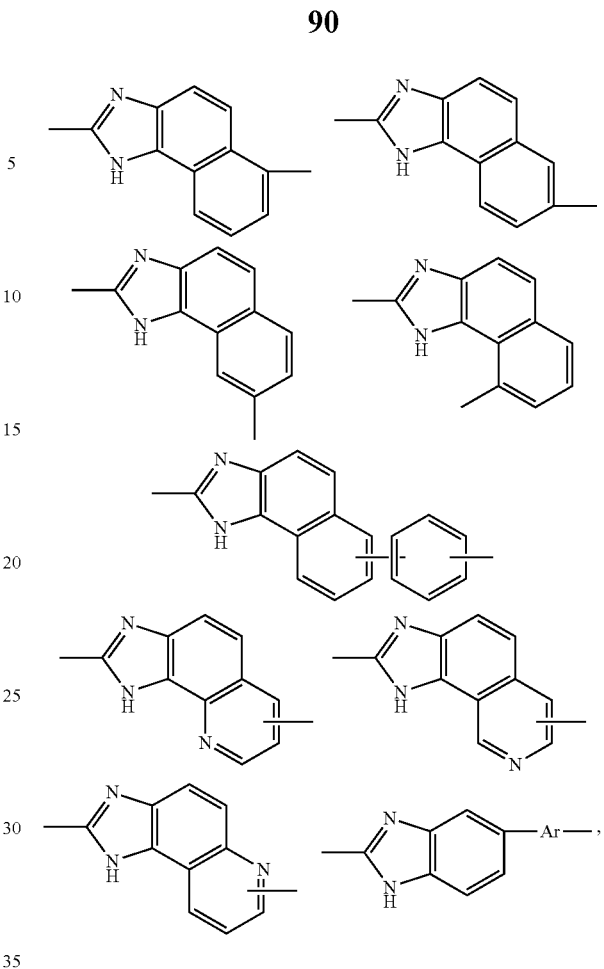

in Formula 11, at least two adjacent groups selected from among $R_2$, $R_3$ and $R_4$ are linked to form a group represented by Formula 12A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_5$, $R_6$ and $R_7$ are linked to form the group represented by Formula 12A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, and Formula 12A

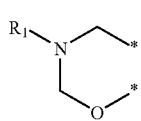

in Formula 12A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_2$, $R_3$ and $R_4$ of Formula 11 and the at least two adjacent groups selected from among $R_5$, $R_6$ and $R_7$ are linked, respectively.

43. An electrolyte membrane for a fuel cell, the electrolyte membrane comprising a cross-linked polyazole obtained through a cross-linking reaction of a composition comprising: a polyazole including a first repeating unit comprising a repeating unit represented by one of the following formulae:

wherein Ar is selected from among the following groups:

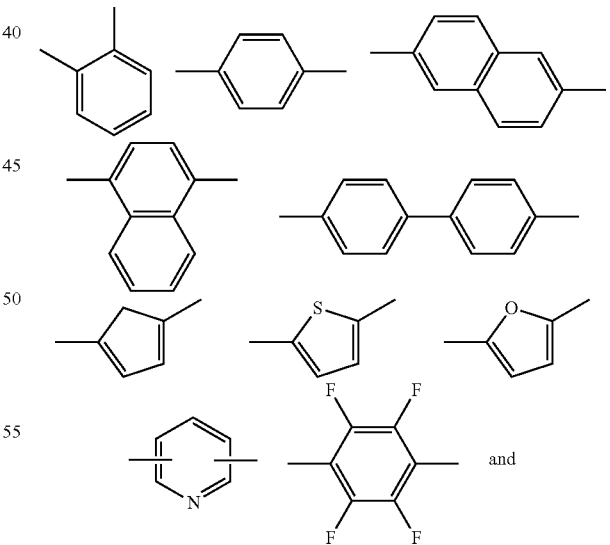

and an azole second repeating unit; and a benzoxazine-based monomer, wherein, assuming that m and n represent the relative molar amount of the first repeating unit and the azole second repeating unit, respectively, in the polyazole such that m+n=1, m is a number from 0.1 to 0.9 and n is a number from 0.1 to 0.9:

wherein the azole second repeating unit comprises a repeating unit represented by Formula 2a:

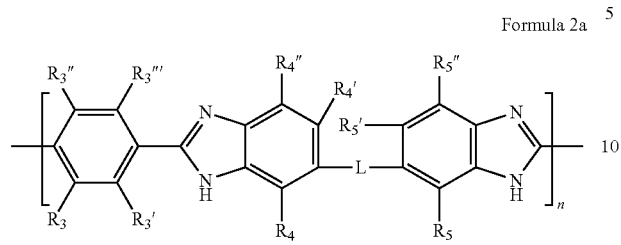

Formula 2a wherein, in Formula 2a, $R_3$, $R_3'$, $R_3''$, $R_3'''$, $R_4$, $R_4'$, $R_4''$, $R_5$, $R_5'$, and $R_5''$ are each independently a hydrogen atom, an unsubstituted or substituted C1-C20 alkyl group, an unsubstituted or substituted C1-C20 alkoxy group, an unsubstituted or substituted C6-C20 aryl group, an unsubstituted or substituted C6-C20 aryloxy group, an unsubstituted or substituted C3-C20 heteroaryl group, or an unsubstituted or substituted C3-C20 heteroaryloxy group, wherein $R_1$ and $R_2$ may be linked to form a C4-C20 carbon ring or a C3-C20 hetero ring; and L represents a linker, and wherein the benzoxazine-based monomer comprises at least one compound selected from:

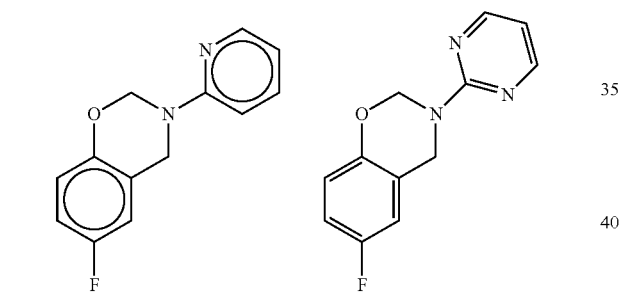

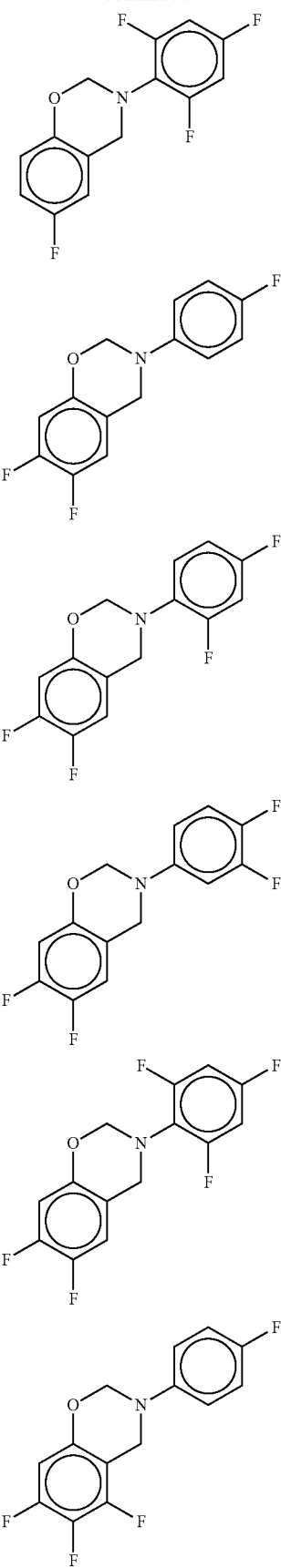

-continued
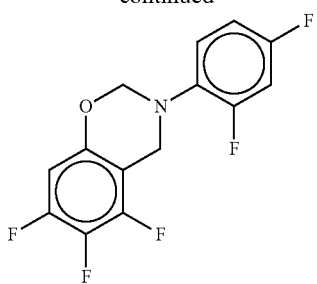
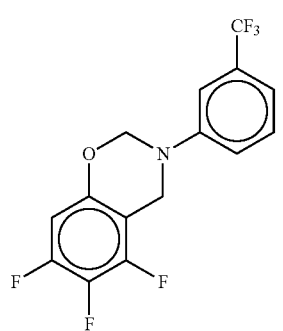
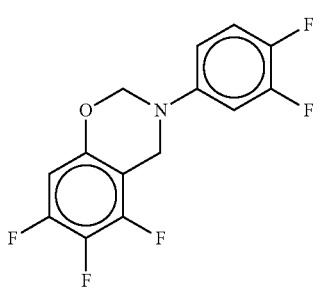
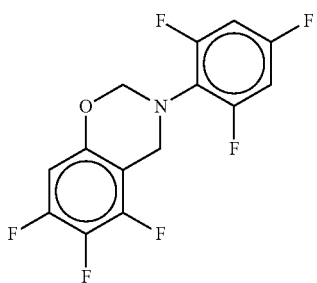
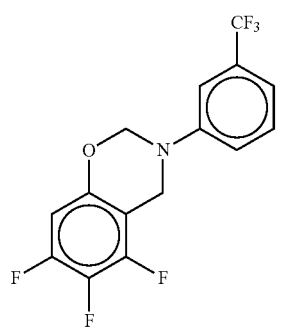
-continued
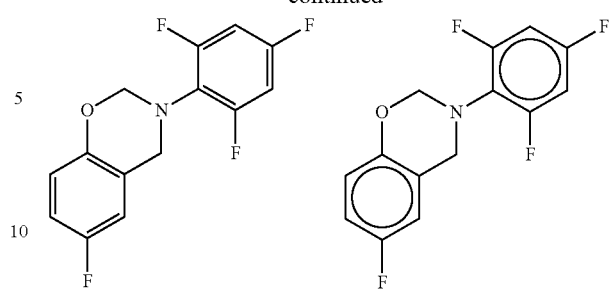
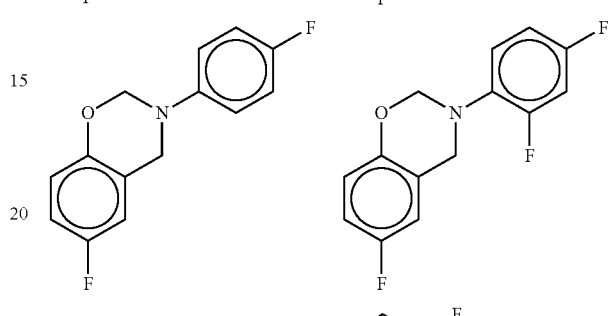
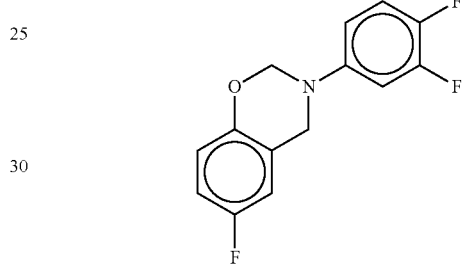
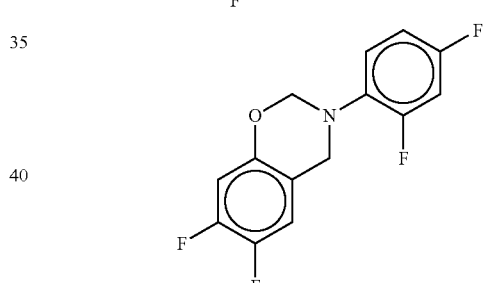
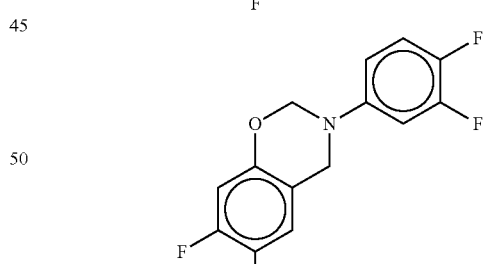
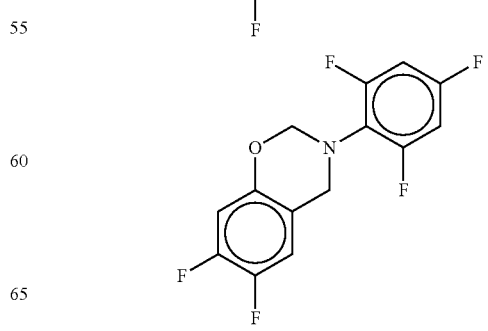

95
-continued
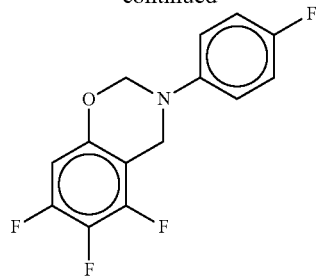
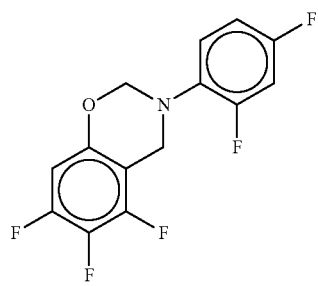
96
-continued
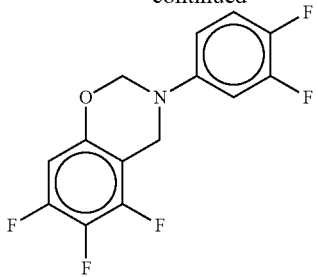
and
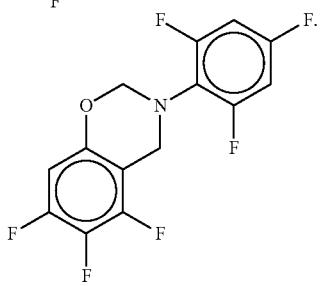
* * * * *